US012229959B2

(12) United States Patent
Dave et al.

(10) Patent No.: US 12,229,959 B2
(45) Date of Patent: Feb. 18, 2025

(54) SYSTEMS AND METHODS FOR DETERMINING CELL NUMBER COUNT IN AUTOMATED STEREOLOGY Z-STACK IMAGES

(71) Applicants: UNIVERSITY OF SOUTH FLORIDA, Tampa, FL (US); STEREOLOGY RESOURCE CENTER, INC., Saint Petersburg, FL (US)

(72) Inventors: Palak Pankajbhai Dave, Wesley Chapel, FL (US); Dmitry Goldgof, Lutz, FL (US); Lawrence O. Hall, Tampa, FL (US); Peter R. Mouton, Gulfport, FL (US)

(73) Assignees: UNIVERSITY OF SOUTH FLORIDA, Tampa, FL (US); STEREOLOGY RESOURCE CENTER, INC., St. Petersburg, FL (US)

( * ) Notice: Subject to any disclaimer, the term of this patent is extended or adjusted under 35 U.S.C. 154(b) by 0 days.

(21) Appl. No.: 17/971,295

(22) Filed: Oct. 21, 2022

(65) Prior Publication Data
US 2023/0127698 A1   Apr. 27, 2023

Related U.S. Application Data

(63) Continuation of application No. 17/308,592, filed on May 5, 2021, now Pat. No. 11,803,968, which is a (Continued)

(51) Int. Cl.
G06T 7/00   (2017.01)
G06N 3/08   (2023.01)
(Continued)

(52) U.S. Cl.
CPC ............. *G06T 7/0014* (2013.01); *G06N 3/08* (2013.01); *G06N 20/00* (2019.01); *G06T 5/20* (2013.01);
(Continued)

(58) Field of Classification Search
CPC ......... G06T 7/0012; G06T 2207/10056; G06T 2207/10064; G06V 10/82
See application file for complete search history.

(56) References Cited

U.S. PATENT DOCUMENTS 8,345,946 B2   1/2013   Ascenzi
9,739,783 B1   8/2017   Kumar et al.
(Continued)

OTHER PUBLICATIONS

Xing et al., Robust Nucleus/Cell Detection and Segmentation in Digital Pathology and Microscopy Images: A Comprehensive Review, IEEE Reviews in Biomedical Engineering, vol. 9, 2016, pp. 234-266.*
(Continued)

*Primary Examiner* — Guillermo M Rivera-Martinez
(74) *Attorney, Agent, or Firm* — Quarles & Brady LLP

(57) ABSTRACT

Systems and methods for automated stereology using deep learning are disclosed. The systems include an update in the form of a semi-automatic approach for ground truth preparation in 3D stacks of microscopy images (disector stacks) for generating more training data. The systems also present an exemplary disector-based MIMO framework where all the planes of a 3D disector stack are analyzed as opposed to a single focus-stacked image (EDF image) per stack. The MIMO approach avoids the costly computations of 3D deep learning-based methods by using the 3D context of cells in disector stacks; and prevents stereological bias in the previous EDF-based method due to counting profiles rather than cells and under-counting overlap-ping/occluded cells. Taken together, these improvements support the view that
(Continued)

AI-based automatic deep learning methods can accelerate the efficiency of unbiased stereology cell counts without a loss of accuracy or precision as compared to conventional manual stereology.

25 Claims, 27 Drawing Sheets

Related U.S. Application Data continuation of application No. 16/345,392, filed as application No. PCT/US2017/061090 on Nov. 10, 2017, now Pat. No. 11,004,199.

(60) Provisional application No. 62/420,771, filed on Nov. 11, 2016, provisional application No. 63/263,198, filed on Oct. 28, 2021, provisional application No. 63/357,946, filed on Jul. 1, 2022.

(51) Int. Cl.
| | | |
|---|---|---|
| G06N 20/00 | (2019.01) | |
| G06T 5/20 | (2006.01) | |
| G06T 5/70 | (2024.01) | |
| G06T 7/11 | (2017.01) | |
| G06T 7/174 | (2017.01) | |
| G06T 17/20 | (2006.01) | |
| G06V 20/69 | (2022.01) | |

(52) U.S. Cl.
CPC .............. *G06T 5/70* (2024.01); *G06T 7/11* (2017.01); *G06T 7/174* (2017.01); *G06T 7/97* (2017.01); *G06T 17/205* (2013.01); *G06V 20/695* (2022.01); *G06V 20/698* (2022.01); *G06T 2207/20081* (2013.01); *G06T 2207/20084* (2013.01); *G06T 2207/20152* (2013.01)

(56) References Cited

U.S. PATENT DOCUMENTS

| | | | |
|---|---|---|---|
| 10,473,667 | B2 | 11/2019 | Vu et al. |
| 2005/0267011 | A1 | 12/2005 | Deisseroth et al. |
| 2009/0238457 | A1 | 9/2009 | Rittscher et al. |
| 2009/0310833 | A1 | 12/2009 | Ascenzi |
| 2010/0119119 | A1 | 5/2010 | Rittscher et al. |
| 2010/0119127 | A1 | 5/2010 | Bello et al. |
| 2012/0236120 | A1* | 9/2012 | Kramer .............. G02B 21/0004 382/128 |
| 2012/0281883 | A1 | 11/2012 | Hurley et al. |
| 2013/0157946 | A1 | 6/2013 | Iqbal et al. |
| 2014/0131592 | A1* | 5/2014 | Kishima ............ G01N 21/6458 250/459.1 |
| 2014/0347447 | A1* | 11/2014 | Olesen ................. H04N 13/189 348/46 |
| 2015/0260979 | A1* | 9/2015 | Saito .................... G02B 21/361 348/79 |
| 2015/0346191 | A1 | 12/2015 | Aneja et al. |
| 2016/0131569 | A1 | 5/2016 | Mai et al. |
| 2016/0196672 | A1 | 7/2016 | Chertok et al. |
| 2016/0250355 | A1 | 9/2016 | Macknik |
| 2018/0095450 | A1 | 4/2018 | Lappas et al. |
| 2019/0130607 | A1* | 5/2019 | Atchison ............... G06T 7/0014 |

OTHER PUBLICATIONS

Christiansen, E. M., Yang, S. J., Ando, D. M., Javaherian, A., Skibinski, G., Lipnick, S., Mount, E., O'Neil, A., Shah, K., Lee, A. K., et al., "In silico labeling: predicting fluorescent labels in unlabeled images," Cell 173(3), 792-803 (2018).

Dave, P., Goldgof, D., Hall, L.O., Kolinko, Y., Allen, K., Alahmari, S., Morera, H., Denham, G., Galvez, S., Becker, A., Albay, R., Mobley, W.C., and Mouton, P.R.. A novel automatic approach for total neuron counts using the unbiased disector method. Program No. P976.09. Neuroscience 2021 Abstracts, Virtual: Society for Neuroscience, (2021).

Dave, P., Goldgof, D., Hall, L. O., Kolinko, Y., Allen, K., Alahmari, S., and Mouton, P. R., "A disector-based framework for the automatic optical fractionator," Journal of Chemical Neuroanatomy, 102134 (2022). (pp. 1-10).

Gani, Md Osman, et al. "Multispectral object detection with deep learning." Computational Intelligence in Communications and Business Analytics: Third International Conference, CICBA 2021, Santiniketan, India, Jan. 7-8, 2021, Revised Selected Papers. Cham: Springer International Publishing, (2021). (pp. 1-14).

Štajduhar, A., Lepage, C., Judaš, M., Lončarić, S., & Evans, A. C. (Sep. 2018). 3d localization of neurons in bright-field histological images. In 2018 International Symposium ELMAR (pp. 75-78). IEEE.

Štajduhar, Andrija, et al. "Automatic detection of neurons in NeuN-stained histological images of human brain." Physica A: Statistical Mechanics and its Applications 519 (2019): 237-246.

Mehnert, Andrew, et al. "A structural texture approach for characterising malignancy associated changes in pap smears based on mean-shift and the watershed transform." 2014 22nd International Conference on Pattern Recognition. IEEE, 2014. pp. 1189-1193.

Benali et al., A Computerized Image Analysis System for Quantitative Analysis of Cells in Histological Brain Sections, Journal of Neuroscience Methods, 2003, 125:33-43.

Bonam et al., Toward Automated Quantification of Biological Microstructures Using Unbiased Stereology, Proceeding of SPIE, 2011, 7963:1-8.

Bradley et al., A One-Pass Extended Depth of Field Algorithm Based on the Over-Complete Discrete Wavelet Transform, 2004, pp. 279-284.

Chaudhury et al., A Novel Algorithm for Automated Counting of Stained Cells on Thick Tissue Sections, In 2012 25th IEEE International Symposium on Computer-Based Medical Systems (CBMS), pp. 1-6.

Chaudhury et al., An Ensemble Algorithm Framework for Automated Stereology of Cervical Cancer, In International Conference on Image Analysis and Processing, 2013, pp. 823-832.

Costa et al., Fast and Accurate Nonlinear Spectral Method for Image Recognition and Registration, Applied Physics Letters, 2006, 89(17):174102, pp. 1-3.

Elozory et al., Automatic Section Thickness Determination Using an Absolute Gradient Focus Function, Journal of Microscopy, 2012, 248(3):245-259.

Gardi et al., Automatic Sampling for Unbiased and Efficient Stereological Estimation Using the Proportionator in Biological Studies, Journal of Microscopy, 2008, 230(1):108-120.

Gundersen et al., Some New, Simple and Efficient Stereological Methods and Their Use in Pathological Research and Diagnosis, APMIS, 1988, 96:379-394.

Gundersen et al., The New Stereological Tools: Disector, Fractionator, Nucleator and Point Sampled Intercepts and Their Use in Pathological Research and Diagnosis, APMIS, 1988, 96:857-881.

Ho et al., NeurphologyJ: An Automatic Neuronal Morphology Quantification Method and Its Application in Pharmacological Discovery, BMC Bioinformatics, 2011, 12:230, 18 pages.

Inglis et al., Automated Identification of Neurons and Their Locations, Journal of Microscopy, 2008, 230(3):339-352.

Jensen et al., The Rotator, Journal of Microscopy, 1993, 170(1):35-44.

Kaplan et al., The Disector Counting Technique, NeuroQuantology, 2012, 10(1):44-53.

Lin et al., Hierarchical, Model-Bed Merging of Multiple Fragments for Improved Three-Dimensional Segmentation of Nuclei, Cytometry Part A, 2005, 63A:20-33.

Liu et al., High-Throughput, Automated Quantification of White Matter Neurons in Mild Malformation of Cortical Development in Epilepsy, Acta Neuropathologica Communications, 2014, 2(72):1-10.

(56) References Cited

OTHER PUBLICATIONS

Long et al., A New Preprocessing Approach for Cell Recognition, IEEE Transactions on Information Technology in Biomedicine, 2005, 9(3):407-412.
Long et al., Automatic Detection of Unstained Viable Cells in Bright Field Images Using a Support Vector Machine with an Improved Training Procedure, Computers in Biology and Medicine, 2006, 36:339-362.
Miller et al., Three Counting Methods Agree on Cell and Neuron Number in Chimpanzee Primary Visual Cortex, Frontiers in Neuroanatomy, 2014, 8(36)1-11.
Mouton et al., Design-Based Stereology and Video Densitometry for Assessment of Neurotoxicological Damage, Neurotoxicology, 2010, pp. 243-267.
Mouton, Applications of Unbiased Stereology to Neurodevelopmental Toxicology, Developmental Neurotoxicology Research, 2011, pp. 53-75.
Mouton et al., Automatic Stereology of Substantia Nigra Using a Novel Segmentation Framework Based on the Balloon Active Countour Model, Soc. Neurosci, 2015, vol. 735, 4 pages.
Mouton et al., Unbiased Stereology: A Concise Guide, The Johns Hopkins University Press, 2011, pp. 1-75.
Mouton, Quantitative Anatomy Using Design-Based Stereology, Handbook of Imaging in Biological Mechanics, 2014, pp. 217-228.
Mouton et al., Tg4510 Mice Provide an Effective Model for Testing Neuroprotective Therapies in Early-Stage Alzheimer's Disease, Soc. Neurosci, 2016, pp. 1-2.
Mouton et al., Unbiased Estimation of Cell Number Using the Automatic Optical Fractionator, Journal of Chemical Neuroanatomy, 2017, 80:A1-A8.
Nattkemper et al., A Neural Classifier Enabling High-Throughput Topological Analysis of Lymphocytes in Tissue Sections, IEEE Transactions on Information Technology in Biomedicine, 2001, 5(2):138-149.
Peng et al., Neuron Recognition by Parallel Potts Segmentation, PNAS, 2003, 100(7):3847-3852.
Phoulady et al., An Approach for Overlapping Cell Segmentation in Multi-Layer Cervical Cell Volumes, The Second Overlapping Cervical Cytology Image Segmentation Challenge—IEEE ISBI, 2015, 2 pages.
Phoulady et al., A New Approach to Detect and Segment Overlapping Cells in Multi-Layer Cervical Cell Volume Images, In 2016 IEEE 13th International Symposium on Biomedical Imaging (ISBI), 2016, pp. 201-204.
Phoulady et al., Experiments with Large Ensembles for Segmentation and Classification of Cervical Cancer Biopsy Images, IEEE International Conference on Systems, Man and Cybemetics, 2014, pp. 870-875.
Phoulady et al., Nucleus Segmentation in Histology Images with Hierarchical Multilevel Thresholding, Proceedings of SPIE, 2016, vol. 9791, pp. 1-6.
Ray et al., Tracking Leukocytes In Vivo with Shape and Size Constrained Active Contours, IEEE Transactions on Medical Imaging, 2002, 21(10):1222-1235.
Santacruz et al., Tau Suppression in a Neurodegenerative Mouse Model Improves Memory Function, Science, 2005, 309:476-481.
Savitzky et al., Smoothing and Differentiation of Data by Simplified Least Squares Procedures, Analytical Chemistry, 1964, 36(8):1627-1639.
Schmitz et al., Current Automated 3D Cell Detection Methods are not a Suitable Replacement for Manual Stereologic Cell Counting, Frontiers in Neuroanatomy, 2014, 8(27):1-13.
Sjostrom et al., Artificial Neural Network-Aided Image Analysis System for Cell Counting, Cytometry, 1999, 36:18-26.
Slater et al., A Machine Vision System for the Automated Classification and Counting of Neurons in 3-D Brain Tissue Samples, In Proceedings Third IEEE Workshop on Applications of Computer Vision, WACV '96, 1996, pp. 224-229.
Spires et al., Region-Specific Dissociation of Neuronal Loss and Neurofibrillary Pathology in a Mouse Model of Tauopathy, American Journal of Pathology, 2006, 168(5):1598-1607.
Sterio, The Unbiased Estimation of Number and Sizes of Arbitrary Particles Using the Disector, Journal of Microscopy, 1984, 134(2):127-136.
Tapias et al., Automated Imaging System for Fast Quantitation of Neurons, Cell Morphology and Neurite Morphometry In Vivo and In Vitro, Neurobiology of Disease, 2013, 54:156-168.
Valdecasas et al., On the Extended Depth of Focus Algorithms for Bright Field Microscopy, Micron, 2001, 32(6):559-569.
West et al., Unbiased Stereological Estimation of the Total Number of Neurons in the Subdivisions of the Rat Hippocampus Using the Optical Fractionator, The Anatomical Record, 1991, 231(4):482-497.
Wicksell, The Corpuscle Problem. A Mathematical Study of a Biometric Problem, Biometrika, 1925, 17(1/2):84-99.
Wikipedia, Convolutional Neural Network, Oct. 2016, 19 pages.
Xie et al., Deep Voting: A Robust Approach Toward Nucleus Localization in Microscopy Images, In International Conference on Medical Image Computing and Computer-Assisted Intervention, 2015, pp. 374-382.
Xing et al., Robust Nucleus/Cell Detection and Segmentation in Digital Pathology and Microscopy Images: A Comprehensive Review, IEEE Reviews in Biomedical Engineering, 2016, pp. 1-31.
Dong et al., Deep Learning for Automatic Cell Detection in Wide-Field Microscopy Zebrafish Images, In 2015 IEEE 12th International Symposium on Biomedical Imaging (ISBI), 2015, pp. 772-776.
PCT International Search Report, PCT/US2017/061090, Mar. 20, 2018, 4 pages.
European Patent Office, Extended Search Report, U.S. Appl. No. 17/870,047, filed Jun. 30, 2021, 14 pages.

* cited by examiner

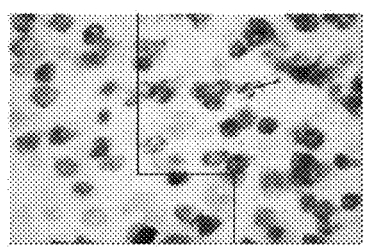
FIG. 1A
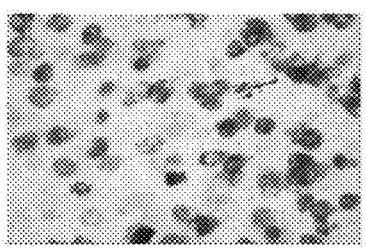
FIG. 1B
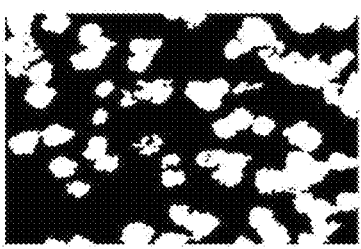
FIG. 1C
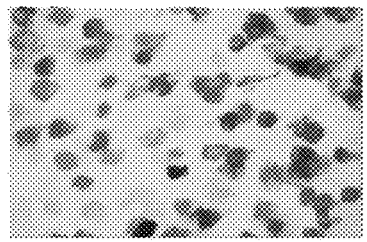
FIG. 1D
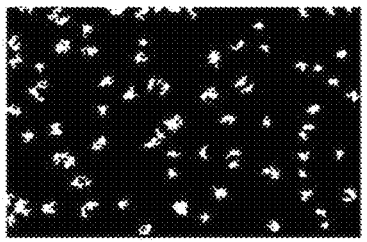
FIG. 1E
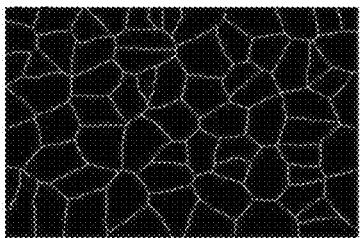
FIG. 1F
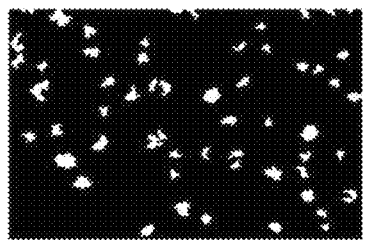
FIG. 1G
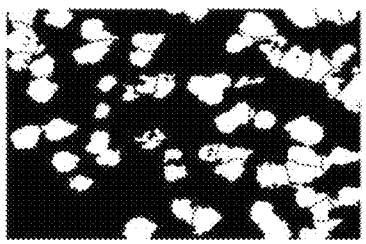
FIG. 1H
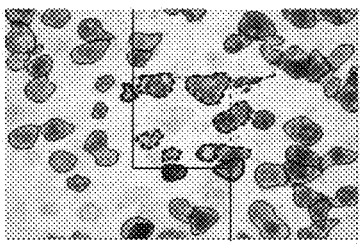
FIG. 1I
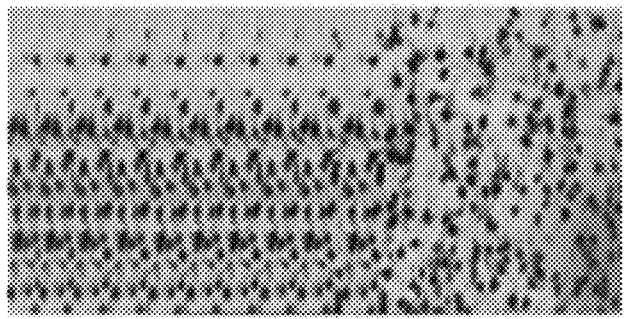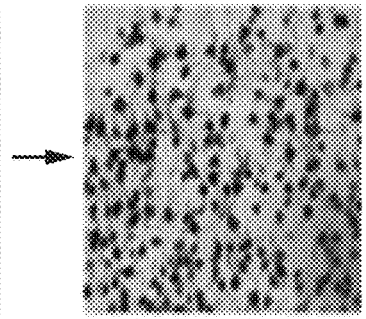
FIG. 2A
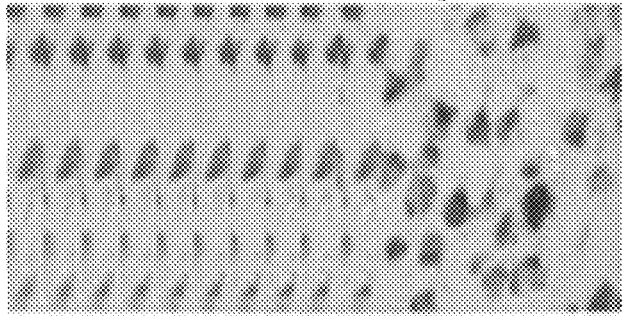
FIG. 2B

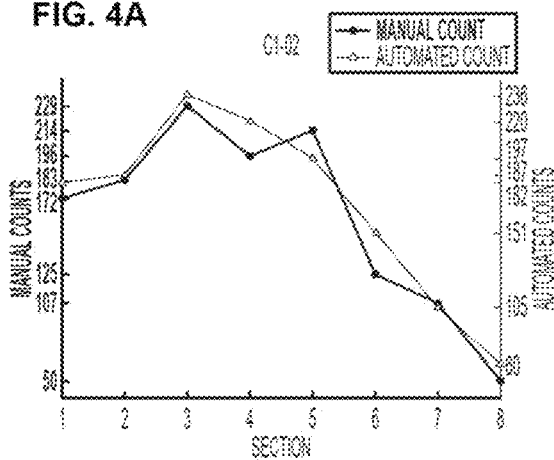
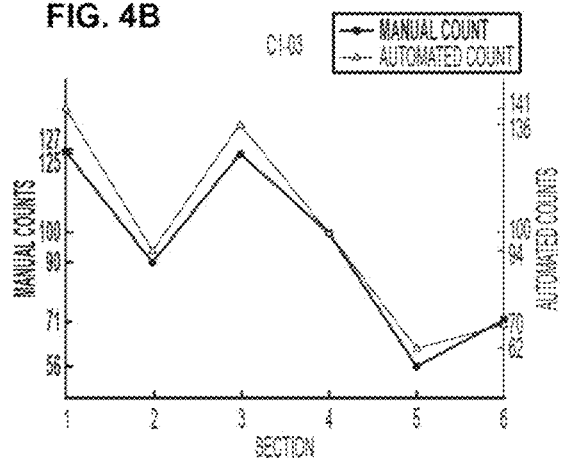
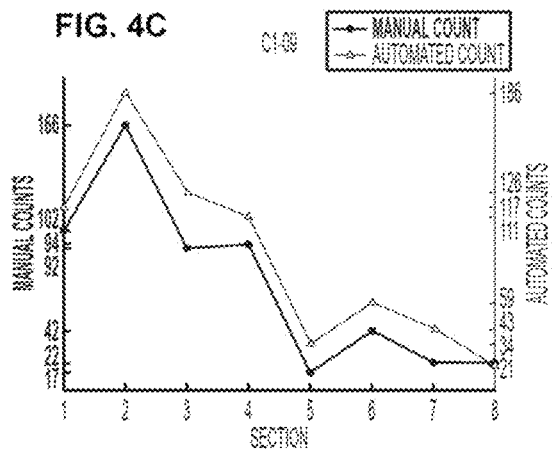
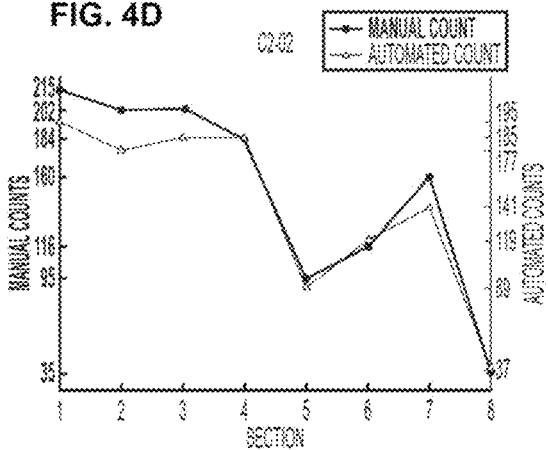
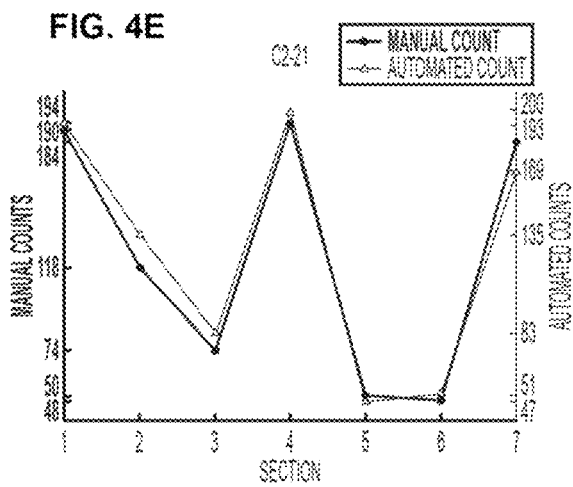
FIGURE 4. PLOTS OF MANUAL AND AUTOMATED COUNTS OF DIFFERENT SECTIONS FOR 4 CASES. THESE PLOTS OF Neu-N NEURON COUNTS BY SECTION SHOW THE RELATIVE AGREEMENT BETWEEN THE OBJECTIVE AUTOMATED FRAMEWORK AND SUBJECTIVE MANUAL COUNTS BY 2 DATA COLLECTORS (C1 AND C2). THE RESIDUAL ERRORS IN THESE CORRELATIONS ARISE FROM BOTH APPROACHES.

```
Input   :  EDF image I, min nucleus size m, min solidity s, low threshold t₁, high threshold
           t₂, and min area and outer boundary average intensity difference d
Output  :  Binary mask of nucleus segmentation N 1    N ← ∅
2    I ← Wiener(I)
3    for t ← t₁ to t₂ step 10 do
4    |    B ← I ≤ t
5    |    foreach region r in B do
6    |    |    if size of r < m or solidity of r < s then
7    |    |    |    remove r
8    |    |    else if binary mask of r ∩ N = ∅ then
9    |    |    |    N ← N ∪ r
10   |    |    else
11   |    |    |    /* r overlaps with regions r₁, r₂, ..., rₙ in N
12   |    |    |    if solidity of r ≥ solidities of all regions r₁, r₂, ..., rₙ then
13   |    |    |    |    N ← N ∪ r
14   |    |    |    else
15   |    |    |    |    remove r
16   |    |    |    end
17   |    |    end
18   |    end
19   end
20   foreach region r in N do
21   |    dilate r
22   |    if average intensity of r – average intensity of outer boundary ≤ d then
23   |    |    remove r
24   |    end
     end
```

FIG. 7

$$Q(q) = \inf\left\{x \in \mathbb{R}, q \leq \frac{1}{\sqrt{2\pi}\sigma_b} e^{-\frac{(x-\mu_b)^2}{2\sigma_b^2}}\right\} \quad (1)$$

$$= \mu_b + \sqrt{2}\sigma_b \, \mathrm{erf}^{-1}(2q-1)$$

$$S_{i,j}^{i',j'} = \sqrt{\sum_{k=1}^{20}\left(\overline{F_{i,j}^k} - \overline{F_{i',j'}^k}\right)^2} \quad (2)$$

$$C_{i,j}^{i',j'} = \sqrt{(i-i')^2 + (j-j')^2} \quad (3)$$

$$L_{i,j}^{i',j'} = \frac{1}{m'}\left(\sum_{s=1}^{m'} L_{i,j}^{i_s,j_s}\right) \quad (4)$$

$$\beta L_{i,j}^m - \sum_{\substack{n=1\\n\neq m}}^{N} L_{i,j}^n > 0 \quad (6)$$

$$W_\theta = \left(\frac{1}{1+\exp\left(-a\left(\frac{1}{2}-\frac{|r_\theta - s|}{r_\theta}\right)\right)}\right)^{2r_\theta}_{s=0} \quad (7)$$

$$I(p_\theta^{s+1}) - I(p_\theta^{s-1}) \quad (8)$$

$$i_\theta = \underset{s\in\{0,1,\ldots,2\theta\}}{\mathrm{argmax}} \; W_\theta(s)G(p_{\theta,s}) \quad (9)$$

$$DSC_{A,B} = \frac{2|A\cap B|}{|A|+|B|} \quad (10)$$

$$\frac{|A\cap B|}{\max\{|A|,|B|\}} > 0.6 \quad (11)$$

FIG. 8

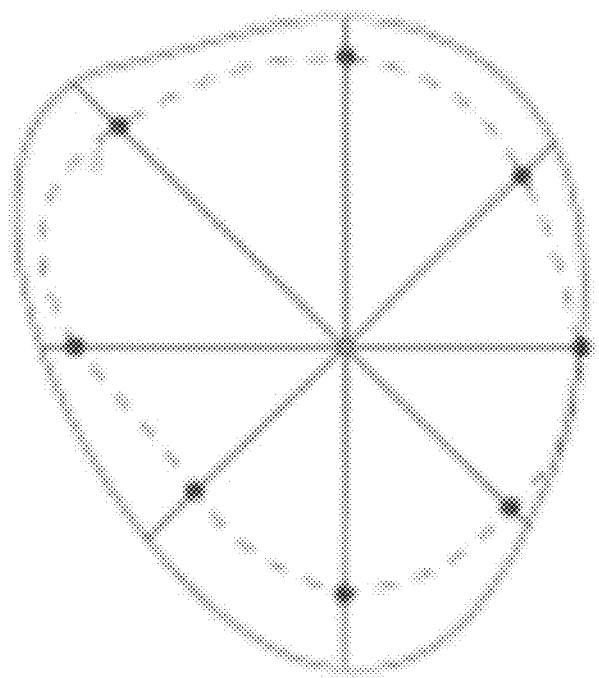
FIG. 11
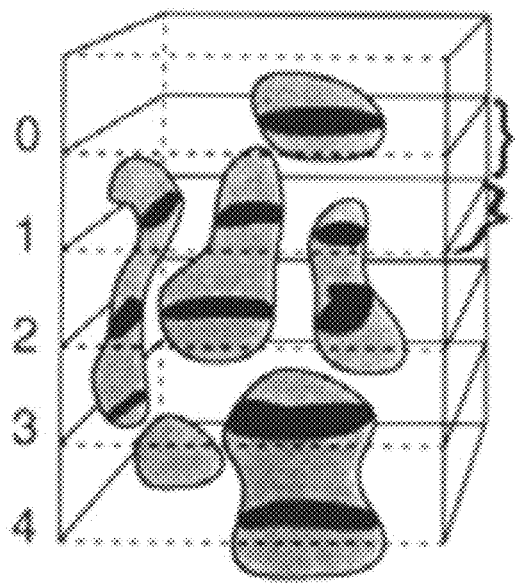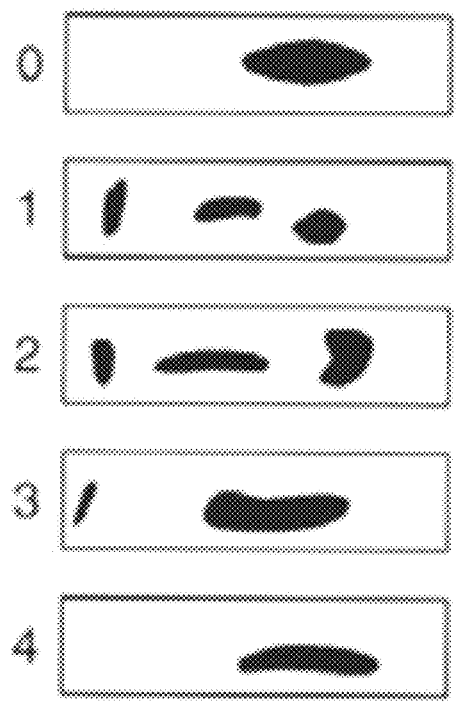
FIG. 12

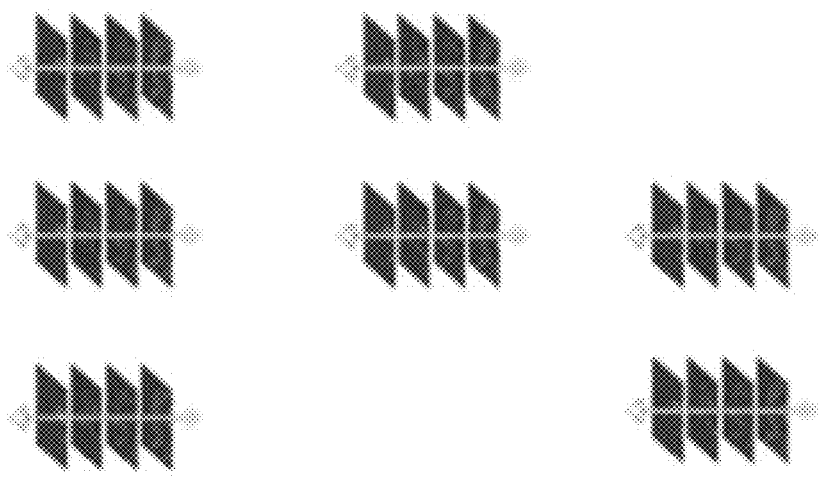
FIG. 17

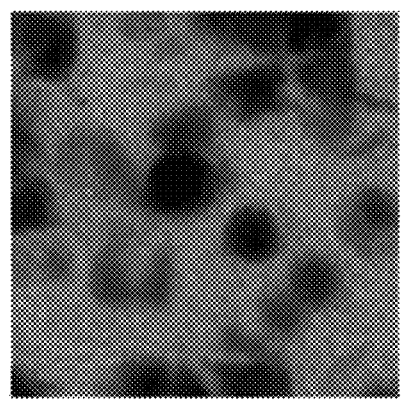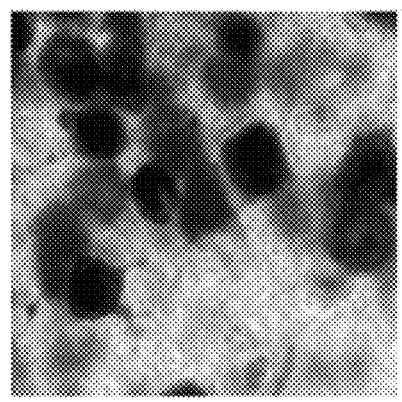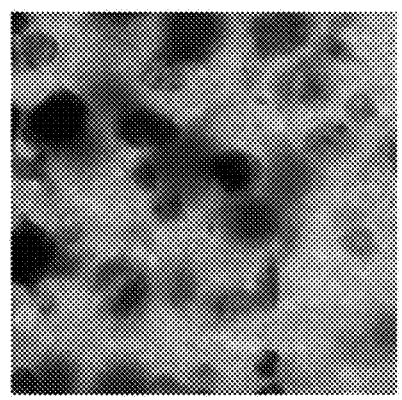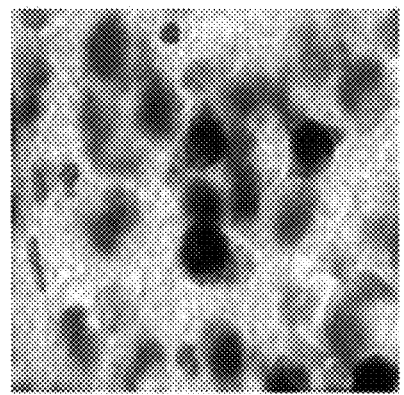
FIG. 25A

| Channel | GT |
|---------|-----|
| FG1 | 0 |
| FG2 | 0 |
| FG3 | 1 |
| FG4 | 0 |
| FG5 | 0 |
| BG11 | 0 |

| Channel | GT |
|---------|-----|
| FG1 | 0 |
| FG2 | 0 |
| FG3 | 1 |
| FG4 | 0 |
| FG5 | 1 |
| BG11 | 0 |

2704

1/k with k=2

| Channel | GT |
|---------|-----|
| FG1 | 0 |
| FG2 | 0 |
| FG3 | 0.5 |
| FG4 | 0 |
| FG5 | 0.5 |
| BG11 | 0 |

SYSTEMS AND METHODS FOR DETERMINING CELL NUMBER COUNT IN AUTOMATED STEREOLOGY Z-STACK IMAGES

CROSS REFERENCE TO RELATED APPLICATION

This application is a continuation-in-part of U.S. application Ser. No. 17/308,592, filed May 5, 2021, which claims the benefit of U.S. application Ser. No. 16/345,392, filed Apr. 26, 2019, which is the U.S. National Stage Application of International Patent Application No. PCT/US2017/061090, filed Nov. 10, 2017, which claims the benefit of U.S. Provisional Patent Application Ser. No. 62/420,771, filed Nov. 11, 2016, and this application also claims priority to U.S. Provisional Patent Application Ser. Nos. 63/263,198, filed Oct. 28, 2021 and 63/357,946, filed Jul. 1, 2022, the disclosures of which are hereby incorporated by reference in their entirety, including any figures, tables, and drawings.

GOVERNMENT SUPPORT

This invention was made with government support Grant numbers 1513126, 1746511, and 1926990 awarded by National Science Foundation. The government has certain rights in the invention.

FIELD OF THE INVENTION

The present invention relates to automated stereology methods and apparatuses. More specifically, the present invention relates to methods and apparatus for determining the characteristics of a tissue sample, including the number and size of cells.

BACKGROUND OF THE INVENTION

Unbiased stereology is used to quantify properties of higher dimensional (e.g., 3D) objects using lower dimensional (e.g., 2D) sections of the object. Computer based stereology systems acquire data from 3D structures and have been developed to extract an unbiased estimation of geometric properties including length, area, volume, and population size of objects within a biological sample. Biological applications of stereology include the unbiased estimation of a regional volume of tissue, surface area and length of cells and curvilinear fibers, and the total number of cells (objects of interest) in a defined reference space (region of interest).

Design-based (unbiased) stereology is the current best practice for quantifying the number of cells in a tissue sample. The majority of funding agencies, journal editors, and regulatory bodies prefer the sound mathematical basis of stereology approaches over assumption- and model-based methods. The major obstacle to high throughput applications is that current stereology approaches require time- and labor-intensive manual data collection, which can be prohibitive on tissue samples that include multiple cell types. For example, section or slice thickness determination may be carried out by a user performing manual adjustments using the microscope's fine focusing mechanism to locate the boundaries of slice. In addition, a user may also be required to manually locate and select objects of interest while stepping through stained tissue sections in order to perform quantitative analysis of biological microstructures. Therefore, there is a continuing need to reduce the number of manual steps required, as well as increase the efficiency and accuracy of automated stereology.

BRIEF SUMMARY OF THE INVENTION

Embodiments of the present invention include systems and methods for automated stereology. Embodiments of the present invention include an automatic optical fractionator that can obtain accurate and efficient stereology-based estimates of the number and size of biological objects (e.g., cells) in tissue sections.

In a nonlimiting embodiment, a method for performing computerized stereology is disclosed. The method includes: obtaining a trained deep learning model based on a plurality of z-stack training images including one or more first cells: obtaining a plurality of z-stack runtime images including one or more second cells: generating a plurality of z-stack grayscale images by converting the plurality of z-stack runtime images into grayscale: providing the plurality of z-stack grayscale images to the trained deep-learning model, each z-stack grayscale image of the plurality of z-stack grayscale images corresponding to an input channel of the trained deep-learning model: obtaining a plurality of outputs corresponding to the plurality of z-stack grayscale images from the trained deep-learning model, an output of the plurality of outputs representing foreground for a corresponding z-stack grayscale image of the plurality of z-stack grayscale images, wherein a first output of the plurality of outputs is bidirectionally correlated to a second output of the plurality of output images; and counting the one or more second cells in the plurality of outputs.

In another nonlimiting embodiment, a system for performing computerized stereology is disclosed. The system includes a processor, and a memory having stored thereon a set of instructions which, when executed by the processor, cause the processor to: obtain a plurality of z-stack runtime images including one or more first cells: generate a plurality of z-stack grayscale images by converting the plurality of z-stack runtime images into grayscale; apply the plurality of z-stack grayscale images to a trained deep-learning model, each z-stack grayscale image of the plurality of z-stack grayscale images corresponding to an input channel of the trained deep-learning model: obtain a plurality of outputs corresponding to the plurality of z-stack grayscale images from the trained deep-learning model, an output of the plurality of outputs representing foreground for a corresponding z-stack grayscale image of the plurality of z-stack grayscale images, wherein a first output of the plurality of outputs is bidirectionally correlated to a second output of the plurality of output images; and count the one or more first cells in the plurality of outputs.

BRIEF DESCRIPTION OF THE DRAWINGS

FIGS. 1A-1I show intermediate results of different steps in segmentation-stereology according to the present invention. FIG. 1A shows an original image with manual counts. FIG. 1B shows an EDF image used by a segmentation method according to the present invention. FIG. 1C shows clumps segmented using the threshold computed from an estimated Gaussian Mixture Model (GMM). FIG. 1D processed EDM image. FIG. 1E shows regional minimas in the processed image. FIG. 1F shows background markers for watershed segmentation. FIG. 1G shows watershed regions reconstructed by regional minimas. FIG. 1H shows a Voronoi diagram produced from foreground regions in each segmented clump. FIG. 1I shows final segmentation after smoothing region boundaries using a Savitzky-Golay filter.

FIG. 2A shows extended depth of field (EDF) images (right) created from z-stack of images (left) with a low power objective (40×, na 0.65).

FIG. 2B shows extended depth of field (EDF) images (right) created from z-stack of images (left) with a high power objective (100×, na 1.3).

FIGS. 4A-4E are plots of manual and automated cell counts of different tissue sections.

FIG. 6A shows nucleus segmentation. FIG. 6B shows cell clump segmentation. FIG. 6C shows cytoplasm approximation. FIG. 6D shows cytoplasm refinement.

FIG. 7 shows Algorithm 1, which is an automatic stereology framework according to the present invention.

FIG. 8 shows a list of equations that can be used in an automated stereology framework according to the present invention.

FIG. 11 shows a schematic of a fine refinement step according to the present invention.

FIG. 12 shows Corpuscle problem.

FIG. 17 shows schematic showing stacks of z-axis images (disector stacks) at systematic-random locations.

FIGS. 25A-C are visualized results by ASATP-DP and example MIMO methods.

FIGS. 27A and 27B show label vectors for XY-locations in a non-overlapping region of a cell and an overlapping regions of cells, respectively.

DETAILED DISCLOSURE OF THE INVENTION

Figure 3:
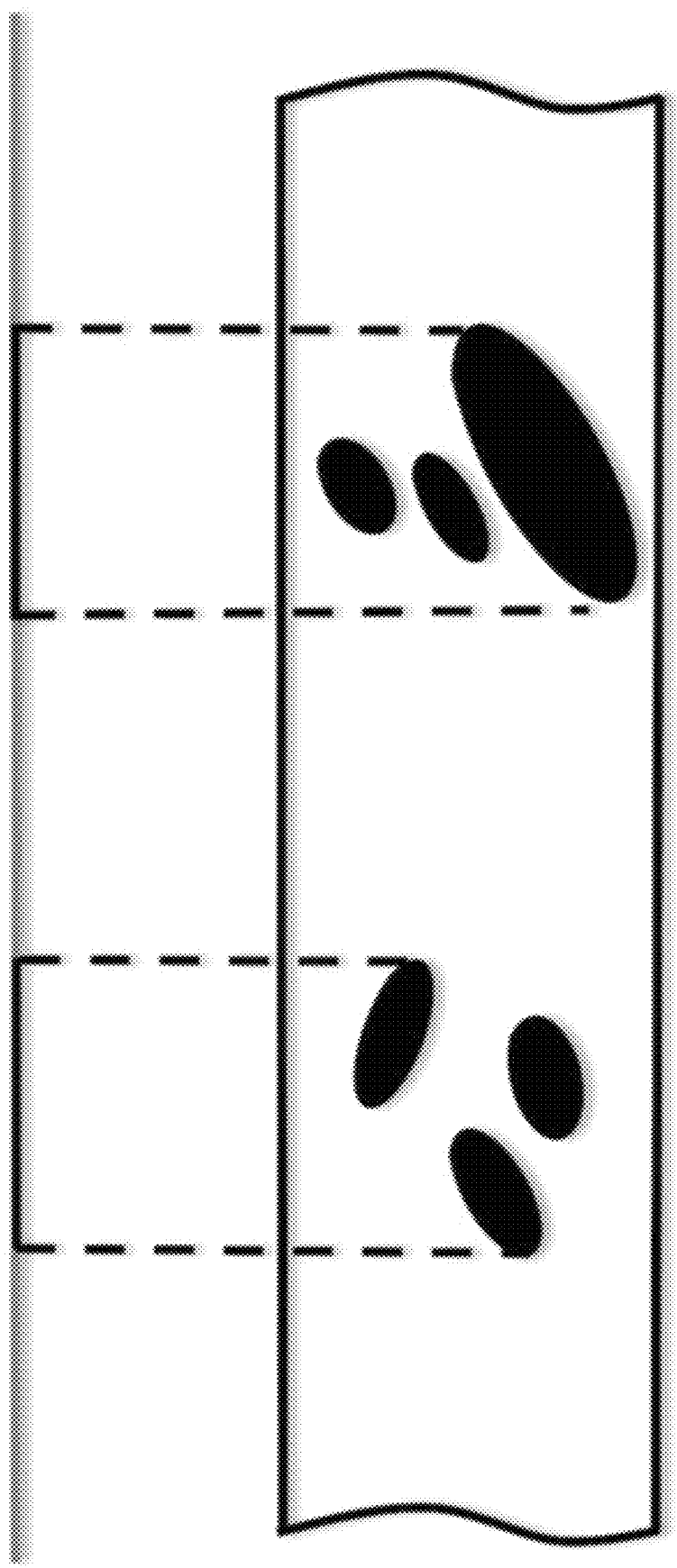
FIG. 3 is a schematic of NeuN-stained soma in a thick section at low power (showing over-projection on left and masking on the right) and also shows a schematic of high signal-to-noise objects in a thick section showing over-projection (left) and masking (right).

Embodiments of the present invention include systems and methods for automated stereology. Embodiments of the present invention include an automatic optical fractionator that can obtain accurate and efficient stereology-based estimates of the number and size of biological objects (cells) in tissue sections. Used in combination with segmentation algorithms and immunostaining methods, automatic estimates of cell number and size (volume) are obtainable from extended depth of field images built from three-dimensional volumes of tissue (disector stacks).

Embodiments of the present invention include a novel combination of extended depth of field (EDF) images that give 2-D representations of 3-D cells in a disector volume at their optimal plane of focus, and the application of segmentation algorithms to these EDF images in order to automatically make unbiased (accurate) determinations of the true number and size (volume) of cells visualized by staining. A variety of staining methods can be applied, which are known in the art. By increasing the sampling stringency, the automatic estimates of cell number and size will approach their true value. The segmentation method can include a combination of Gaussian Mixture Model (GMM), morphological operations, watershed segmentation. Voronoi diagrams and boundary smoothing, though it is recognized that equivalent segmentation algorithms could achieve a similar result. The application of a segmentation algorithm to EDF images allows for automatic estimates of object number and size in disector volumes that represent a known fraction of a reference space, hence the designation automatic optical fractionator.

Embodiments of the present invention can include a step of nucleus detection and segmentation. FIG. 6 shows a series of processing steps performed on an EDF image.

In nucleus detection and segmentation, the primary goal is to detect and segment nuclei commonly represented by small uniform relatively dark and convex regions. Because each segmented nucleus is an indication of a cell, the result of this step directly affects the outcome of the final cytoplasm segmentation. The three most visually distinctive and important features of nuclei are size, average intensity and solidity, which can be used in iterative algorithms of the present invention to detect and segment nuclei. Due to the cytoplasm segmentation methods of the present invention, minor segmentation inaccuracies in this step will have only negligible effects on the final results. Finally, since nuclear detection inaccuracy has more adverse effects on the final segmentation outcome, algorithms of the present invention can be designed to have high sensitivity to nuclei. The suggested method (or algorithm) for this task is a novel iterative approach for detecting (and segmenting) nuclei, and the method will now be further explained.

An EDF image can first be blurred using a 2-D adaptive noise-removal filter. An algorithm of the present invention can then iteratively binarize the image starting with a low threshold to find seed points from different nuclei. Too small or too concave regions can be removed after each binarization and remaining regions can be added to a nucleus mask. The nucleus mask can keep the nuclei segmented at each execution phase of the algorithm. A region replaces previous regions only if it has greater solidity than all the previous region(s) that overlap with it. This ensures that a newly appearing region does not replace other more convex region(s). The thresholding range can be decided based on the minimum and maximum average intensity of a typical (or average) nucleus in the images. The image can also be iterated in multiple steps (e.g., steps of 10) for faster computation.

Two post-processing steps can also be incorporated. In the two post-processing steps, some or all regions can be dilated and filtered. Those regions having a difference between their outer boundary average intensity and region average intensity that is smaller than a threshold can be removed. It should be noted that most of the artifacts can be ignored because of their size (if they are isolated) or because of their solidity (if they are overlapping). Although the algorithm is simple and fast, it is also very accurate on both synthetic and real image datasets and can outperform other state-of-the-art algorithms.

FIG. 7 shows an example of an algorithm (Algorithm 1) according to the present invention. Filtering regions based on a maximum size can be considered, as seen in line 6 of Algorithm 1. The filter can increase segmentation accuracy but should not change the results for nucleus detection accuracy on previous cytology datasets. The nucleus, represented by region A in ground truth, is considered to be detected by region B in the segmentation results by the rule in Equation 1 of FIG. 8.

According to the present invention, clump segmentation can follow nucleus detection and segmentation. In clump segmentation, the cell clumps (cellular masses that contain urothelial cells) are segmented from the background. Generally, the background in each EDF image is uniformly bright and the pixels of the foreground are darker, but have more variation. This contrast causes the brightness of the darkest background pixel to be intrinsically higher than the brightest foreground pixel, although this is not always the case. Therefore, a simple thresholding and some morphological operations can segment the background from the foreground.

According to an embodiment of the present invention, the algorithm learns a Gaussian Mixture Model (GMM) with two components on the pixel intensities using an Expectation Maximization (EM) algorithm. One Gaussian can estimate the distribution of foreground (cell clumps) pixel intensities and the second can estimate the background pixel intensities. Using the background Gaussian distribution, the threshold $T=Q(q)$, where $Q(\cdot)$ is selected as the quantile function of the normal distribution, which can be defined as in Equation 1 (FIG. 8), where $u_b$ and $b$ are the mean and standard deviation of the background normal distribution and $erf(\cdot)$ is the error function.

Figure 9:
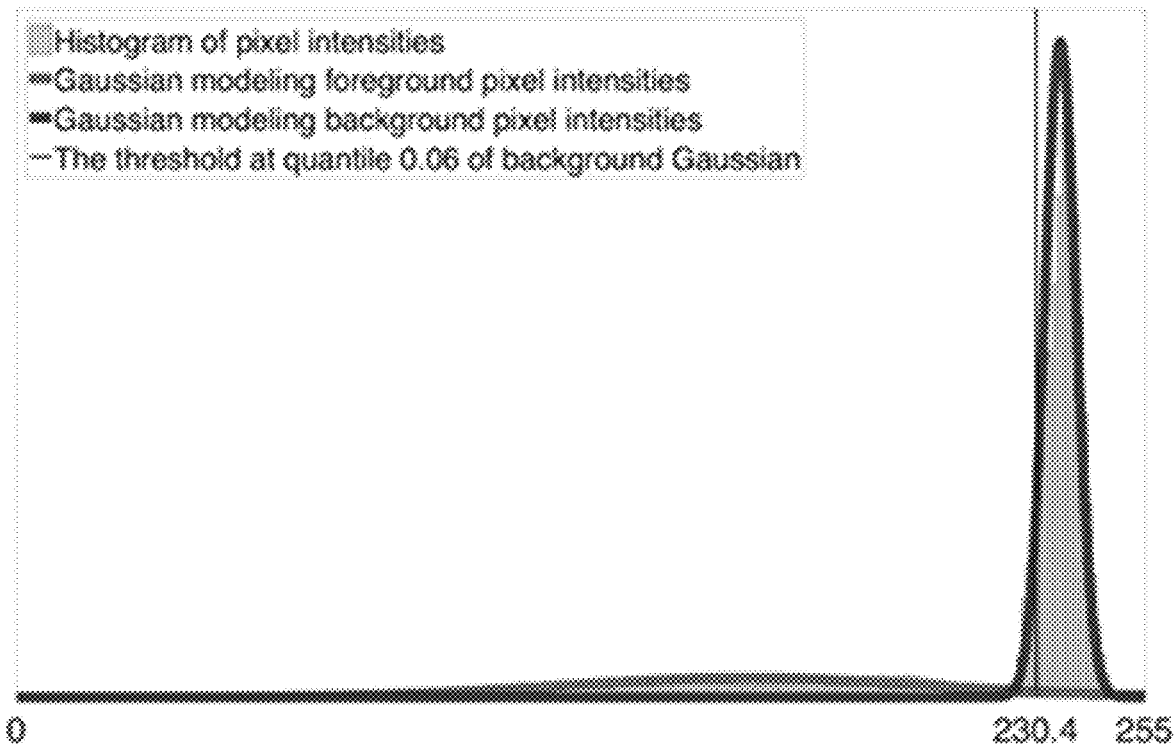
FIG. 9 shows a histogram of pixel intensities of a real EDF image, its corresponding estimated GMM and a selected threshold.

FIG. 9 shows a histogram of pixel intensities of a real EDF image, its corresponding estimated GMM and the selected threshold. After an image is binarized using the threshold T, a connected component analysis can be performed. Those connected components that did not contain any nucleus, or have small areas, or an average intensity greater than $Q(q0)$ can removed. Alternatively, those nuclei that do not overlap with any segmented cell clump can be discarded.

After clump segmentation, cytoplasm segmentation can be performed, which involves segmenting the overlapping cytoplasm. Generally the best focal plane for a specific cell is found when its nucleus is in focus. Therefore, it can be safely assumed that a nucleus is in focus when its cytoplasm is also (at least relatively) in focus, and vice versa. Based on this assumption, a cytoplasm boundary of a nucleus can be approximated by assigning the parts of the image that have focal measurements that are similar to the nucleus and are relatively close. These two criteria (being relatively close to the nucleus and having similar focal measurements to that of the nucleus) are the main criteria with which to approximate the cytoplasm boundaries using the image stack. After approximating the boundary, the boundaries can be refined in two more steps using the EDF image.

To approximate the cytoplasm boundaries, a square grid with width W can be overlaid on each image in the stack. Instead of assigning pixels of the image to different nuclei, the boundaries can be approximated by assigning grid squares (or subimages). This can increase computational speed and also allows for defining a focus measure to estimate the focus of the area enclosed in a grid square. Based on the above assumption, if two subimages that are near in distance come into focus and go out of focus similarly in different images of the image stack, then it is likely they belong to the same cell. This will give an approximation of cytoplasm boundaries.

Considering the (i,j)-th grid square (that is in row i and column j). For image k in the stack, the focus measure of $I_k$ ((i,j)-th grid square in k-th image in the stack), $F_k$, can be defined as the standard deviation of pixel intensities in the grid square. A focus vector of (i, j)-i,j-th grid square can be defined as the vector containing focus measures of all images in the stack, (F1, F2, ..., F20) (assuming there are 20 images in each stack in the dataset). The focus vector can then be normalized to have values within the range [0, 1] and be denoted by (F1, F2 .... F20).

The focus distance of the (i,j) and (i0,j0)-th grid squares, $S_{i0,j0}$, can then be defined by the i Euclidean distance of their corresponding normalized focus vectors as shown in Equation 2 of FIG. 8. Equation 3 shows the measure of the closeness of (i,j) and (i0,j0)-th grid squares. Finally, the likelihood of the (i,j) and (j0,j0)-th grid squares belonging to the same cell can be estimated by Equation 4.

Using the likelihood measure, L, defined above for two subimages belonging to the same cell, the likelihood of a subimage belonging to the cytoplasm of a particular cell is estimated by considering the fact that its nucleus is part of the cell. Therefore, to find out which subimages are a part of a particular cell, a search is done for subimages that have a high likelihood of belonging to the same cell with the subimages overlapping with the nucleus. Hence, to compute the likelihood of the (i,j)-th subimage belonging to the cytoplasm of a cell with a nucleus that overlaps with (i1, j1), (i2, j2), . . . , (im0, jm0)-th subimages, we set m as the index of the detected nucleus in a cell clump (Equation 5). Lastly, if there are N nuclei detected in a cell clump, namely nucleus 1 through N, the (i,j)-th subimage can be assigned to nucleus m as shown in Equation 6. In other words, a subimage is assigned as the cytoplasm of a cell if the weighted likelihood of it belonging to that cell is greater than the sum of the likelihoods of it belonging to other cells in the clump. The permitted degree of overlap between cells in a clump can be adjusted: higher values allow the cells in a cell clump to overlap more, and vice versa. In the next two processes that are described, the approximated boundaries are refined.

Figure 10:
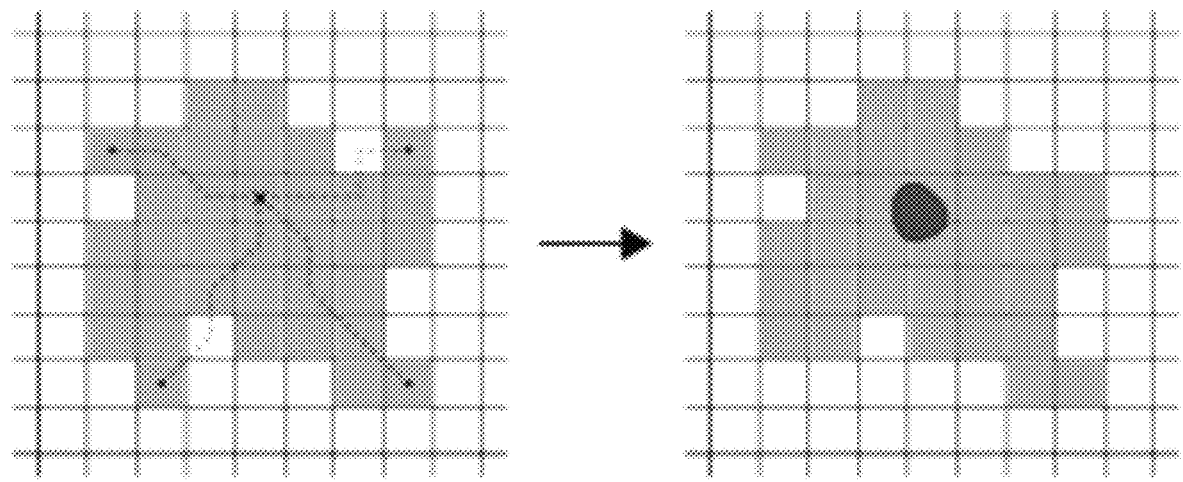
FIG. 10 shows a schematic of a coarse refinement step showing removal of subimages not reachable by a centroid subimage.
Figure 13:
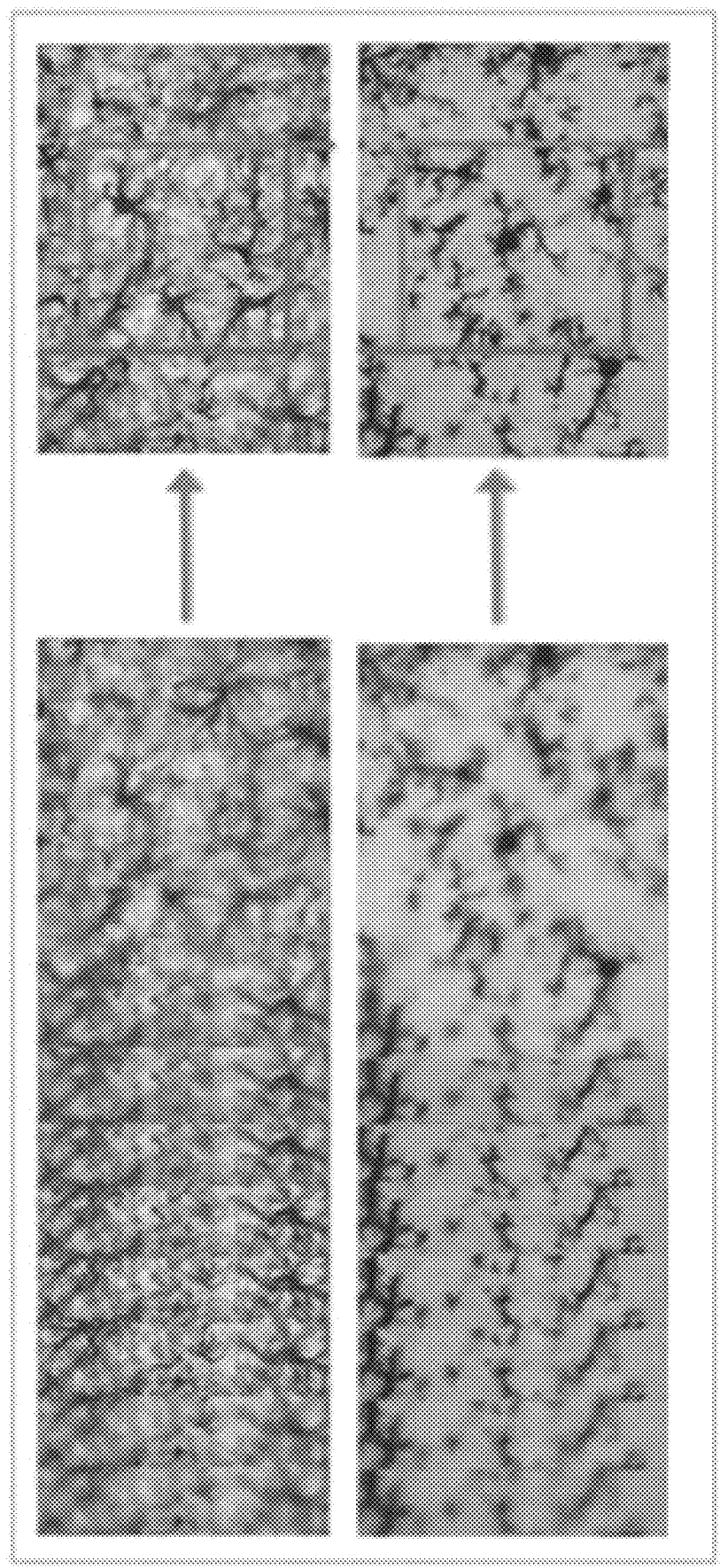
FIG. 13 shows EDF images of GFAP astrocyltes (upper) and the Iba-1 microglia (lower) at high power (100× oil na 1.3).

The first step of refining the approximated boundaries can include coarse refinement, which is defined as refining the boundary at the subimage level. Unlike nuclei, which are mostly convex, the shape of cytoplasm can show substantial concavity. Therefore, enforcing convexity on cytoplasm boundaries is not realistic, though a limited level of concavity can be allowed in cytoplasm boundaries. To accomplish this, reachability notation can be defined and grid squares that are not reachable from the nucleus centroid can be removed. For example, suppose that the nucleus centroid falls in the (i,j)-th grid square, it can be assumed that the (i0,j0)-th grid square is not reachable from the (i,j)-th grid square if there is at least one grid square on the discretized line segment from (i) to (i0,j0) that is not assigned to the cell. Discretization can be implemented using the fast and simple algorithms that are known in the art (and outlined in the References, below). Removing a grid square may make previously reachable grid squares not-reachable. Not-reachable grid squares can continue to be removed as long as such grid squares exist. FIG. 10 shows an example of two removed unreachable grid squares for a cell and its final shape.

The second step of refining the approximated boundaries can include fine refinement, which refines the boundary at the pixel level. Fine refinement at the pixel level can be conducted in an iterative process. The effect of nuclei on the boundary evolution can be removed by replacing each nucleus region's pixel intensity by the mean intensity of its outer boundary. This operation can result in smoothing the segmented nuclei regions significantly and preventing edge pixels caused by nuclei from attracting the boundaries.

Moving from a pixel outside the cell towards the centroid of its nucleus creates a transition from a (relatively) bright to a darker pixel at the time of entering the area of the cell (at the cytoplasm boundary). The first phase of each iteration can find such locations. However, finding the correct locations is often not an easy task because (1) these edge pixels are not always easily detectable because of low contrast and signal to noise ratio; and (2) the presence of artifacts and non-cells create spurious edges. The first issue can be addressed with a filter that smooths the transition locations using the calculated transition locations before and after. This step ensures that if enough edge pixels are detected correctly, a missing/incorrectly detected edge pixel will be recovered. To minimize the adverse effect of spurious edges in the first phase of each iteration, a rougher smoothing filter can be used to smooth those values and others values further from their smoothed values. The filter can be applied again to remaining values and the new estimated values are used to refine the boundary. A weight vector can also be defined to give a higher preference to edge pixels in the vicinity of the refined boundary at the previous iteration, or at approximated boundary from previous coarse refinement step. The details this step will now be discussed.

Suppose that the boundary contains pixels of coordinates $(c_x+r\Theta \cos \Theta, c_y+r\Theta \sin \Theta)$, for $\Theta=0, 1, \ldots, 359$, where $(c_x, c_y)$ are the coordinates of the nucleus centroid. In the first iteration, for each $\Theta \in \{0, 1, \ldots, 359\}$, a weight vector is defined (Equation 7) that contains the values of the composite of a sigmoid function with the normalized distance of points on the radial from the boundary point. A pixel corresponded to radius $\Theta$ and stride s, $p^s\Theta$ has the coordinates $(c_x+s \cos \Theta, c_y+s \cos \Theta)$. The gradient at $p^s\Theta$, $G(p^s\Theta)$), is defined as shown (Equation 8) where I(p) is the intensity of pixel p. For strides larger than $2r\Theta$ and for strides smaller than 0, the intensity is respectively set to a maximum or minimum. For each $\Theta \in \{0, 1, \ldots, 359\}$, $p^{i\Theta}$ is selected as the edge pixel (Equation 9).

After choosing the sequence of points on the boundary, the x-coordinates can be smoothed. To filter out the spurious edge pixels after the first smoothing, those pixels that have a distance greater than a threshold from their smoothed estimation can be discarded. The filter can be applied again to the remaining points and the new smoothed boundary can replace the previous estimated boundary. This can minimize the effect of the spurious or inaccurately selected pixels on the boundary evolution.

FIG. 11 shows how newly selected boundary points and smoothing affect the previous boundary of a cell in a synthetic image. The only difference between the first iteration and the following iterations is that in the following iterations the strides in Equation 7 are only considered from 0 through $r\Theta$. Therefore, in the first iteration the area may grow, but after that it only can shrink. Inflation in iterations other than the first iteration can be restricted because, if there are no strong edge pixels due to poor contrast, the boundaries usually expand until they reach to the cell clump boundary.

Figure 5A:
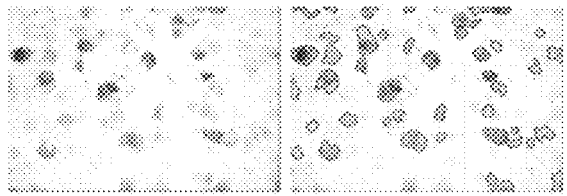
FIG. 5A shows two EDF images with variable brightness.
Figure 5B:
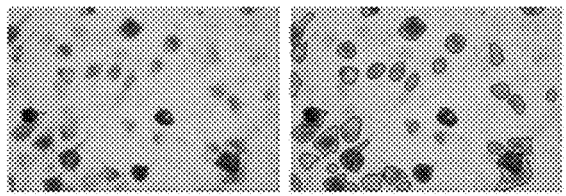
FIG. 5B shows the same two EDF images as FIG. 5A, after segmentation. Additionally, the Figure shows two EDF images from a histology section showing variable brightness.
Figure 6A:
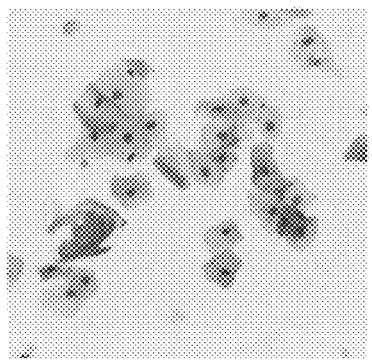
FIGS. 6A-6D shows step-wise results of EDF image processing using an automatic stereology framework according to the present invention.
Figure 6B:
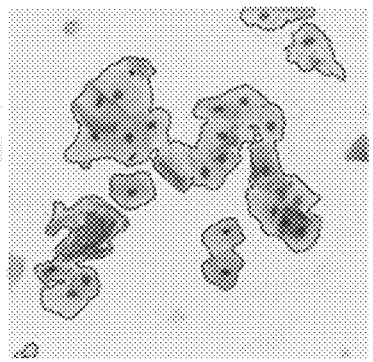
Figure 6C:
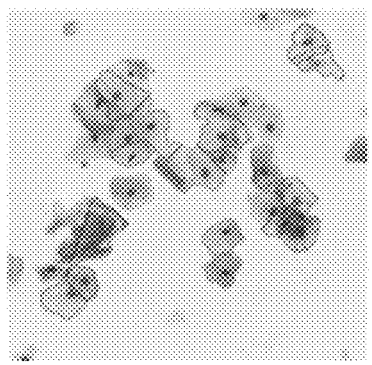
Figure 6D:
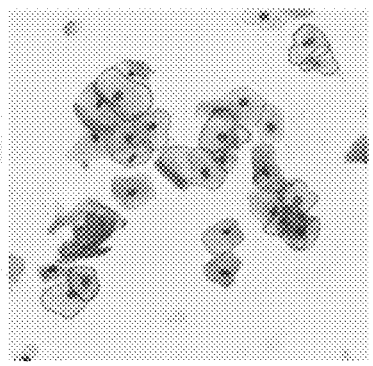

The iterations can continue until the ratio of the size of non-overlapping area (between the new and previous areas) to the size of previous area is negligible (e.g., less than 0.01). Except for a few parameters, e.g., minimum and maximum sizes for nuclei and cytoplasm, most of the parameters in the segmentation algorithm are set in an automatic and adaptive manner separately for each image, making the results of the automatic framework consistent with variations in image acquisition. An important factor that favors the accurate detection and segmentation of cells in each image stack is that the segmentation algorithm has been specifically designed to be resistant to low contrast. As part of the procedures for optimizing the present invention, a consistent mid-level of illumination can be determined. Because images collected in datasets will have varying brightness, intensity thresholds can be set adaptively by the estimated GMM for each image, allowing the algorithm to generate consistent segmentations for different cell types, staining intensities and microscope settings that cause brightness variation at the image and neuron levels under brightfield illumination, as seen in FIG. 5.

Embodiments of the subject invention provide an automation platform for scientists, such as neuroscientists, to complete unbiased stereology studies with greater accuracy, precision, speed, and lower costs. In some embodiments, the automatic stereology of the invention can use machine learning, including deep learning from a convolutional neural network (CNN) and adaptive segmentation algorithms (ASA) to segment stained cells from EDF images created from 3-D disector volumes. In other embodiments, the automatic stereology of the invention uses a deep belief network (DBN), including a forward propagating network comprising an input layer, a plurality of hidden layers, and an output layer. When used in neurological applications, the embodiments of the subject invention provide that the entire process from outlining a region of interest to providing results can take less than 30 minutes per brain. Compared to subjective counting with manual stereology, studies with the automatic stereology of the invention show greater accuracy and negligible variation from non-biological sources.

The CNN can include a convolutional layer, a Rectified Linear Unit (ReLU) layer, a pooling layer, and a fully connected (FC) layer. The convolution layer can comprises a plurality of filters configured to detect features of an input image. Each filter can share the same biases and weights, and analyze the same number of input neurons. The filter can convolve across the dimensions of the input image and compute a dot product of the filter and the image subset in order to generate a matrix or feature map. The convolution process can preserve the spatial relationship between the pixels. This process can be repeated for each filter in the convolution layer. In order to account for real world non-linearity, a Rectified Linear Unit (ReLU) operation can apply an activation function to the matrix to introduce a non-linear element to the matrix or image, as convolution is a linear operation. In order to reduce the number of parameters and computation in the CNN, a pooling layer can be inserted after the ReLU operation to reduce the dimensions of each matrix or feature map. The output matrix or image of the pooling layer can then be treated as an input image of a convolution layer. The above described basic steps of the CNN can be repeated to extract the desired output. The output of the final pooling layer can be an input for a Fully Connected (FC) Layer. The CNN can learn to count cells through the different methods including backpropagation, in which known images with known cell or target object counts are processed through the CNN and the accuracy or the error of the output can be recorded. If the cell number count provided by the CNN exhibits poor accuracy or high error, parameters can be adjusted to increase the accuracy of the CNN.

In some specific neurological applications, the invention provides automatic counts of immunostained neurons and glial cells in neocortex and CA1 of brains, such as mice and human brains. By removing manual stereology as the major obstacle to progress for many basic neuroscience and pre-clinical research studies, the automated stereology of the invention provides of novel strategies for therapeutic management of neurological diseases and mental illnesses.

In a semi-automatic mode of the invention, automatic stereology can provide a confirmation step following segmentation by an ASA and prior to deep learning by the CNN. The system can be additionally configured to permit a system user to manually count cells and override a processor generated determination of the cell count.

Previous applications of automatic image analysis of neural elements have focused on 2-D images on thin tissue sections. Conceptually, this approach is semi-quantitative because it cannot make accurate (unbiased) estimates of cell number due to sampling bias from the Corpuscle Problem (FIG. 12). The number of 2-D profiles (right) on a cut surface that appear by a knife passing through 3-D objects (left) is not equal to the true number of objects (left) because of bias related to the cell size, shape and orientation. According to the disector principle, unbiased stereology overcomes this bias by quantifying 3-D cells within a known volume. Similarly, the FAST approach overcomes this bias using EDF images. The EDF algorithm captures each cell in disector volumes at its maximum plane of resolution and then projects each cell onto an artificial 2-D plane (see, for example. FIG. 2b). EDF images of NeuN immunostained neurons). As a result, the cell number on the EDF image equals the true number of cells in the disector volume. The use of unbiased counting rules (exclusion planes) avoids bias due to edge effects. Combining ASA for segmenting NeuN-stained neurons is a first-in-class use of EDF images for unbiased stereology. Neural networks have been used to solve a variety of problems and tasks in different industries (Speech & Image Recognition. Marketing, Retail & Sales, Banking & Finance) with a large and increasing number of image analysis applications to biomedical problems. Certain embodiments of the invention provide application of a CNN to segment immunostained neurons, astrocytes, and microglia cells on high resolution EDF images for unbiased stereology of cell number. To reduce time and effort for generating ground truth for training the model. ASA is applied to train the model. For this approach the annotations are created by preprocessing images of immunostained cells on EDF images, learning a Gaussian Mixture Model on each individual image, thresholding and post-processing the images. An end user can manually edit the segmented image to create a sophisticated training dataset for training the neural network. Importantly, this confirmation step in the creation of the training dataset will also address customer needs to interact with the data collection process, as opposed to accepting fully automatic results.

The number of cells within each disector can be determined and used for calculation of total cell number using the unbiased optical fractionator method. According to this approach for scaling from local (disector) to region (cortex. CA1) levels, as sampling increases the estimate of neuron number progressively converges on the true value. Once the sampling error is sufficiently low, e.g., coefficient of error (CE) less than 10% (CE<0.10), the estimate will be considered stable. To achieve optimal estimates, sampling stringencies for cells and disectors can be determined within each region. As such, the invention provides employing a combination of ASA/CNN to segment neural elements for stereology analysis.

Certain embodiments of the invention provide an effective segmentation method for different neural elements stained with different colorimetric protocols and in brain regions with different packing densities. To overcome this barrier. CNN can be used (Unet) to segment neurons that are immunostained with high signal: noise (S: N) immunomarkers, e.g., NeuN for neurons, and then tune this CNN to segment microglia and astrocytes stained with similarly high S:N immunostains (Iba-1 and GFAP, respectively).

In other embodiments separate ASAs are developed and optimized for each neural element (neurons and glial cells) immunostained with defined staining protocols. Both approaches allow for a range of pre- and post-processing steps, leading to increased confidence that the technical risks can be overcome using CNN, ASAs, or a combination of the two.

FIG. 20 shows an example stereology system that may be used to implement features described above with reference to FIGS. 1-29. The stereology system includes a microscope 100, a digital camera 110, a motorized stage 120, x, y, and z axis motors, a dual stage micrometer, a digital imaging system, a processor, a memory device, a communication interface connecting the microscope and a computer readable medium, a computer 200, a high definition monitor 210, a keyboard 220, and a mouse 230.

The communication interface connecting the microscope and the computer readable medium can be, for example, a communications port, a wired transceiver, a wireless transceiver, and/or a network card. The communication interface can be capable of communicating using technologies such as Ethernet, fiber optics, microwave, xDSL (Digital Subscriber Line), Wireless Local Area Network (WLAN) technology, wireless cellular technology, BLUETOOTH technology and/or any other appropriate technology.

Figure 20:
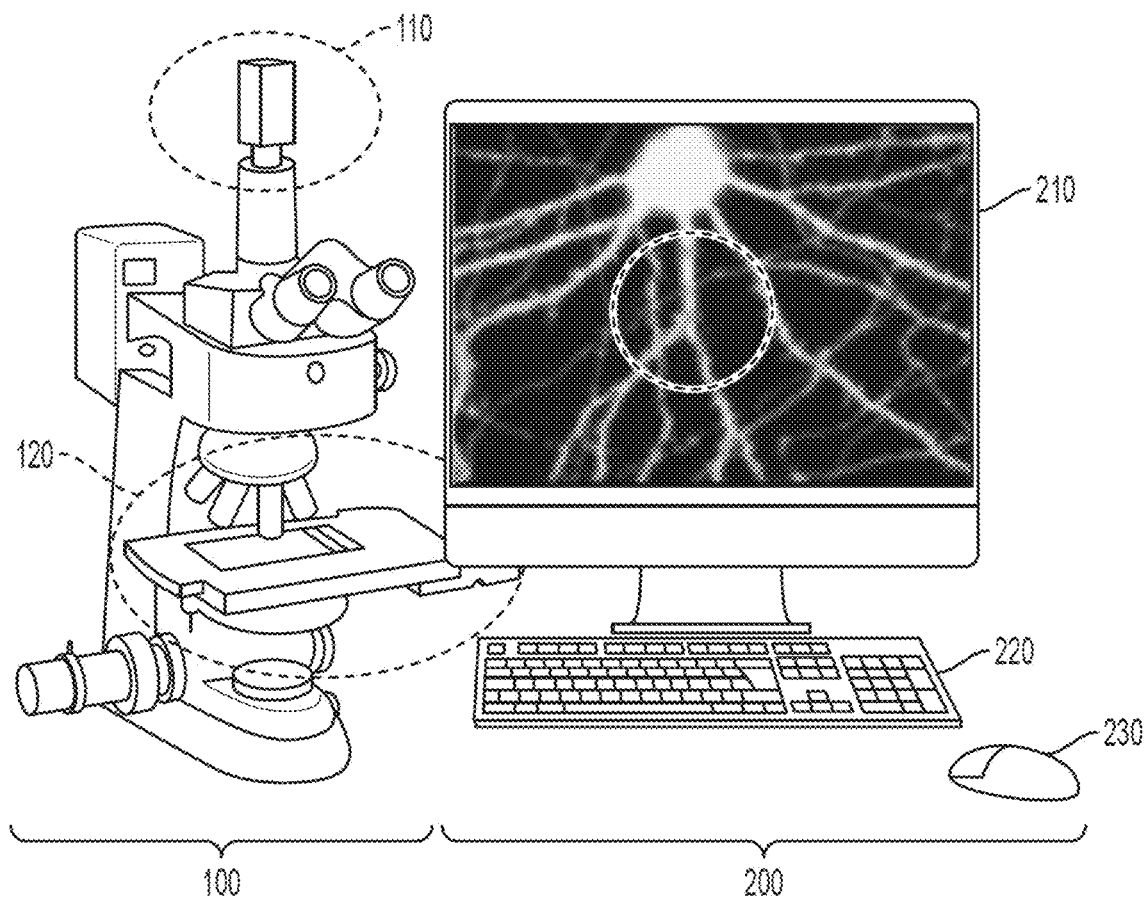
FIG. 20 shows an image of a stereologer system according to an embodiment of the subject invention.

Embodiments of the stereologer system of FIG. 20 may be configured to perform any feature or any combination of features described herein. In certain embodiments, the computer readable medium may store instructions which, when executed by the processor, cause the processor to perform any feature or any combination of features described above.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

Although FIG. 20 shows that the stereology systems includes a single microscope 100, a single digital camera 110, a single motorized stage 120, a single computer, 200, a single display 110. A single keyboard 120, and a single mouse 230, the stereologer system may include multiples of each or any combination of these components, and may be configured to perform, analogous functionality to that described herein.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments.

Embodiment 1. A method for performing computerized stereology, comprising:

providing an imager for capturing a Z-stack of images of a three-dimensional (3D) object, the Z-stack of images being a sequence of images of the 3D object captured in increments having a step size along a z-axis of the 3D object;

constructing extended depth of field (EDF) images from the Z-stack of images;

performing a segmentation method on the EDF images including estimating a Gaussian Mixture Model (GMM), performing morphological operations, performing watershed segmentation, constructing Voronoi diagrams and performing boundary smoothing; and determining one or more stereology parameters.

Embodiment 2. A method for performing computerized stereology, comprising:

providing an imager for capturing a Z-stack of images of a three-dimensional (3D) object, the Z-stack of images being a sequence of images of the 3D object captured in increments having a step size along a z-axis of the 3D object, wherein the 3D object is a tissue sample;

constructing extended depth of field (EDF) images from the Z-stack of images;

performing a segmentation method on the EDF images including nucleus detection and segmentation, clump segmentation, cytoplasm segmentation, boundary approximation, course refinement, and fine refinement; and determining one or more stereology parameters.

Embodiment 3. The method for performing computerized stereology of embodiment 2, wherein the nucleus detection and segmentation includes blurring the EDF images using a 2-D adaptive noise-removal filter, and iteratively binarizing the EDF images starting with a low threshold to find seed points from different nuclei.

Embodiment 4. The method for performing computerized stereology of according to any of embodiments 2-3, wherein the nucleus detection and segmentation includes removing small and concave regions after each binarization and adding remaining regions to a nucleus mask.

Embodiment 5. The method for performing computerized stereology of according to any of embodiments 2-4, wherein the nucleus mask keeps nuclei segmented at each execution phase of the segmentation method.

Embodiment 6. The method for performing computerized stereology of according to any of embodiments 2-5, wherein the clump segmentation includes learning a Gaussian Mixture Model (GMM) with two components on pixel intensities using an Expectation Maximization (EM) algorithm.

Embodiment 7. The method for performing computerized stereology of according to any of embodiments 2-6, wherein a first Gaussian estimates a distribution of foreground pixel intensities and a second estimates background pixel intensities.

Embodiment 8. The method for performing computerized stereology of according to any of embodiments 2-7, wherein cytoplasm segmentation includes approximating a cytoplasm boundary of a nucleus by assigning parts of the EDF images that have a focus measure similar to the nucleus and are relatively close.

Embodiment 9. The method for performing computerized stereology of according to any of embodiments 2-8, wherein the course refinement includes applying a grid to the EDF images, and applying a limited level of concavity by defining reachability notation and removing grid squares that are not reachable from a nucleus centroid, followed by discretization.

Embodiment 10. The method for performing computerized stereology of according to any of embodiments 2-9, wherein the fine refinement includes a pixel level iterative process and replacing each nucleus region's pixel intensity with a mean intensity of the nucleus region's outer boundary.

Embodiment 11. A method for performing computerized stereology, comprising:

providing an imager for capturing a Z-stack of images of a three-dimensional (3D) object, the Z-stack of images being a sequence of images of the 3D object captured in increments having a step size along a z-axis of the 3D object;

constructing extended depth of field (EDF) images from the Z-stack of images;

performing clump segmentation on the EDF images by binarizing the EDF images using a threshold determined by estimating a Gaussian Mixture Model to pixel intensities;

preprocessing the EDF images by converting the EDF images into grayscale and opening by reconstruction followed by closing by reconstruction;

performing watershed segmentation on the EDF images, wherein regional minimas are extracted as foreground markers and boundaries between regions are used as background markers, and the watershed segmentation is applied using the background and foreground makers that overlap with clumps;

constructing Voronoi diagrams and smoothing, including constructing a Voronoi map using centers of foreground regions and refining region boundaries using a Savitzy-Golay filter; and determining one or more stereology parameters.

Embodiment 12. The method for performing computerized stereology of embodiment 11, wherein the clump segmentation includes segmenting clumps of regions in the EDF images by a GMM with two components estimated based on pixel intensities using an Expectation Maximization Algorithm.

Embodiment 13. The method for performing computerized stereology of according to any of embodiments 11-12, wherein the preprocessing includes smoothing the EDF images and removing small dark or bright regions.

Embodiment 14. The method for performing computerized stereology of according to any of embodiments 11-13, wherein the preprocessing includes connecting relatively close regions and removing small region minimas.

Embodiment 15. The method for performing computerized stereology of according to any of embodiments 11-14, wherein the foreground and background markers are region minimas extracted from preprocessed EDF images.

Embodiment 16. The method for performing computerized stereology of according to any of embodiments 11-15, wherein the watershed segmentation expands original regional minimas to give a better approximation of neuron boundaries.

Embodiment 17. The method for performing computerized stereology of according to any of embodiments 11-16, wherein the constructing Voronoi diagrams and smoothing includes not splitting a region if the region's size is less than a maximum threshold and solidity of the region obtained by the refined boundary of an original region is greater than an average solidity of all regions.

Embodiment 18. The method for performing computerized stereology of according to any of embodiments 11-17, wherein the constructing Voronoi diagrams and smoothing includes not splitting a region if the region's size is less than a maximum threshold and solidity of the region obtained by the refined boundary of an original region is greater than an average solidity of all regions.

Embodiment 19. The method for performing computerized stereology of according to any of embodiments 11-18, wherein in determining a number of cells, segmented regions are removed that do not overlap with a region of interest or overlap exclusion lines of a disector frame.

Embodiment 20. The method for performing computerized stereology of according to any of embodiments 19, wherein a total number of cells (N) is determined according to the following equation:

$$\text{Total } N = [\Sigma Q-] \cdot F1 \cdot F2 \cdot F3$$

wherein F1 is the reciprocal of the section sampling fraction (ssf); F2 is the reciprocal of the area sampling fraction (asf); and F3 is the reciprocal of the thickness sampling fraction (tsf).

Embodiment 21. The method of performing computerized stereology of embodiment 20, further comprising providing a processor in operable communication with a computer-readable medium, wherein the instructions stored on the computer readable-readable medium, when executed, cause the processor to:

generate a three dimensional computer simulation of the three-dimensional object;

generate an x-stack of sections being a sequence of sections of the three dimensional computer simulation captured in increments having a step size along a x-axis of the three dimensional computer simulation; and determine a number of cells contained in the three dimensional simulation from a x-direction.

Embodiment 22. The method of performing computerized stereology of embodiment 21, further comprising providing a processor in operable communication with a computer-readable medium, wherein the instructions stored on the computer readable-readable medium, when executed, cause the processor to:

generate a three dimensional computer simulation of the three-dimensional object;

generate an y-stack of sections being a sequence of sections of the three dimensional computer simulation captured in increments having a step size along a y-axis of the three dimensional computer simulation; and determine a number of cells contained in the three dimensional simulation from a y-direction.

Embodiment 23. A method for computerized stereology, the method comprising providing a providing an imager of a Z-stack of images of a three-dimensional (3D) object, the Z-stack of images being a sequence of images of the 3D object captured in increments having a step size along a z-axis of the 3D object;

providing a processor in operable communication with a computer-readable medium, wherein the instructions stored on the computer readable-readable medium, when executed, cause the processor to:

access a deep learning structure retained in the computer-readable medium, wherein the deep learning structured model comprises a plurality of layers with weights and biases assigned thereto; and configuring the deep learning structured model to:

construct extended depth of field (EDF) images from the Z-stack of images;

perform clump segmentation on the EDF images by binarizing the EDF images using a threshold determined by estimating a Gaussian Mixture Model to pixel intensities;

preprocess the EDF images by converting the EDF images into grayscale and opening by reconstruction followed by closing by reconstruction;

perform watershed segmentation on the EDF images, wherein regional minimas are extracted as foreground markers and boundaries between regions are used as background markers, and the watershed segmentation is applied using the background and foreground makers that overlap with clumps;

construct Voronoi diagrams and smoothing, including constructing a Voronoi map using centers of foreground regions and refining region boundaries using a Savitzy-Golay filter; and determine one or more stereology parameters.

Embodiment 24. The method of embodiment 23, wherein the deep learning structure is a convolutional neural network.

Embodiment 25. The method of embodiment 24, wherein the convolutional neural network comprises a plurality of convolutional layers, Rectified Linear Unit (ReLU) layers, pooling layers, and a fully connected (FC) layer.

Embodiment 26. The method according to any of the embodiments 23-25, wherein the convolutional neural network comprises:

19 convolution layers, 4 max pooling layers, and 4 up-sampling convolution layers.

Embodiment 27. The method of performing computerized stereology according to nay of embodiments 23-26, further comprising:

further configuring the deep learning structure to:

generate a three dimensional computer simulation of the 3D object;

generate an x-stack of sections being a sequence of sections of the three dimensional computer simulation captured in increments having a step size along a x-axis of the three dimensional computer simulation; and determine a number of cells contained in the three dimensional simulation from a x-direction.

Embodiment 28. The method of performing computerized stereology according to any of embodiments 23-27, further comprising:

further configuring the deep learning structure to:

generate a three dimensional computer simulation of the three-dimensional object;

generate an y-stack of sections being a sequence of sections of the three dimensional computer simulation captured in increments having a step size along a y-axis of the three dimensional computer simulation; and determine a number of cells contained in the three dimensional simulation from a y-direction.

Embodiment 29. The method of performing computerized stereology according to any of embodiments 23-28, further comprising:

providing a processor in operable communication with a computer-readable medium, wherein the instructions stored on the computer readable-readable medium, when executed, cause the processor to:

generate a three dimensional computer simulation of the three-dimensional object;

generate a Z-stack of section being a sequence of sections of the three dimensional computer simulated model captured in increments having a step size along a z-axis of the three dimensional computer simulation; and determine a number of cells from a z-direction.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

EXAMPLE 1

The performance of a segmentation algorithm can be evaluated after the segmentation ground truth is collected. Results from ASM and ground truth were correlated along with other analytic metrics (see, for example, Table 1, below). One of the popular measures to evaluate the segmentation performance is the Dice Similarity Coefficient (DSC). For two regions, A and B, DSC(A,B) is defined as:

$$\frac{2|A \cap B|}{|A| + |B|},$$

where $|\cdot|$ is the area of the region. The Dice Similarity Coefficient (DSC) of two regions A and B is defined as shown in Equation 10 of FIG. 8. Other evaluation metrics include False Negative Rate at object level (FNRo), True Positive Rate at pixel level (TPRp) and False Positive Rate at pixel level (FPRp). A segmented cell in the ground truth is considered missed if there is no region in the segmentation result that has a DSC greater than 0.7. FNRo is the rate of cells missed in the ground truth and TPRp and FPRp are the average of true positive and false positive rates, respectively, at pixel levels of those regions that are not missed.

From the viewpoint of algorithm segmentation, following adjustments to maxima and minima settings, the morphological characteristics of different cells are quite similar. It is expected that the automatic stereology framework will miss less than 5% of cells on average when the pairwise cell overlapping degree is not higher than 0.3. Prior to optimization, the algorithm is expected to detect nuclei with precision greater than 0.95 and recall greater than 0.90, and miss around 20% of cells in EDF images for a Dice Similarity Coefficient less than 0.7. The 20% miss rate is around half of the average miss rate reported for subjective assessments using conventional methods for manual stereology.

EXAMPLE 2

All procedures for animal handling and use were approved by the USF Institutional Animal Care and Use Committee and followed NIH guidelines for the care and use of laboratory animals. Two Tg4510 male mice aged 6-8 months and two age- and sex-matched non-tg littermate controls were selected at random from the colony at the Byrd Alzheimer's Institute at the University of South Florida in Tampa, FL. To validate the ASF for counting Neu-N immunostained neurons, the well-characterized Tg4510 line was chosen with responder and activator transgenes that drive expression of a P301L tau mutation under control of a tetracycline operon-responsive element. Rather than testing for a specific hypotheses related to tauopathies, neurodegeneration or neuroinflammation, this line of tg mice was selected because the brains show a wide range of neocortical cell morphologies under high power brightfield illumination, including normal and damaged neurons and resting/activated states of neuroglia cells.

Mice were deeply anesthetized on an isothermal pad and perfused with 25 ml of cold sterile buffered saline. Brains were removed and one hemisphere immersion fixed for 24 hours in freshly prepared phosphate buffered paraformaldehyde. After fixation, brains were transferred to Dulbecco's phosphate buffered saline and stored at 4° C. Prior to sectioning, brains were cryoprotected in 10, 20 and 30% sucrose. Frozen 50-μm sections were collected with a sliding microtome, transferred to 24 well plates in Dulbecco's phosphate buffered saline and stored at 4° C. One set of every $n^{th}$ section was sampled in a systematic-random to obtain 6-8 sections through each neocortex.

Sampled sections were immunostained with Neu-N antibodies for high S: N visualization of neurons. Sections from all animals were placed in a multi-sample staining tray and endogenous peroxidase was blocked (10% methanol, 3% $H_2O_2$ in PBS: 30 min). Tissue samples were permeabilized (with 0.2% lysine, 1% Triton X-100 in PBS solution) and incubated overnight in an appropriate primary antibody. Anti-NeuN (Millipore, Darmstadt, Germany) antibodies were used in this experiment. Sections were washed in PBS, and then incubated in corresponding biotinylated secondary antibody (Vector Laboratories, Burlingame, CA). The tissue was again washed after 2 h and incubated with Vectastain®; Elite®; ABC kit (Vector Laboratories) for enzyme conjugation. Finally, sections were stained using 0.05% diaminobenzidine and 0.03% $H_2O_2$. Tissue sections were mounted onto slides, dehydrated, and cover slipped.

An algorithmic variation was developed and optimized from an ensemble of segmentations algorithms and Seed Detection-Region Growing approaches. The purpose of the developed algorithm was to automatically segment high S: N neurons on EDF images. The numbers of neurons within disector volumes was used to calculate total neuron number in a reference volume using the unbiased optical fractionator method [Equation 1].

Since the regions of interest (neuronal cell bodies) have arbitrary sizes, shapes, and orientations, none of these features can be assumed a priori for either the segmentation step or quantification using unbiased stereology. The segmentation method applied was a combination of Gaussian Mixture Model (GMM), morphological operations, watershed segmentation, Voronoi diagrams and boundary smoothing, as detailed above. FIG. 1 shows the visual results of successive steps in the segmentation of an EDF image. Black regions are removed due to not overlapping with cells of interest, red regions are excluded due to overlapping with exclusion lines, and blue regions are neuron targets for automated counting. Green marks are manual marks inside blue regions, yellow marks are automated marks not counted manually, and red marks are missed manual marks. FIG. 1A shows a microscopy image with an unbiased disector frame used for manual counts. FIG. 1B is an EDF image constructed from the z-stack of images (disector stack) used for neuron segmentation. The final segmentation result is illustrated in FIG. 1I, where inclusion (green) and exclusion (red) lines shown in the original image are used by a manual optical disector and the automatic framework for counting neurons independent of their geometric properties (size, shape, and orientation).

Clumps of regions (Neu-N neuronal cell bodies) in the image were segmented by a Gaussian Mixture Model (GMM) with two components estimated based on pixel intensities using an Expectation Maximization (EM) algorithm. The image was binarized using a threshold computed by a background Gaussian quantile function value and morphological operations followed to extract the separate clumped neuron regions (FIG. 1C).

The image was preprocessed by morphological operations with opening by reconstruction followed by closing by reconstruction. These operations smooth the image and remove very small dark or bright regions (FIG. 1D) while connecting very close regions and removing very small region minimas.

After preprocessing, the image foreground and background markers were extracted for watershed segmentation. The foreground and background markers are region minimas extracted from the preprocessed image (FIG. 1E) and boundaries between regions of a watershed segmentation (FIG. 1F), respectively. Region minimas select for neurons and remove regions that do not fall into previously segmented neuron clumps.

The watershed segmentation was applied using the foreground and background markers previously described. One of the regions corresponded to the background and the others were foreground regions. Foreground regions that overlap with the map of segmented clumps were kept and the others discarded (FIG. 1G). This watershed segmentation usually expands original regional minimas and gives a better approximation of neuron boundaries. Lastly, each of the clump regions were split using the Voronoi diagrams obtained by the watershed regions within (FIG. 1H).

In the final step, the region boundaries were refined using Savitzky-Golay filter. This filter results in smoother boundaries and produces less concave regions. It was observed that a region containing a single neuron may be split into two or more subregions if more than one regional minima were detected. To diminish the adverse effect of such splits, a region was not split if its size was less than a maximum threshold and the solidity of the region obtained by the refined boundary of original region was larger than the average solidity of all regions obtained by the refined boundaries of subregions. For the final neuron count, segmented regions were removed that 1) do not overlap with the region of interest; or 2) overlap the exclusion lines of the disector frame. The number of remaining regions were chosen as the number of neurons that should be counted. This number summed across all sections [$\Sigma Q^-$] was used to estimate the total number of Neu-N immunopositive neurons [Total $N_{NeuN}$] by an optical fractionator formula:

$$\text{Total } N_{NeuN} = [\Sigma Q^-] \cdot F1 \cdot F2 \cdot F3$$

where F1 is the reciprocal of the section sampling fraction (ssf); F2 is the reciprocal of the area sampling fraction (asf); and F3 is the reciprocal of the thickness sampling fraction (tsf).

EXAMPLE 3

An empirical study was carried out to determine optimal image magnification. Neu-N neurons were counted using manual stereology (ground truth) and the automatic framework on images collected at high power [100× Plan Fluorite, n.a. 1.3] and low power (40× Plan Acromat, n.a. 0.65) by the following procedure. At high power, a trained technician counted Neu-N neurons using the manual optical disector (ground truth) with assistance from the Stereologer system [Stereology Resource Center (SRC), Tampa, FL]. At the first random x-y location on the first section, Neu-N neurons were counted by thin focal-plane optical scanning through a 10-um high disector. Before moving to the next disector location, a stack of ten images about 1 um apart in the z-axis (so-called disector stacks) were captured and saved for analysis using the automatic framework. This process of manual optical disector counting and saving disector stacks was repeated at 200 to 300 systematic-random x-y locations across 7 systematically sampled sections through neocortex.

On completion, images in each disector stack were merged into a single synthetic Extended Depth of Field (EDF) image. Disector stacks combined into a single EDF image show all Neu-N neurons in focus, allowing the segmentation algorithm to be applied to a single high power image (see, for example, FIG. 2 (lower)). The above process was repeated at low power (40x), and a second set of disector stacks collected and EDF images created (see, for example, FIG. 1 (upper))]. In the analysis step, ground truth and algorithm counts for NeuN neurons were correlated for the purpose of assessing whether cells magnified by low or high power lens give superior results for the automatic framework. The lower right panel shows disector frame and outlines of NeuN neurons automatically counted by thin focal plane scanning and optical fractionator method.

There was a slightly better correlation ($R^2$=0.95, FIG. 2 upper) at low power (40x) between Neu-N neuron counts for ground truth and the automatic framework in the same disector volumes. The higher correlation for the low power images, however, does not reflect true (accurate) numbers of NeuN neurons in each disector volume due to over-projection and masking. As shown in FIG. 2, over-projection causes cells that overlap in the z-axis to be difficult to resolve as more than one cell. Also, larger cells in the z-axis can mask the presence of smaller ones, resulting in multiple cells that cannot be resolved as more than one. Both of these imaging artifacts arise from image capture using the high depth of field 40x40 lens. This view is supported by the fact that fewer neurons were counted by the low power lens (data not shown). In contrast, the results for Neu-N neuron counts using ground truth and the automatic framework on disector volumes captured at high power showed a slightly lower correlation [($R^2$=0.90, FIG. 2 (lower)]. Over-projection and masking artifacts in these disector volumes could be practically fixed by applying a modified segmentation algorithm with advanced post-processing steps, e.g., a classifier to indicate likely split or overlapping neurons. For images captured at low power, the same classifier approach could not resolve the correct number of neurons due to the high depth of field of the low power lens. Another argument in favor of high power is that the optical fractionator method requires section thickness measurements which are determined manually and automatically by thin focal plane scanning through the z-axis to find the upper and lower optical planes of each section. The high depth of field (thick focal plane) of the low power lens again prevents precise localization of these optical planes. In contrast, the thin focal plane of the high power lens, which has twice the resolving power of the lower power lens, allows for precise localization of the upper and lower section surfaces. To ensure counts are accurate, therefore, both ground truth and ASF counts require high power magnification with a thin focal plane (low depth of field) objective lens.

Ground truth and automatic counts of Neu-N neurons were assessed in the same disector volumes using the following procedure. Six to 8 systematically sampled sections were prepared from each of two (2) Tg4510 mice (Tg-3, Tg-21) and two (2) non-tg controls (Ntg-2, Ntg-9). Two technicians with equivalent training and experience collected ground truth datasets using the manual optical disector (Gundersen et al., 1988 a,b). Sampling was carried out at sufficient x-y locations to achieve high sampling stringency (CE<0.05). As detailed above, after manual optical disector counting, disector stacks were collected in the z-axis for neuron counts by the automatic framework.

The counts of Neu-N neurons for disector stacks analyzed by ground truth and the automated framework were summed to give the neuron counts across 6 to 8 sections for each case (FIG. 4). Correlations between the automatic framework and ground truth were assessed by the coefficient of determination ($R^2$). Analysis of variation for total number of neocortical Neu-N neurons in the Tg4510 mice and non-tg controls was done by a two-tailed T-test with genotype as the independent variable and statistical significance at p<0.05.

Table 1 presents the ground truth and automated counts and correlations for the sum of all 85 sections analyzed for 4 different cases. The average value for two data collectors was used for mouse 02 values.

TABLE 1

Neu-N neurons counts by ground truth vs. automatic stereology in the same disectors of different 4 mice*.
$R^2$ = correlation for manual and automatic counts.

| Collector (C) | Mouse ID | Ground Truth | Auto. Count | $R^2$ |
| --- | --- | --- | --- | --- |
| C1, C2* | 02 | 1249 | 1238 | ≥0.98 |
| C2 | 21 | 858 | 878 | ≥0.98 |
| C1 | 03 | 570 | 603 | ≥0.98 |
| C1 | 09 | 558 | 697 | ≥0.98 |

*average counts between two collectors (C1 and C2) for the same brain.

Correlations for ground truth and the automated framework are shown in Table 2. The correlations show uniformly close relationships between Neu-N neuron counts by both approaches ($R^2$>0.98). Inter-rater reliability for ground truth was assessed by two technicians analyzing different systematic-random disector locations on the same sections through brain 02 ($R^2$=0.95; data not shown). The average value of both data collectors for this brain were used for comparison with results from the automatic framework.

FIGS. 4(a)-(e) are plots of manual and automated cell counts of different tissue sections. These plots of NeuN neuron counts by section show relative agreement between the objective automated framework and subjective manual counts by two data collectors (C1 and C2). The residual errors in these correlations arise from both approaches. FIG. 4 shows plots for the manual and automated counts for each of the 5 comparisons in Table 2. Results for counts of Neu-N immunostained neurons in neocortex of Tg4510 mice and non-tg controls are shown in Table 2. Comparison of mean Neu-N neuron counts by ground truth and the automatic framework showed a 7% difference for the non-tg mice and a 4% difference for Tg4510 mice. For the ground truth dataset, there was a 24% difference in neuron number (p<0.11, ns). This difference was slightly higher (27%) using the automatic framework, which did reach statistical significance (p<0.04).

TABLE 2

Comparison of ground truth (manual optical disector) and the automatic stereology framework (ASF) for total number (+/−SEM) of Neu-N neurons in neocortex of Tg4510 mice an non-Tg controls.

| Group | N | Ground Truth | | ASF | | % diff$_{NeuN}$ |
|---|---|---|---|---|---|---|
| | | Mean Neu-N | SEM$_{NeuN}$ | Mean Neu-N | SEM$_{NeuN}$ | |
| Non-Tg (n = 2) | 2 | 1.30E+06 | 1.18E+5 | 1.39E+06 | 7.71E+04 | +7 |
| Tg4510 (n = 2) | 2 | 9.81E+05 | 2.76E+3 | 1.02E+05 | 1.41E+04 | +4 |
| % diff$_{NeuN}$ | | −24 | | −27 | | |

Since brightness varies at the image and neuron levels under brightfield illumination, intensity thresholds used for the segmentation step must be set adaptively. The GMM component of the algorithm is estimated by pixel intensities of each image separately. As shown in FIG. 5, the whole framework is resistant to brightness variation.

This validation study showed a high correlation ($R^2$>0.98) between the ASF and ground truth for Neu-N counts. With regard to throughput efficiency, the ASF required about 30 minutes to achieve a high level of sampling stringency (CE=0.05). In contrast, two moderately experienced technicians both required about 8 times longer (about 4 hours) using manual stereology to estimate Neu-N number to a comparable sampling stringency on the same sections. With regard to reproducibility, a single inter-rater comparison showed a difference of about 0.05 (95% agreement) for two technicians to analyze different samples of disectors in a single brain. In contrast, intra- and inter-variability for the ASF by the same and different operators is negligible. Except for a few parameters such as minimum and maximum sizes for neuron regions, most of the parameters in the framework are set in an automatic and adaptive manner separately for each image, making the results of the framework consistent with variations in image acquisition. Because images collected in the dataset had varying brightness (FIG. 5), intensity thresholds were set adaptively by the estimated GMM for each image, allowing the ASF to produce consistent segmentations for different cell types, staining intensities and microscope settings. Despite the low statistical power in this study, both the ground truth and ASF showed evidence of cortical neuron loss in brains of Tg4510 mice at 6-8 months of age as previously reported.

In this validation study, cell counts using the automatic framework strongly correlates with counts in exactly the same disector volumes using the manual optical disector. Furthermore, this approach allows for examination of the basis for discrepancies between the ASF and "ground truth." On sections with the lower ground truth counts, e.g., sections 1-7 in FIG. 4 (c), the vast majority of mismatches occur when the data collector fails to resolve overlapping neurons. The ASF according to the present invention handles this situation better by applying the segmentation algorithm to split each cell at its optimal plane of focus in 3-D.

The EDF image shows each cell at its maximal plane of focus in the disector volume. Segmentation of these profiles is required to count those inside the disector frame and not overlapping with exclusion planes. In addition to this purpose, segmented cell profiles are useful for estimating the size distribution using unbiased local size estimators, as has been previously reported. The incorporation of cell size into the results further improves the framework's throughput efficiency vis-à-vis ground truth since estimating cell size requires negligible time and effort compared to cell number alone. By contrast, estimation of cell number and size requires twice the time and effort for the manual stereology workflow compared to cell number alone.

The high correlation of Neu-N counts by manual and automatic approaches (Table 1) shows the framework can be practically used to automate the time- and labor-intensive task of cell counting by unbiased stereology. The total processing time for the automatic approach was between 25 and 30 minutes for counting immunostained cells in a single reference space. This time includes low-power outlining of the reference area and automatic capture of disector stacks on each section (18 to 20 minutes), and a computation time of about 6 to 8 minutes to create EDF images and run the algorithm. It is expected that analyzing images in RAM will decrease the analysis time per case to about 20 minutes or less.

EXAMPLE 4

Figure 15:
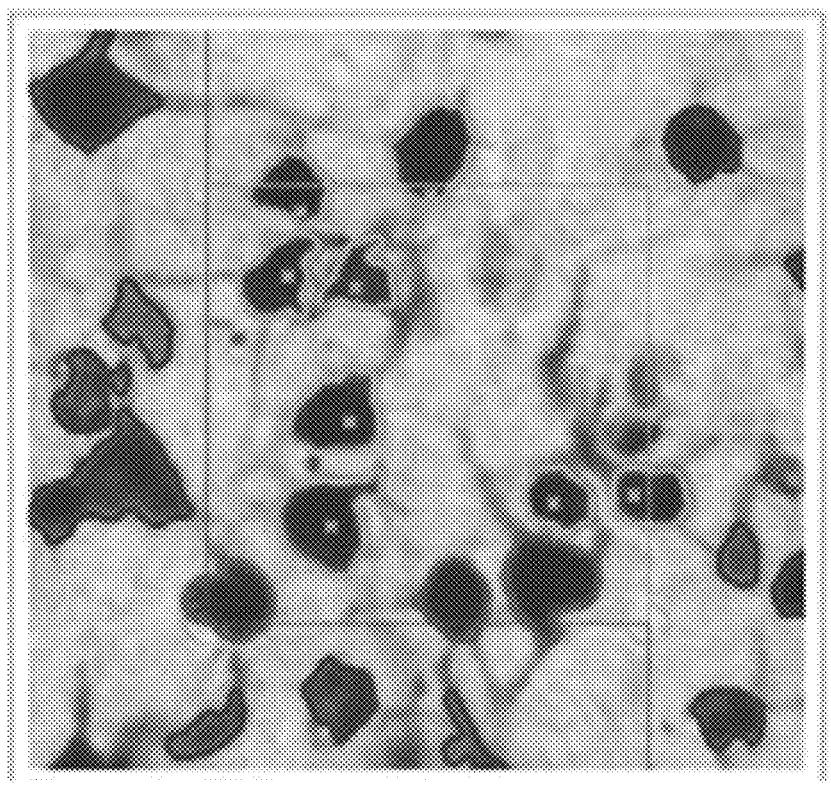
FIG. 15 EDF image showing neurons segmented by ASA method.
Figure 16:
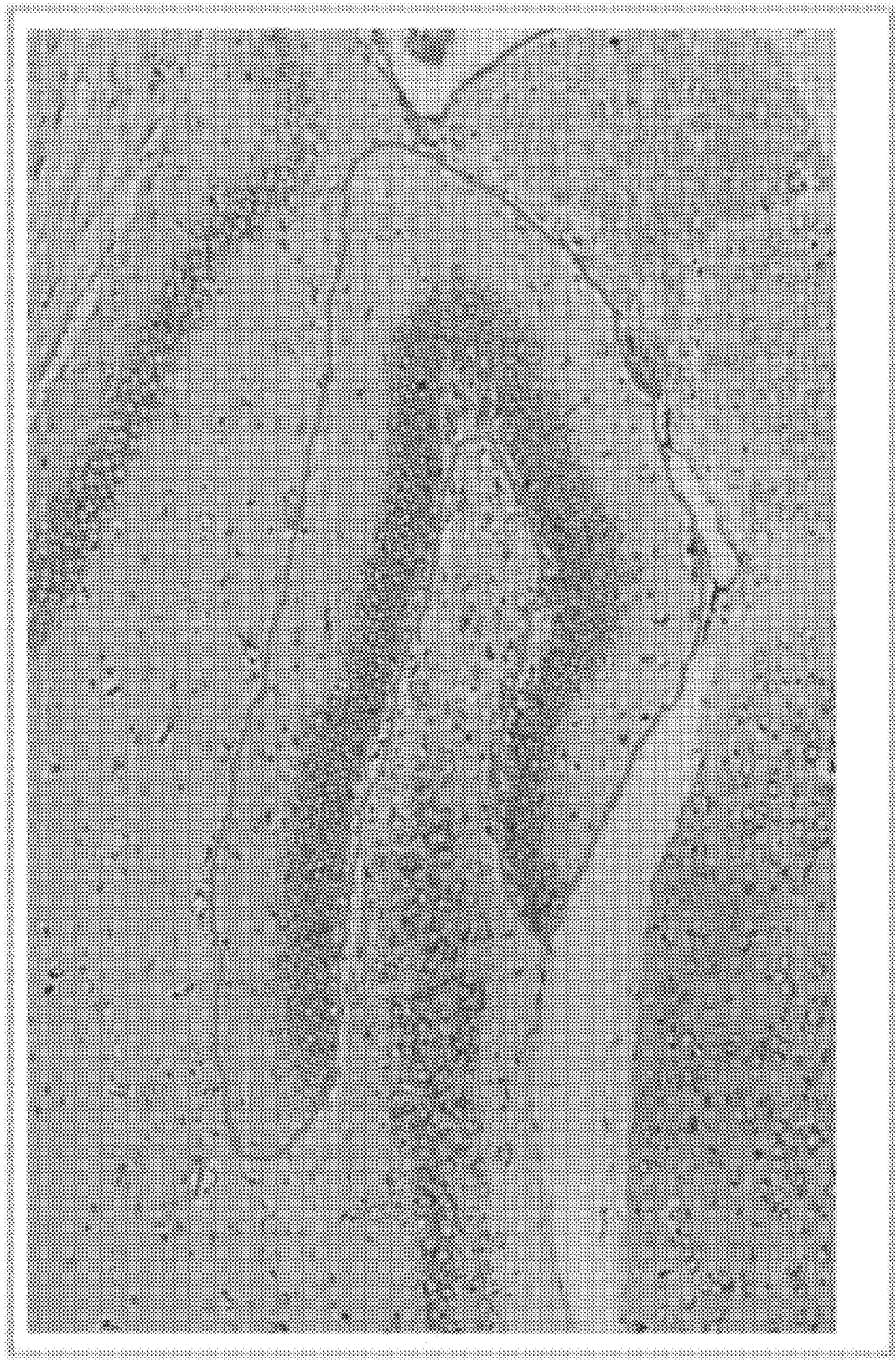
FIG. 16 shows outlined reference space on tissue sections of mouse brain.

This example combines existing hardware for computerized stereology with software driven by deep learning from a CNN. The CNN automatically segments immunostained neurons, astrocytes and microglial cells on images of 3-D tissue volumes (disector stacks: for EDFs, see FIG. 2(b) for neurons. FIG. 15 for astrocytes and microglia) and make unbiased estimates of total cell numbers using the automatic optical fractionator method.

Figure 14:
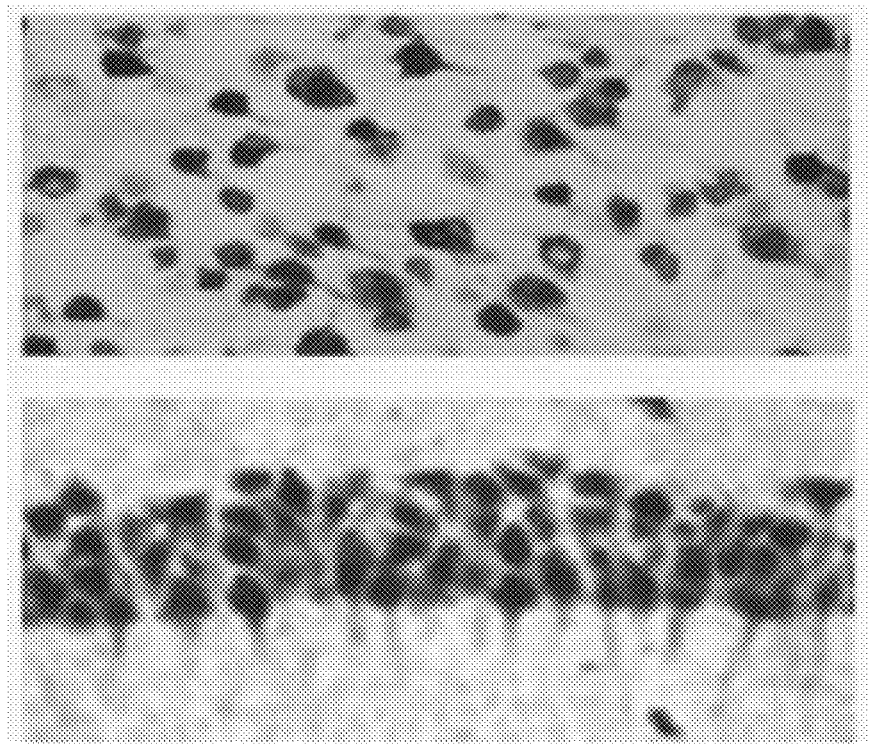
FIG. 14 shows NeuN immunostained neurons in mouse brain section. Example of low (cortex: upper) and high (CA1: lower) packing density.

The optical fractionator method can provide an unbiased stereology estimate of cell number provided the cells can be effectively segmented. Separate adaptive ASAs can be used to segment each cell type or deep transfer learning can be used to train a CNN to segment cells. The ASA approach can require adjusting parameters and other customization steps (pre- and post-processing) to accurately segment cells with variable morphologies, staining characteristics, and cell densities (FIG. 14). Alternatively, training one or more CNNs can require many person-hours of manual annotation of EDF images to collect ground truth. Since deep learning requires good but not extreme accuracy of input images for ground truth the results from the automatic ASA can be used to automatically train the model. Moreover, a further step is implemented to enhance the training set and address customer concerns about accepting fully automatic data; i.e., automatic stereology results without end user verification.

In one embodiment, a semi-automatic mode of the automated stereology is provided. In certain such embodiments, after EDF images are segmented by the ASA, but before training the model, the counts (clicks) on the segmented cells will be displayed to an end user for confirmation (see, for example. FIG. 17). At this point the end user can accept the automatically generated count or modify the count by adding counts based on false negatives and/or removing counts from false positives. This step can reduce the effort for annotating ground truth and require minimal effort from the end user (see, for example. FIG. 17). Compared to manual stereology counting the work is simple, non-tedious and straightforward. End users can view and edit counts from the ASA. Typically, the time to annotate ground truth for deep learning for each cell type per brain will be far less than the 4-5 hours of difficult cell counting for manual stereology. Also, the efforts involved in annotating ground truth for deep learning for each cell type per brain can be less than training the model by manually annotating ground truth. Once the deep learning model is trained from these annotated images, analysis of EDF image sets from the test cases will take about 10 minutes for the motorized microscope stage to automatically capture disector stacks and a few seconds for segmentation and stereology. The results will be a trained model from expert-validated ground truth for analysis of subsequent test cases in 15 minute or less. As such, this Example of the invention provides a novel technology for automatic stereology of histological sections with deep learning, and optionally, an expert input. For optimal brain related applications, the total numbers of three important cells (neurons, astrocytes, microglia) in brains, for example, mouse brains, can be quantified on counterstained tissue sections from regions with a wide range of packing densities (cortex. CA1: FIG. 14). To this end, deep learning with a CNN model trained by expert-validated ground truth can be generated by the ASA method. This approach provides sufficient cell segmentation to overcome the technical barriers and achieves performance metrics.

The accuracy, precision, and efficiency of quantifying neural elements, e.g., cells in stained tissue sections depend on how the analysis is done. A 2-D sampling probe (for example a knife blade) arbitrarily samples cells with an unknown and unknowable probability related to the cell's size, shape, and orientation. Unbiased stereology can provide the theoretical basis for avoiding this and other sampling and estimation biases. However, the current technology with manual stereology is prohibitively time-consuming and laborious for a large and growing number of studies. In search of faster methods for quantifying histological sections, many neuroscientists have turned to less accurate methods. The availability of automated and semi-automated microscope slide scanners has stimulated interest in semi-quantitative image analysis of 2-D images at lower magnification (40× or lower). Due to the Corpuscle Problem (see, for example. FIG. 12), the total number of 3-D cells in tissue is not equal to the total number of their 2-D profiles on tissue sections (i.e., Total N3-D cells #Total N2-D prof). Moreover, a survey of automatic algorithms to improve efficiency of cell counting methods showed these approaches do not report cell counts but rather density (number per unit area or volume) of 2-D cell profiles. The focus on density estimates leads to data biased by artifacts from tissue processing. Another problem is systematic underestimation of counts at low power due to over-projection and masking (see, for example, FIG. 3). As illustrated in FIG. 3, the low-resolution/high depth of field lens causes multiple objects to be counted as one. Hence, a high-resolution lens with low depth of fields is required for accurate counts using the optical fractionator. High magnification is needed for accurate counts due to the need to determine the section thickness, i.e., difference in distance between the upper and lower optical planes of each section, which can be done either manually or automatically. To avoid the numerous sources of stereological bias from these semi-quantitative approaches, the embodiments of the subject invention provide alternatives to current quantitative approaches for manual stereology with automated stereology.

The automated stereology of the invention can be validated and optimized using the ASA/CNN approach for the populations of high S: N stained brain cells of greatest clinical interest, such as neurons, astrocytes and microglia. These goals can be achieved by, among other things:
  1. Developing standardized, high-throughput, deep learning networks for quantifying stereology parameters of neural tissues with high S: N by immunostaining. The automated stereology method of the invention with an ASA was used to quantify total number of NeuN-immunostained neurons on EDF images from mouse cerebral cortex (see, for example, Tables 3-4). These data confirm automatic stereology for total neuron number is equivalent to manual counts but with 10 times greater throughput. Comparison of both datasets with true counts from 3-D reconstruction of disector stacks (data not shown) revealed 20-30% more accuracy versus current state-of-the-art manual stereology.

However, the same ASA did not segment neurons as well in brain regions with high packing densities (CA1). With customization for each cell type in regions with low and high packing densities using the ASA method might eventually achieve similar performance as for NeuN neurons in an area with low packing density (see, for example, FIG. 13). Rather than attempting to overcome these technical barriers using the ASA approach, deep learning can be used to segment each cell type in brain regions with low and high packing densities.

TABLE 3

NeuN neuron counts by manual vs. automatic stereology in the same disectors of four mice. $R^2$ = correlation for manual and automatic counts.

| Collector (C) | Mouse ID | Manual | Auto. Count | $R^2$ |
|---|---|---|---|---|
| 1, 2* | 02 | 1249 | 1238 | ≥0.96 |
| 2 | 21 | 858 | 878 | ≥0.98 |
| 1 | 03 | 570 | 603 | ≥0.98 |
| 1 | 09 | 558 | 697 | ≥0.98 |

*average counts between two collectors (C1 and C2) for the same brain

TABLE 4

Comparison of manual and automatic stereology for total number (±SEM) of NeuN neurons in neocortex of Tg4510 mice and non-Tg controls.

| Group | N | Manual Stereology | | Automatic Stereology | | % diff $_{NeuN}$ |
|---|---|---|---|---|---|---|
| | | Mean Neu-N | SEM $_{NeuN}$ | Mean Neu-N | SEM $_{NeuN}$ | |
| Non-Tg (n = 2) | 2 | 1.30E+06 | 1.18E+5 | 1.39E+6 | 7.71E+4 | +7 |
| Tg4510 (n = 2) | 2 | 9.81E+05 | 2.76E+3 | 1.02E+6 | 1.41E+4 | +4 |
| % diff $_{NeuN}$ | | −25 | | −27 | | |

2) Developing automatic stereology software consistent with current standards of commercial programs for neuroscience research. Currently, 100% of the approximately 3500 stereology studies done worldwide use computer assisted systems that rely on manual cell counting. Many end users are reluctant to completely rely on automatic stereology to collect results that are critical to their research programs. Therefore, a confirmation step is provided in certain semi-automated stereology embodiments of the invention that allow end users to confirm or edit ground truth prior to training the model.

Other potential outcomes of the automated stereology of the invention are shown in Table 5.

TABLE 5

Expected benefits of the automated stereology method of the claimed invention.

I. Increased efficiency of hypothesis testing of basic and preclinical research
II. Cost savings for labor, time, and equipment to complete studies
III. Greater time spent on productive research activities
IV. Faster progress toward understanding the pathology, natural history, genetics, and therapeutic management of neurological diseases and mental illnesses
V. Improved health, longevity, and quality of life The performance metrics for optimal performance of the automated stereology of the invention are shown in Table 5. The performance metric for accuracy can be assessed in comparisons to results from 3-D reconstruction, i.e., cell counts by well-trained experts of each cell type by careful counting through disector stacks. These "gold standard" counts that give the true number of cells in each disector volume can be done blind to results from automatic stereology.

TABLE 6

Performance Metrics

| ACCURACY | |
| --- | --- |
| Algorithm performance vs. 3D Gold Standard Dice Similarity Coefficient (DSC) | Specificity (false positive): <5% Sensitivity (false negative): <5% Acceptable: DSC 0.7: Poor: DSC <= 0.7 (considered misses) |
| PRECISION | |
| Inter-rater Reliability | Test/Retest Same or different user |
| EFFICIENCY | |
| Compared to Manual Stereology | Semi-automatic Mode: >10× faster Fully-automatic Mode: >20× faster |

[1]Manual counts via 3D counts of cells in disector stacks (z-axis images through a known volume)
[2]For NeuN neurons, GFAP astrocytes, Iba1 microglia in neocortex and CA1 (hippocampus)

Stained tissue sections from male and female mice can be obtained. For example, stained tissue sections from normal (wild type) mice and a genetically modified mouse model (rTg4510 line) of neurodegeneration and neuroinflammation can be analyzed for the purposes of development and validation of the deep learning model. One set of every nth section will be sampled in a systematic random manner to obtain 8-12 tissue sections from regions with low (neocortex) and high (CA1) packing densities. Hardware in a stereology system can include of a Leica DM2500 microscope with low (4×), mid (40×) and high power (100×) objectives, motorized X-Y-Z stage (Prior Electronics, Rockland, MA), Sony Firewire DXC-C33 camera, and a PC computer. The following section gives the step-by-step procedure for collecting EDF images for training the CNN to segment immunostained brain cells in cortex and CA1 regions.
1) At low mag (4-5×) viewing of systematically sampled sections through the reference space, the end user outlines reference area (outlined in green) on the tissue section (see, for example, FIG. 16):
2) At high power (63×, oil), the automated stereology of the invention determines the section thickness for calculation of reference space volume.
3) The automated stereology can follow a two-step process to generate EDF images from disector stacks: a) drive the motorized stage to automatically capture stacks of z-axis images (disector stacks) at about 200 systematic-random locations across x-y area of reference space for all 8-12 sections through reference volume (FIG. 17 shows 7 locations for 1 section). The x-y distance from one Z stack to the next is consistently spaced (such as 200 μm apart) and the images from the previous Z stack need not touch as there is no "stitching" involved.

Each image "slice" in the Z stack can be 1 μm thick. Tissue originally cut at 40 μm can yield 20-25 images per stack due to processing/shrinkage; and b) create EDF images from each disector stack. EDF image can capture all cells in the disector volume at their optical resolution and displays them on a 2-D image.

Figures 18, 19:
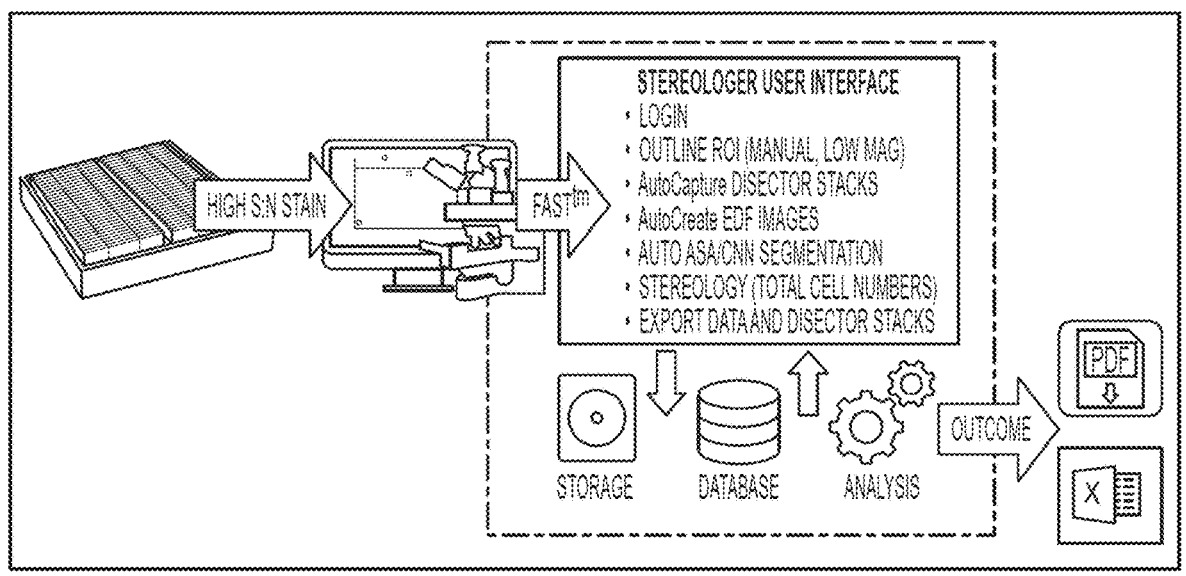
FIG. 18 shows results for predicted segmentation of EDF images using the CNN.
FIG. 19 shows schematic diagram of the automated stereology of the invention. (FAST™ stands for "Fully Automatic Stereology Technology," a phrase used to describe certain embodiments of the automated stereology of the invention.)

In certain embodiments, the automated stereology of the invention can use a deep learning architecture (Unet) neural network with 19 convolution layers, 4 max pooling layers, and 4 up-sampling convolution layers. The input-to-input layer can use gray level images of size 160*160 pixels, 27 hidden layers, and an output layer that gives binary image of the segmentation of size 160*160 pixels. As part of the preliminary data, image datasets were trained, validated, and tested using the Unet deep learning architecture. Images were cropped based on the exclusion/inclusion lines of the disector frame (see, for example, FIG. 15) and resized to be a uniform size of 160*160 pixels. Labels of the EDF images (mask images) were created to show neurons as white and the background as black (binary images). Images were augmented with rotations of 15 degrees giving 14400 and 4800 training and validation images, respectively. A second dataset of 139 images without augmentation were used as test cases. The deep learning open source platform Keras (frontend) and Tensorflow neural network library (backend) were utilized. FIG. 18 shows the predicted segmentation for the prototype software. Masks (ground truth) were created from EDF images to represent the annotation images by experts or by the ASA method. Unet was used to train and validate data subsets.

The Dice coefficient for the model was 0.905. The Dice coefficient is a measurement of similarity of two samples. In this case, the similarity of the segmentation generated from the automated stereology of the invention was compared to the segmentation from experts (ground truth).

$$\text{Dice coefficient} = \frac{2*|A \cap B|}{|A|+|B|} \quad \text{Equation 11.DICE coefficient equation}$$

-continued $$\text{Total } N_{cell} = \left[\sum Q-\right] \cdot F1 \cdot F2 \cdot F3 \quad \text{Equation 12.Optical fractionator formula}$$

The Dice coefficient formula is: where |A∩B| is the total number of true positives: pixels that have intensity of "one" in both A and B, |A| is the total number of positives in the ground truth (nonzero pixels), and |B| is total number of predicted positives: pixels appear as "one" in B.

To avoid potential edge effects for cells only partially visible on the inclusion line in the cropped EDF images, the predicted segmentation will be overlaid on its corresponding original EDF image before cropping. After processing the output with morphological operations to remove small regions, separate loosely connected regions, etc., Fast Radial Basis Symmetry filter (of different sizes) will be used to first detect points inside different cells. Every detected point is then used to morphologically reconstruct the map and all cells not intersecting exclusion lines are counted. The segmentation output of the CNN followed by the post processing steps will give the total number of each cell type in each disector volume (EDF image). For each brain, the total number of each cell type (Total Ncell) will be estimated according to the optical fractionator method, as we have recently shown. Since the sum of all disector volumes is a known fraction of the total volume of each region, the optical fractionator method allows for scaling from EDF images to the total region (cortex, CA1) based on the number of cells counted in the disector volumes for each brain as shown in Equation 12, where [ΣQ−] is the sum of cells counted in all EDF images; F1 is the reciprocal of the section sampling fraction (ssf); F2 is the reciprocal of the area sampling fraction (asf); and F3 is the reciprocal of the thickness sampling fraction (tsf).

Transfer learning is one solution that may help to segment cells identified by different stains and limit the number of EDF images for training the model. With this technique, knowledge learned from previous trained tasks can be applied to new task in a related domain. The ground truth data for training can be created with a combination of human neuron segmentation and automatic segmentation. The neuron segmentation model can be tuned to segment Iba-1 immunostained microglia from ground truth. As ground truth creation is tedious and time consuming, the minimal number of EDF images needed to tune the existing segmentation network are determined to achieve performance metrics (Table 6). The neuron segmentation network can then be tune to segment GFAP-immunostained astrocytes, again with a lower requirement for labeled training data. Due to stain variability, preprocessing can clean the ground truth masks of unnecessary blobs that could affect the segmentation model. In addition, post-processing can be used to help masking blobs below a certain threshold, after which a morphological operation for eroding and dilation could be applied to overcome variations in staining characteristics. Therefore, transfer learning, images preprocessing, and post processing are promising tools to overcome the technical risk. It is also possible to label enough images, for example, twelve to twenty thousands, to train each segmentation system without transfer learning though the labeling process time will make for slower progress. Finally, if the segmentation learned by the deep neural network is unexpectedly inadequate, different adaptive algorithms can be optimized for cell segmentation on EDF images.

EXAMPLE 5

Dementia from Alzheimer's disease and other neurodegenerative conditions is a significant threat to worldwide health care systems. Embodiments of the subject invention can create, quantify and display synaptic degeneration across whole brain maps. Whole Brain Deep Learning Stereology can create extended depth of field (EDF) images from 3-D stacks of z-axis images (disector stacks) stained for presynaptic boutons through the entire brain. Segmentation and deep learning can be used on these EDF images to make automated stereology counts of synaptophysin-immunopositive boutons independent of regional boundaries across the entire brain. The numbers of synapses within each disector stack are automatically quantified for each brain and validated in the X-Y-Z planes through post-processing steps. For example, embodiments of the subject invention can be configured generate a three dimensional computer simulation of the tissue sample from a stack of z-axis images. The three dimensional computer simulation can be segmented along the x-axis and separately along the y-axis. The 3D dimensional computer segments can be visually inspected to determine a cell count or processed through software. In certain embodiments, analysis software can be configured to apply segmentation and deep learning techniques as described herein to generate automated stereology counts from the x and y planes. The stereology counts from the x, y, and z planes can be compared to validate the cell counts. In other embodiments of the subject invention, optical dissection can be performed from the x, y, and z planes of the tissue sample. As such, a synaptic map for brain can be automatically generated in one hour or less with comparable accuracy to 3-D reconstruction (gold standard), which is currently prohibited for routine studies due to the high time and labor requirement.

In certain embodiments, the invention can provide learning convolutional neural network to automatically count synaptic boutons stained with the presynaptic immuno-marker synaptophysin. Performance testing can test for accuracy, precision, and efficiency of automatic compared to manual stereology methods. The automated stereology of the invention can provide greater than 95% accuracy compared to gold standard, i.e., synapse counts by 3-D reconstruction in the same disector stacks.

A cross-sectional study can be conducted using the optimized automated stereology of the invention on synaptophysin-immunostained tissue sections from behaviorally tested young (2-3 months) and old (6-8 months) Tg4510 mice and age- and sex-matched non-tg controls. Whole brain synaptic mapscan show synaptic degeneration across brain regions associated with cognitive decline.

Whole brain maps can show regionally independent areas of synaptic innervation/degeneration in treatment and control groups. Since diffuse synaptic loss is the strongest structural correlation for dementia in Alzheimer's disease and cognitive impairments in animal models, these whole brain synaptic maps can accelerate translation of preclinical studies into potential neuroprotective therapeutics and drug discovery for Alzheimer's disease in several ways. Whole brain synaptic maps can allow for accurate, reproducible, and high-throughput screening of lead candidates. Since these synaptic maps include the entire brain the full impact of potential treatments can be identified. Automatic creation of stereology-based synaptic maps may also eliminate the subjective influence of end-user training, experience, distractions, fatigue, motivation, etc. that currently confound No/Go decisions based on qualitative histopathology. In support of rapid, broad adoption, the automated stereology of the invention can use motorized XYZ stage, bright-field microscope and digital camera hardware.

EXAMPLE 6

In further embodiments, the current disclosure explains an exemplary disector-based framework for the automatic optical fractionator below. In addition, artificial intelligence (AI)-based deep learning (DL) offers the possibility of improving throughput by automating the collection of stereology data. DL can effectively achieve comparable accuracy to manual stereology but with higher repeatability, improved throughput, and less variation due to human factors by quantifying the total number of immunostained cells at their maximal profile of focus in extended depth of field (EDF) images. In some examples, the current disclosure elaborates a semi-automatic approach using a hand-crafted Adaptive Segmentation Algorithm (ASA) to automatically generate ground truth on EDF images for training our deep learning (DL) models to automatically count cells using unbiased stereology methods. This update increases the amount of training data, thereby improving the accuracy and efficiency of automatic cell counting methods, without a requirement for extra expert time. The second contribution of this work is a Multi-channel Input and Multi-channel Output (MIMO) method using a U-Net deep learning architecture for automatic cell counting in a stack of z-axis images (also known as disector stacks). This DL-based digital automation of the ordinary optical fractionator ensures accurate counts through spatial separation of stained cells in the z-plane, thereby avoiding false negatives from overlapping cells in EDF images without the shortcomings of 3D and recurrent DL models. The exemplary framework overcomes the issue of under-counting errors with EDF images due to overlapping cells in the z-plane (masking). The practical applications of these advances are demonstrated with automatic disector-based estimates of the total number of NeuN-immunostained neurons in a mouse neocortex. In summary, this disclosure provides the first demonstration of automatic estimation of a total cell number in tissue sections using a combination of deep learning and the disector-based optical fractionator method.

Accurate quantification of stained cells in tissue sections is a critical component of basic and clinical research for a wide range of scientific and medical disciplines, including experimental research in psychology, neuroscience, pathology and oncology among others. Using artificial intelligence (AI)-based approaches to analyze stained tissue sections, the inventors can combine automatic deep learning (DL) and unbiased stereology for quantification of stained cells and other biological structures in tissue sections. For example, DL with a convolutional neural network (CNN) such as U-Net can estimate the total number of immunostained cells in extended depth of field (EDF) images with accuracy comparable to manual counts but with higher through-put, repeatability and reduced error from human factors. An EDF image refers to a synthetic 2D construct that shows stained cells of interest at their maximal plane of focus through a z-axis stack of digital images (disector stack). These focus-stacked EDF images allow for comparisons of AI and non-AI based approaches for automatic segmentation by different methods. Analyses of EDF images from the same disector stacks allow for comparisons of accuracy, repeatability and efficiency of cell counts using different applications of the optical fractionator method. However, a limitation of cell counts in disector stacks converted to EDF images is undercounting due to the possibility of overlapping cells in the z-plane (masking) as schematically illustrated in FIG. 21.

Figure 21:
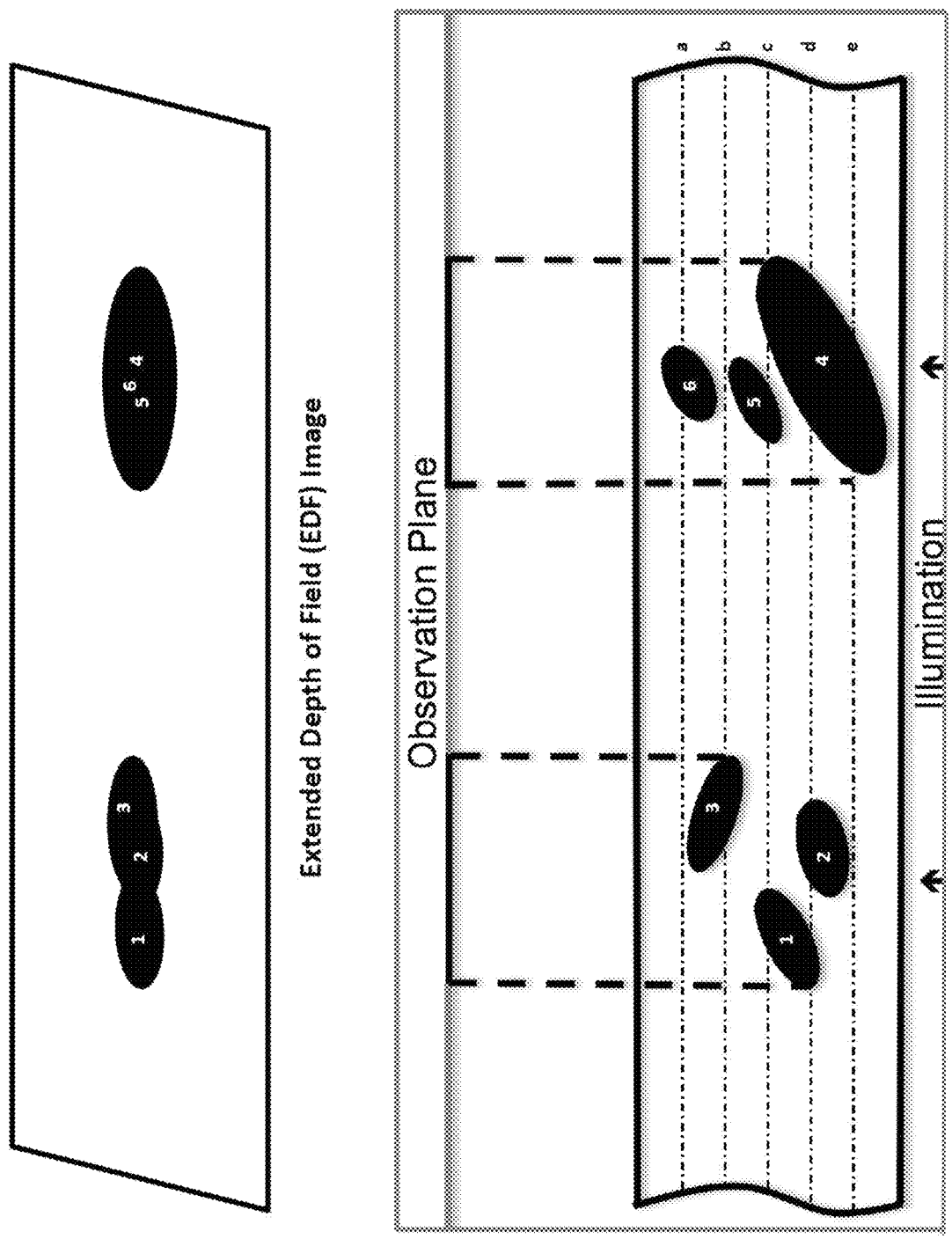
FIG. 21 is a schematic diagram showing overlapping objects (masking) along a single viewing axis caused by objects clustered together and a larger object masking the observation of smaller objects.

FIG. 21 shows a schematic diagram showing overlapping objects (masking) along a single viewing axis caused by objects clustered together (1.2.3) and a larger object (4) masking the observation of smaller objects (5,6). As shown in the top panel, the clustered and masked objects are not separable in the Extended Depth of Field (EDF) image. Counting along the multiple planes parallel to the observation plane may resolve false negative counts along a single viewing axis. Such multiple parallel planes are represented by horizontal dotted lines (a through e). Using single optical plane scanning along the viewing axis, all cells may be accurately counted at the best plane of focus; or when they first come into focus, i.e. (1,d), (2,d), (3,b), (4,e), (5,c), (6,a). Notably, the number of cells counted in this manner converges on the true or expected value, thereby avoiding under-counts due to cell clustering and masking.

The inventors have also developed a new disector-based DL approach that avoids stereological bias associated with counts of 3D objects (cells) based on their 2D profiles, i.e., the Corpuscle problem, as well as undercounting on 2D EDF images due to masking. This approach uses the optical fractionator method, a combination of the optical disector and fractionator sampling scheme, facilitated by a DL model for automatic segmentation and counting of cells on a stained tissue section by thin focal plane optical scanning through a systematic-random series of z-axis tissue volumes (disector stacks) that represent a known fraction of the total reference volume. Thus, the disclosure provides 1) an exemplary disector-based enhancement of our previous EDF-based DL approach; and 2) an exemplary automatic extension of the ordinary optical fractionator method.

Some examples provide segmentation of overlapping cells due to masking in EDF images of various datasets. In overlapping cervical cell segmentation work, cell nuclei detected as a first step act as an indicator of presence of a cell in overlapping cells in EDF images. A similar technique may be used to segment cells in genome-wide RNAi screening images where cell nuclei are usually not overlapping and have good contrast due to dark color, which facilitates nuclei detection in the first step. However, that used images of multichannel fluorescent probes that allow for interference (subtraction) imaging of co-localized proteins in specific cell compartments, which is not possible with general DAB-based immunostaining used in the present work.

In some examples, a method for overlapping cell segmentation in absence of fluorescent co-localization is the Distance Transform (DT) followed by watershed segmentation. This technique works for touching or overlapping cells with a small amount of overlap (i.e., 'bottle-neck' shaped connections). However, the DT fails to provide extrema/seeds for the watershed transform in case of highly overlapping cells.

Other examples may provide an approach to fuse image intensity with the DT followed by watershed segmentation to segment overlapping cells. The design of this fusion approach is based on darker pixel intensity at the center of the cell and lighter intensities near the edges (i.e., the overlapping area). However, this is not always true for overlapping cells, particularly cells with high overlap. Furthermore, this method cannot be used for datasets with non-uniform intensity within a cell, such as the dataset in the present work.

Further examples may provide a gradient-fused DT followed by watershed to segment fluorescent-labeled cell nuclei in 3D confocal microscope image stacks. The idea behind the use of gradient information is that there is a higher inter-cell intensity gradient than intra-cell intensity gradient. The challenge with applying this method to focus-stacked 2D (EDF) images of our dataset is that there is little-to-no inter-cell gradient among highly overlapping cells in most instances.

Even further examples may use the focal signature of individual pixels along the z-axis for cell identification in z-stacks of bright-field microscopy images. Pixels are labeled as one of multiple classes like cell contour, cell interior, halo, etc. A machine learning model [support vector machine (SVM)] is trained with individual pixel focal signature to classify the signal as one of the classes based on the idea that the pixels in each of the classes have distinct intensity profiles along the z-axis. Though versatile, one limitation of this method is that a pixel can belong to only one of the classes, i.e., a pixel belonging to one cell interior cannot belong to another cell interior or cell contour. All the pixels of multiple overlapping cells can be classified as 'cell interior' forming a big blob resulting in under-counting. Also, this method cannot resolve a small cell completely occluded by a larger cell above in the z-axis (masking).

In present disclosure, microscopy image stacks may consist of multiple images (n=10) in each z-stack (disector stack) where each image shows cells at a different focal plane in the z-axis. Different cells can appear in best focus at the same or different focal planes depending on their physical location in the z-stack. Thus, segmenting/counting cells in their singularly best focus plane may overcome masking bias that leads to undercounts in EDF images. Furthermore, cells that highly overlap in the x-y plane can be separated in the z-direction provided 3D context is available to identify the best focus plane for each cell. The exemplary 3D cell counting approach may offer numerous advantages over existing DL-based methods, including the need for less training data, which is often a limiting factor in biomedical applications; and lower computational costs in terms of memory requirement and training time, as compared with existing methods with 3D context processing such as 3D convolutional networks and Recurrent Neural Networks (RNN).

A new approach for automatic DL-based cell counting in tissue volumes that combines 3D context with the low computational costs and minimal training data requirements is in need. To achieve these goals, the inventors propose a disector-based Multi-channel Input and Multi-channel Output (MIMO) framework that represents a digital realization of the ordinary optical disector method where an expert carries out manual thin focal-plane scanning of z-axis volumes while counting cells of interest at a unique point, e.g., the best plane of focus for every cell in each disector stack. In both approaches, the total number of cells in the reference volume is estimated in an unbiased manner using the fractionator method, i.e., the product of the reciprocal of all sampling fractions and the sum of cells counted in all disector volumes.

EXAMPLE 7: ASATP-DL: AN EXAMPLE IN ASA-DL FRAMEWORK

One example method for automatic profile counting in EDF images of single-immunostained microscopy image stacks is the Adaptive Segmentation Algorithm-Deep Learning (ASA-DL) combination presented. The same framework can be demonstrated for automatic counts on EDF images after stain-separation of counterstained tissue sections (NeuN with cresyl violet counterstain). In the ASA-DL framework, the Ground Truth (GT) is divided into two steps as follows. In the first step (count-annotation), an expert identifies and counts (clicks) on the immunostained cells (neurons) of interest to create GT. In the second step (mask-annotation) creates binary image masks (with cells of interest in foreground) for training a deep learning model to automatically segment unseen cells. The mask-annotation, which does not require an expert, is done via manual verification of segmentation mask generated automatically by the handcrafted algorithm ASA. During this verification, a human observer reviews an ASA segmentation mask superimposed on the count-annotation and accepts or rejects the image based on the quality of the segmentation. For example, a false positive (FP) could be the basis for the human observer to reject an image in the ASA segmentation. On completion of this review process, the accepted images are used for training the DL model.

Figure 22A:
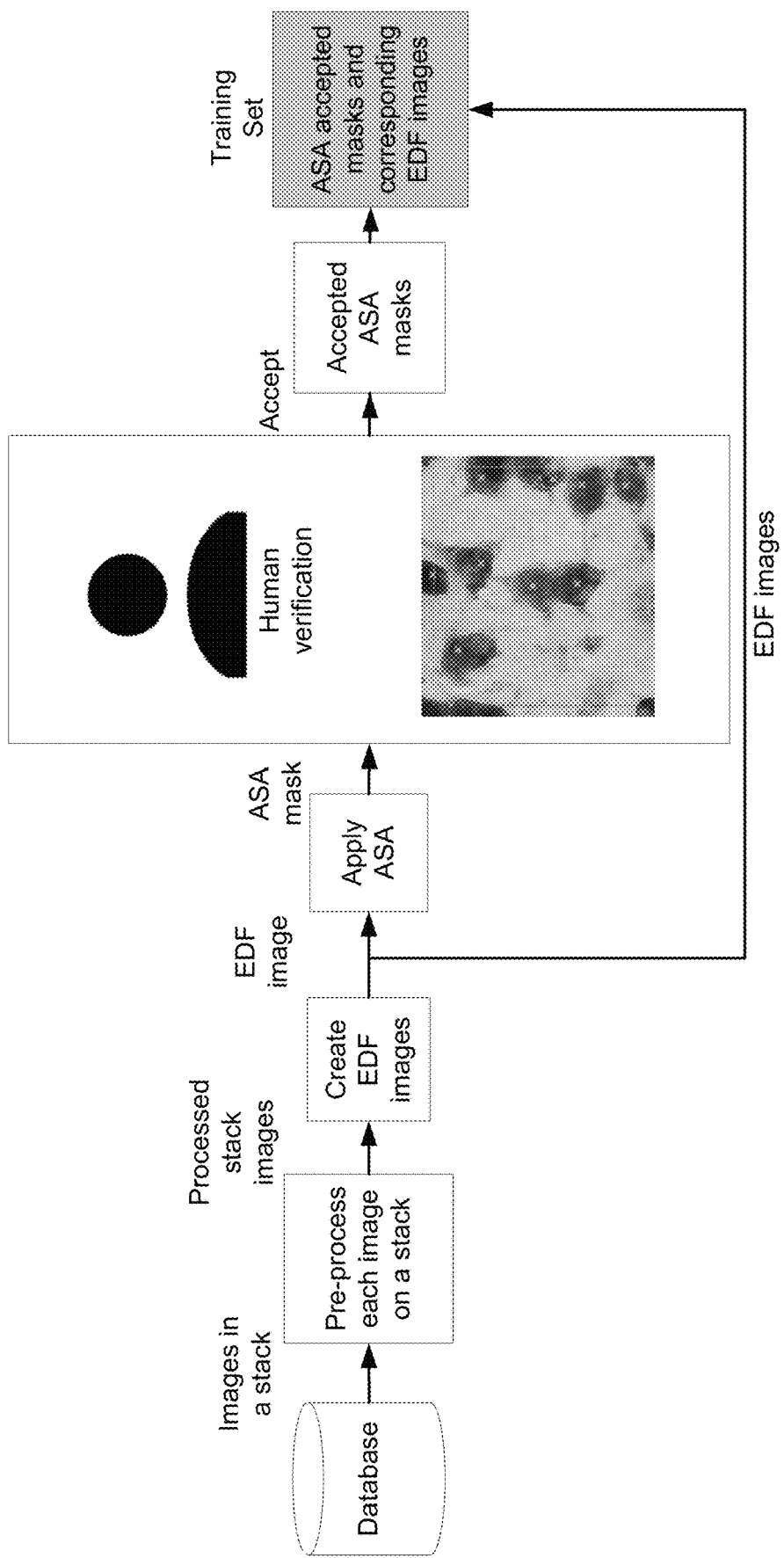
FIG. 22A is an example of a process of generating the mask-annotation in ASA-DL framework.
Figure 22B:
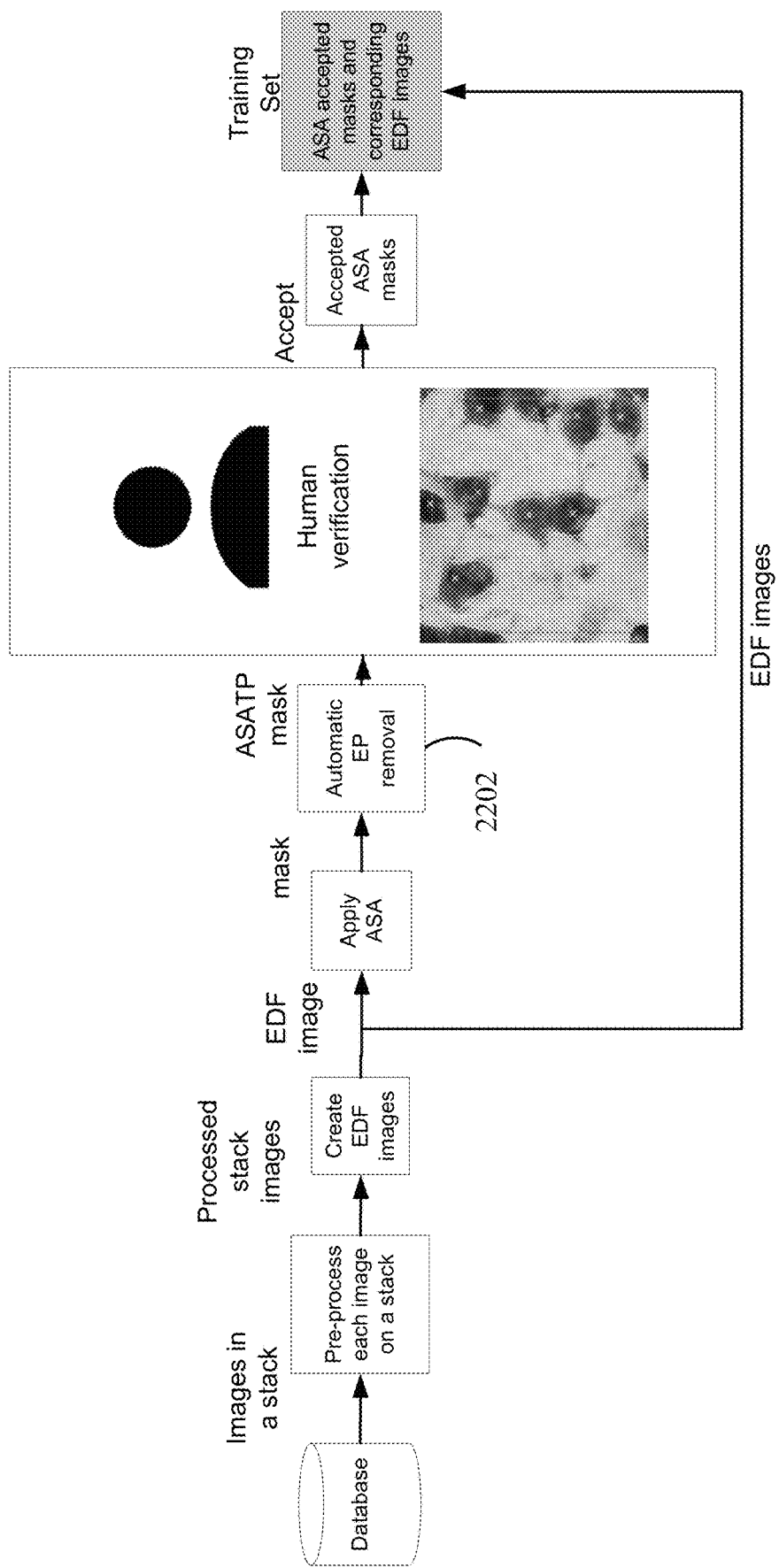
FIG. 22B is an example of a process in the ASATP-DL framework where the FPs are automatically removed from the ASA segmentation mask before manual verification.
Figure 23A:
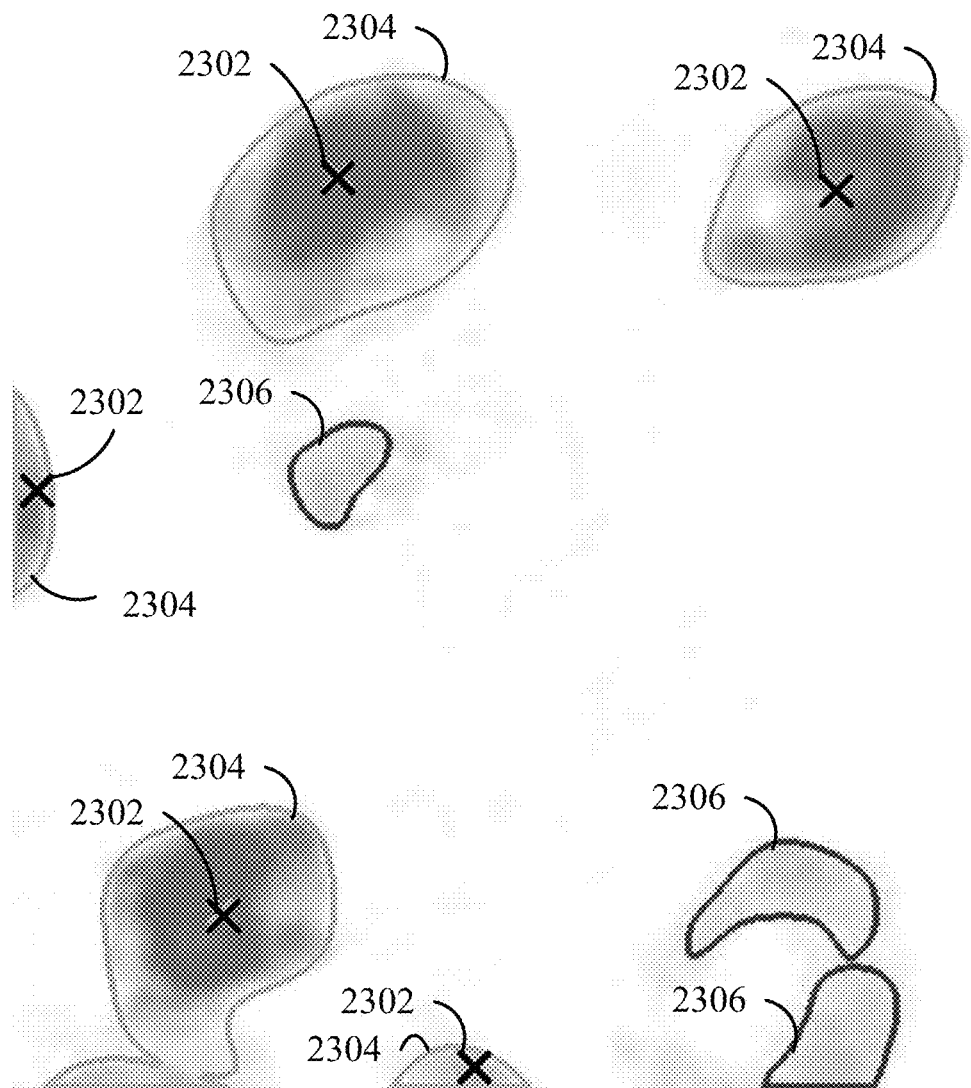
FIG. 23A is an example of an ASA segmentation mask verified (and rejected) in the ASA-DL approach.
Figure 23B:
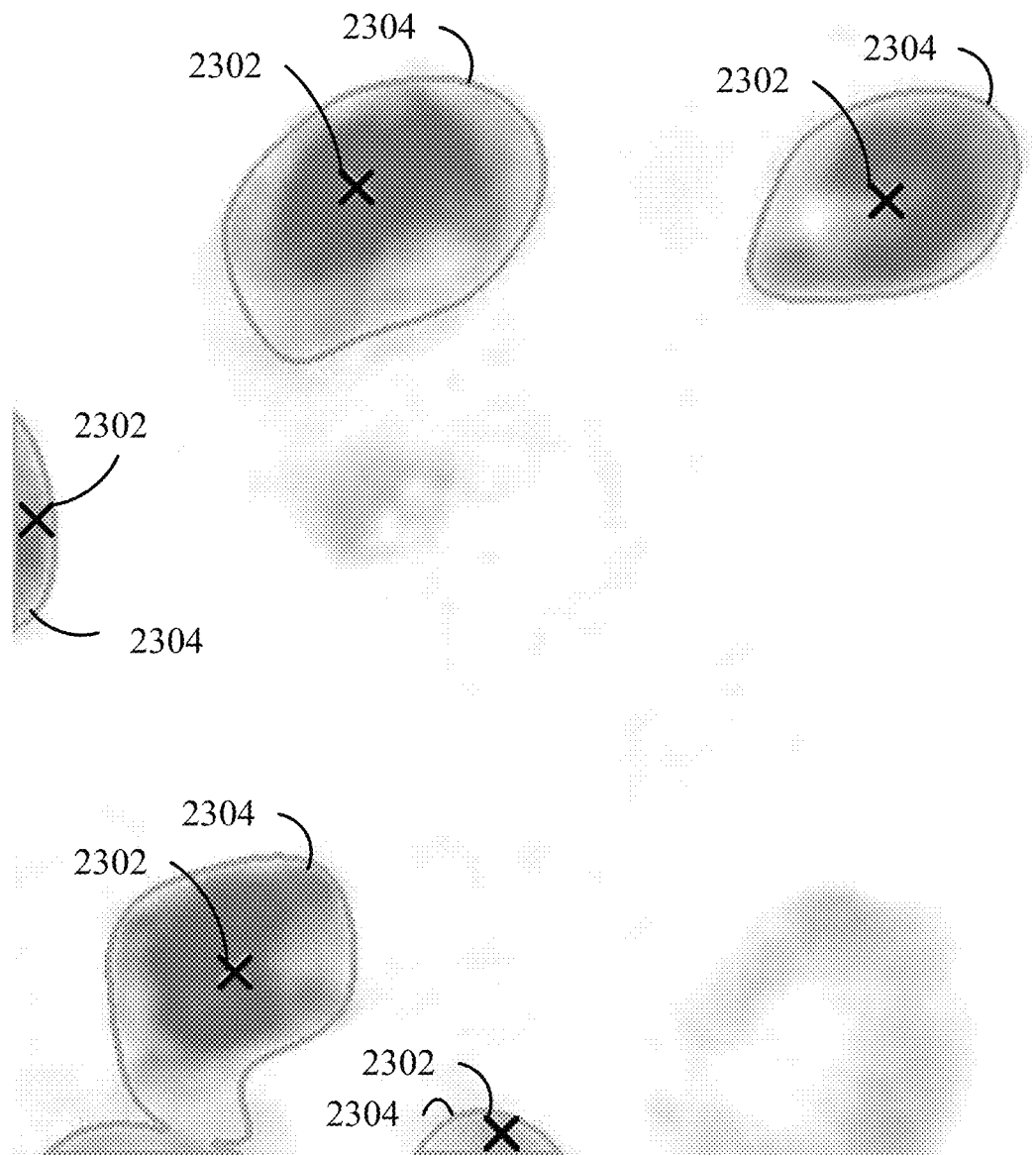
FIG. 23B is an example of an ASA segmentation mask verified (and accepted) after FP removal in the example ASATP-DL approach.

The present disclosure provides an exemplary update to this verification process in which an ASA-segmented blob (cell) can be identified as an FP automatically if there is no matching annotation (click) in the count-annotation. In this case, FPs are automatically erased from the ASA segmentation masks prior to presentation of the image to the human observer for verification. This automatic FP removal 2202 from ASA mask requires no expert time and allows more accepted data for training the DL model. The framework with the update is referred as 'ASATP-DL' (where only True Positives (TP) of the ASA segmentation (ASA-TP) are verified). FIGS. 22A and 22B depict the process for generating the mask-annotation for the training set in ASA-DL (FIG. 22A) and ASATP-DL (FIG. 22B). An example of ASA segmentation before and after automatic FP removal is shown in FIGS. 23A and 23B. The crosses (×) 2302 indicate count-annotation, the contours 2304 represent segmentation by ASA while contours 2304 with crosses 2302 are TPs and contours 2306 without crosses are FPs.

EXAMPLE 8: DISECTOR-BASED MIMO FRAMEWORK

Figure 24:
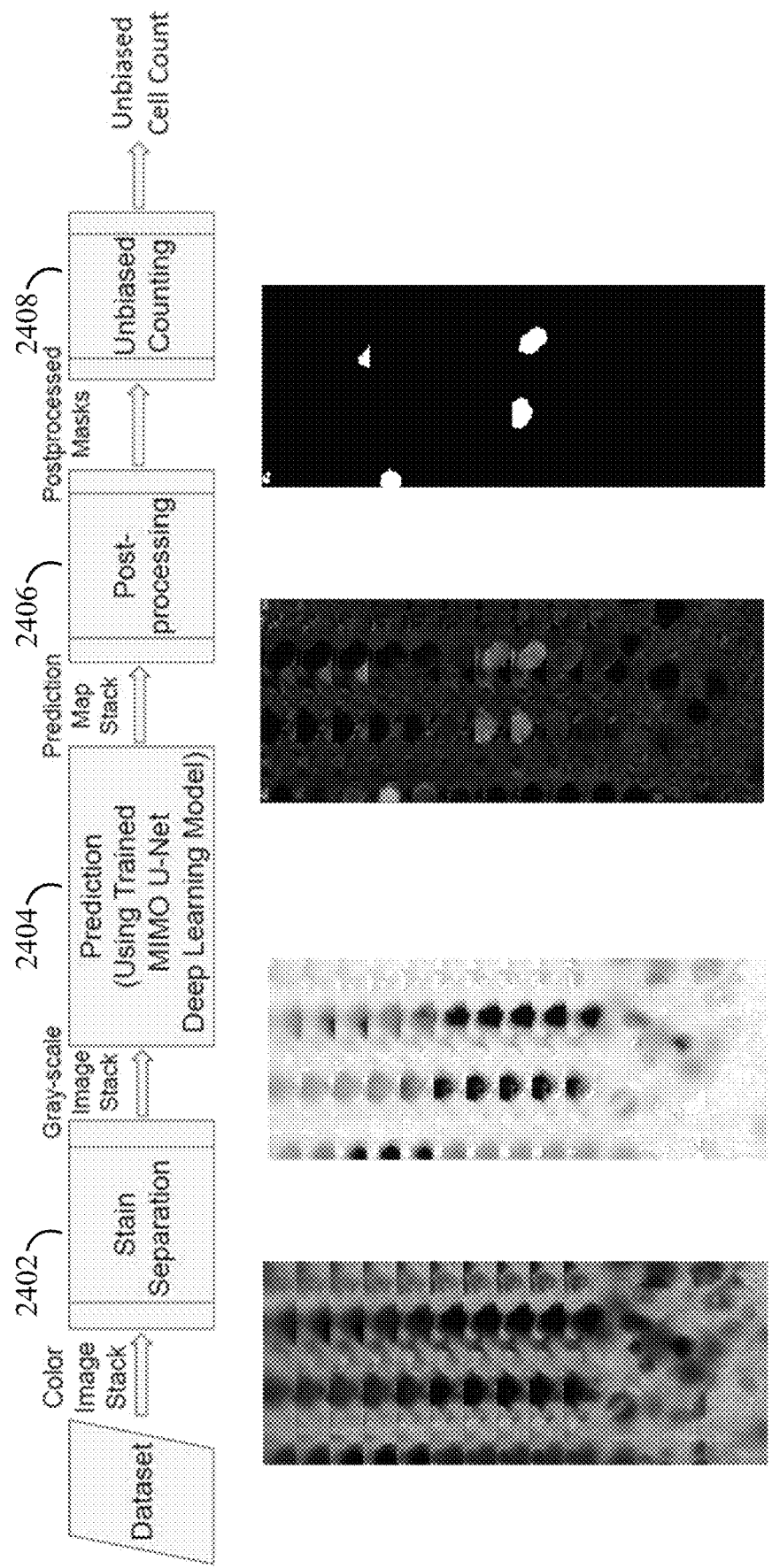
FIG. 24 is an example of a disector-based MIMO framework.

An overview of the example disector-based MIMO framework for cell counts is shown in FIG. 24. In the first step 2402, the color image stacks may be converted to single-color scale (e.g., grayscale) using stain separation. In the next step 2404, the single-color scale (e.g., grayscale) image stack may be fed as input to a trained MIMO U-Net model for automatic segmentation/counting of cells. In the following step 2406, the prediction map stack may be post-processed to avoid over-segmentation of a cell and remove some of the FPs. In the final step 2408, Gundersen's unbiased counting rules may be applied based on inclusion and exclusion planes in 3D. Each of these steps are explained in detail in the following subsections.

1) Disector-Based MIMO U-Net

In one example, a U-Net deep learning architecture can be used in the step 2404 in FIG. 24 based on its performance in segmenting biomedical images. However, it is to be understood that other neural networks, such as other convolutional neural networks (including LeNet, AlexNet, VGG, GoogLeNet, ResNet, and others), may also be used.

As discussed above, a 2D U-Net model can be used with MIMO to exploit the 3D context in an image stack for identifying the best focus plane for each cell and to avoid the high computational cost and training data requirement for known 3D methods, e.g., RNNs. To segment a cell in the channel (optical plane) with its best (sharpest) focus, the number of input and output channels are the same as the number of planes (z-axis planes) in a stack (here 10 channels). Each image plane in the z-stack is treated as an input channel and each output channel is foreground of the corresponding image plane in the stack where foreground for an input channel contains the cells in best focus. In other words, a cell that appears in several z-axis planes is segmented only once at a unique point, i.e., its sharpest focal plane. In some examples, the deep learning model can have an additional output class for background. Thus, the number of output classes in the examples can be one more than the number of input channels, for certain tasks such as a neuron segmentation task.

2) Color to Gray Conversion

In step 2402, the color image stacks may be converted to single color scale (e.g., grayscale) using stain separation. In some example, a single channel image (e.g., a gray-scale image) may use each image plane of a stack as an input channel. However, it should be understood that this is a mere example and any other variations (e.g., multiple channel image in any other suitable color scale) could be used. Since visible light microscopy images are typically three channel [R (red), G (green), B (blue)] color images, it might be desirable to transform the color images to gray scale. The conventional BT.601-7 (studio encoding parameters for digital television) Equation 13 can be used for color to gray conversion of microscopy images of cells in tissue sections immunostained with a single color, e.g., neurons immunostained with a nuclear (NeuN) with colorization by the diaminobenzidine (DAB) reaction forming a brown product. In Equation 13, R, G, and B are the intensity values of the red, green, and blue channels respectively, and Y is the gray scale intensity value. A common option in histological staining is to combine a primary immunostain or histochemical stain with a counterstain to enhance definition of cellular structures. Examples of common dual stain combinations are hematoxylin and eosin (H&E) and a DAB-based immunostain, e.g., NeuN, with a Nissl stain such as cresyl violet (DAB-CV). For the present study, NeuN-immunopositive nuclei appear brown while Nissl substances stained blue violet with the CV counterstain can be in some examples. Equation 13 would convert both the brown and blue objects in the dual stain images to gray, which might not be used. Stain separation is done on each image to remove the CV counterstain and thereby generate a single channel grayscale image corresponding to the primary (brown) stain. In some examples, a constant (fixed) stain color basis is desirable across the images of a stack to maintain the focus profile of a cell as expected after stain separation. That is, the focus profile of a cell in a stack is expected to monotonically increase until the best focus plane then monotonically decreases thereafter. This approach uses a digital stain separation method with two modifications as described below.

$$Y=0.2989 \cdot R + 0.5870 \cdot G + 0.1140 \cdot B \quad \text{(Equation 13)}$$

The sparse solution for stain separation may reduce the background noise. However, stain separation with such a sparse solution can result in 'holes' (zero valued pixels) within cells in some of the planes in an image stack. Such 'holes' are not a problem while working with EDF images since they are present only in some of the planes and are filled with the contents from the other planes of the stack by the EDF algorithm. On the other hand, the high sparsity can be a problem while using each plane as an input channel, especially because the aim is to segment each cell in its best focus plane. Hence, the sparsity coefficient is made zero (no sparsity) for the disector-based approach presented here.

As mentioned earlier, the CV counterstain improves the contrast definition of the objects of interest stained with the brown color of the primary immunostains. Hence, if both stains are present at a pixel, it can combine both stains while transforming the color image to gray scale. In the first step, the stain density maps of the primary stain (brown) and counterstain (blue) are obtained through stain separation. Second, at all the pixels where primary stain density is above a threshold (here, 5% of the maximum possible value), the stain density values of the two stains are summed to a single grayscale value, effectively removing the counter-stain while preserving the intensity perceived by the human for the object of interest.

3) Prediction Maps Post-Processing

In step 2406, the prediction map stack may be post-processed to avoid over-segmentation of a cell and remove some of the FPs. The threshold value for the prediction confidence maps can be first selected based on the smallest absolute error rate on the validation data. Next, the blobs smaller than a minimum area threshold are discarded for noise removal. A minimum area threshold of 500 pixels is used for the blobs inside the prediction map image and 200 pixels is used for the blobs which are touching any of the edge of the prediction map image considering the fact that it can correspond to a cell with partial cell body outside the field of view (disector box).

As discussed earlier, there are ten output channels (same as number of input channels) and each cell is expected to be segmented in the corresponding best focus plane. In some examples, one plane before or after the best focus slice can have a prediction confidence value lower than the best focus slice and remain above the prediction confidence threshold. Based on the fact that the planes in the dataset used in this study are 1 μm apart and the neurons are 3D volumetric structures, with a spread in the z-axis as well (generally larger than 2 μm spread in the z-axis), there is a high probability that any two overlapping blobs in any two consecutive planes belong to a single cell. Hence, such overlapping blobs are combined and assigned to the plane with the bigger blob among the two participating blobs. Each of the blobs in nth plane is compared against blobs in n+1th plane. If any pair of blobs are found overlapping, the smaller of the two blobs is shifted to the plane with larger blob and is combined with the larger blob.

Since the blobs at this stage might have holes, any holes in all the blobs are filled as a cell body is expected to be a solid. Finally, any blob with circularity less than a circularity threshold (here, 30%) are filtered out since NeuN-stained nuclei are roughly spherical concave structures. In post-processing, circularity-based filtering may be used to help discard some of the FPs. To assess the extent of systematic error (bias) related to the 3D shape of the objects, the results can be computed with and without the circularity-based filtering. The average error rates (Table 9) are 4.82% and 5.93% with and without the shape assumption, respectively, for a difference of 1.11%. Thus, circularity-based filtering based on an assumption about the object shape only slightly affects the results and is not an absolute requirement for the example method.

Collection of Image Datasets

The image dataset for these experiments may include images from tissue sections processed for NeuN immunostain and cresyl violet counterstain (NeuN-CV) from five mice, which represent a subset of the NeuN counter-stained dataset.

Animals for this study were aged 6-8 months Tg4510 male mice (n=3) and male non-tg littermate controls (n=2) sampled at random from the colony at the Byrd Alzheimer's Disease Center at the University of South Florida in Tampa, FL. Under deeply anesthesia on an isothermal pad, mice were perfused with 25 ml of cold sterile buffered saline, their brains removed and one hemisphere immersion fixed for 24 hours in fresh 4% phosphate buffered paraformaldehyde then transferred to Dulbecco's phosphate buffered saline, cryoprotected in 10, 20 and 30% sucrose and stored at 4° C. 50 μm frozen sections were collected with a sliding microtome, with every 6th section sampled in a systematic-random manner to obtain 8-12 sections through neocortex of each brain. The number of coronal sections analyzed varied due to difference in the length of the brain along the rostro-caudal axis. In some examples, this range of sections (~8-12) is sufficient to capture the between-section variation for any size or shape of reference space. Average thickness of the samples after post-processing was ~18.5 μm.

Staining protocols were conventional immunostaining with primary and secondary antibodies and DAB-based colorization followed by standard counter-staining in a 2% cresyl violet (CV) solution. On the day of immunostaining, sections were moved into a multi-sample staining tray for blocking of endogenous peroxidase 10% methanol, 3% $H_2O_2$ in PBS: 30 min. Tissue samples were permeabilized with 0.2% lysine, 1% Triton X-100 in PBS solution and incubated overnight in anti-NeuN primary antibody (Millipore). After washing in PBS, sections were incubated in biotinylated secondary antibody (Vector Laboratories, Burlingame, CA), washed after 2 hours and incubated with Vectastain® Elite® ABC kit (Vector Laboratories, Burlingame, CA) for enzyme conjugation. In the final step, sections were colorized in 0.05% diaminobenzidine in 0.03% $H_2O_2$ with nickel intensification, mounted onto slides, dehydrated, and cover slipped.

Disector stacks were collected in a known systematic-random fraction of the reference space similar to manual analysis of disector volumes with the ordinary optical fractionator method for unbiased estimates of the total number of stained cells in an anatomically defined reference space. The work was done with assistance from a computerized stereology system (Stereologer®, SRC Biosciences, Tampa, Florida, USA) consisting of an Olympus microscope equipped with automatic XY stepping motors and Z-axis focus motor for automatic collection of z-axis image stacks (disector stacks). Starting at a random X-Y location in the upper left quadrant of the reference space (neocortex) in the first section, images were collected in a systematic-random sampling manner at intervals of 1200 μm×1200 μm, and repeating on 8-12 sections sampled in a systematic-random manner through the entire mouse neocortex. Each disector stack consists of a set of ten images (1 μm apart) in the z-axis captured using 100× oil lens (NA=1.4) with a guard volume of at least 2 μm. This level of sampling stringency achieved a low sampling error as evidenced by coefficient of error ~0.10 (CE~10%) as shown by [27]. The time required for unsupervised (automatic) collection of mages for each case (46 to 66 disector stacks) was ~30 to 45 minutes. The dataset used is summarized in Table 7.

The Ground Truth (GT)' for a mouse brain in this work is the sum of the cells counted in all disector stacks sampled through an anatomically defined reference space (mouse neocortex) in a systematic-random manner.

Figure 25B:
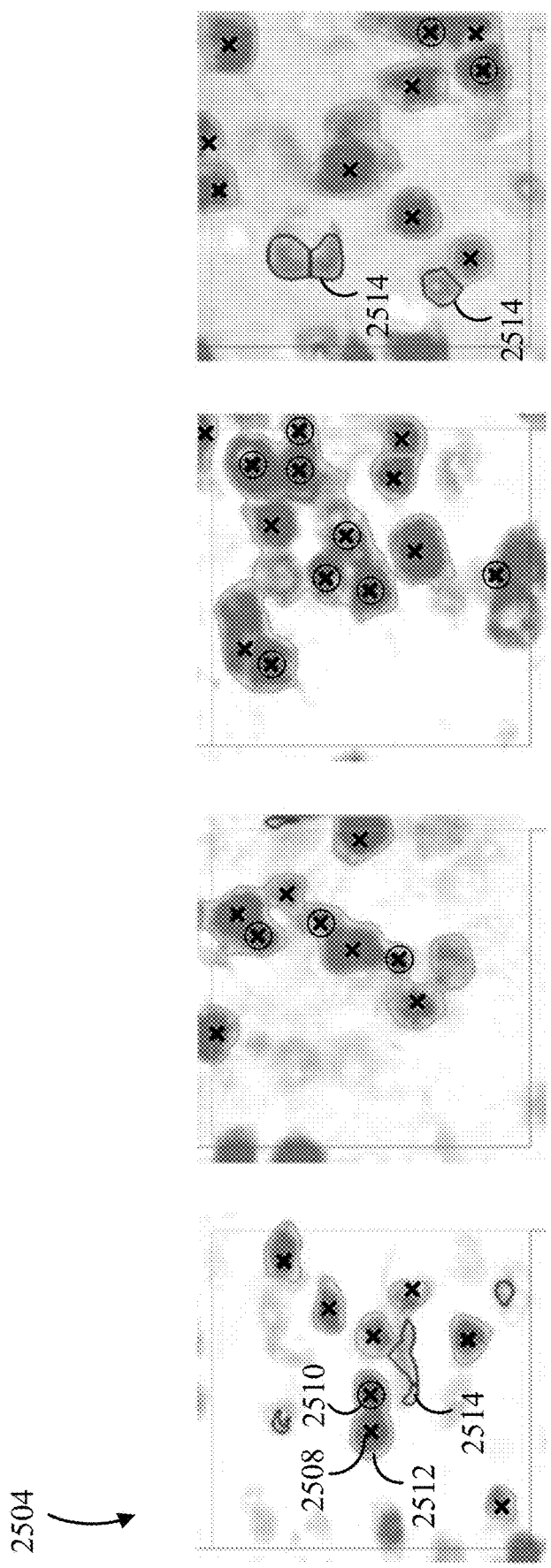
Figure 25C:
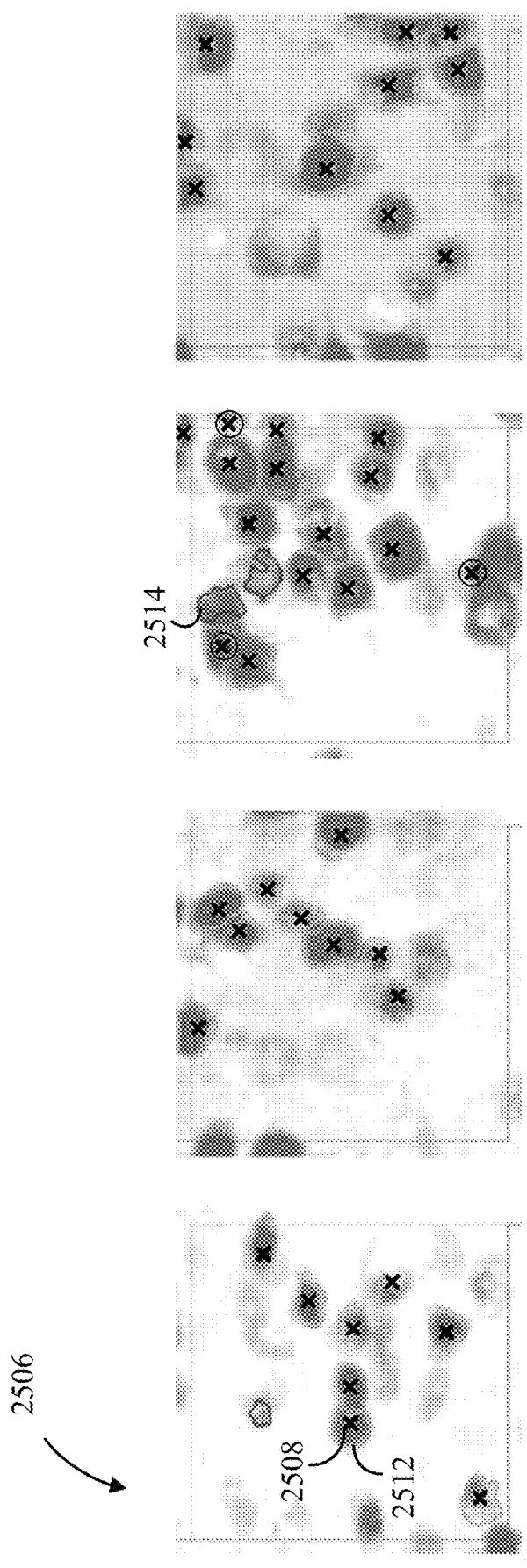

Similar to the ASATP-DL approach, the GT is divided into two levels in the present work. The first is to identify and count the true number of cells (NeuN neurons) in the sampled disector stacks, also referred to as 'count-annotation' where expert knowledge was used to distinguish between neurons and various glia cells. Similar to an optical disector, an expert (YK) used thin focal plane scanning of a disector stack to count NeuN neurons only once at the best focus plane. NeuN-immunostained cells in disector stacks were counted (clicked) using Gundersen's unbiased counting rules to avoid edge effects. As shown in FIGS. 25A-C, cells were included that fell within the disector volume or touched one of the top, upper or right-side inclusion planes in 3D. Cells were excluded that fell outside the disector volume or touched either the bottom, lower or left-side exclusion planes. As another example, in FIG. 26, the top row 2602 shows a series of planes of a stack of images, in which an expert has identified three cells at their best focus planes ("clicks" 2614). In some embodiments, the expert may then 'draw' or trace the outline of those clicked cells, whereas in other embodiments this may be done in an automated way using various computer vision techniques (e.g., edge detection) then confirmed by an expert. Thus, the dots 2614 indicate ground truth (GT) (and/or the outlines 2608, 2610, and 2612).

In some examples, a method can be used with a ⅓ open condenser diaphragm for data collection. The stacks which did not conform to this rule and as a result had unclear boundaries/edges of cells were considered as low quality on the recommendations of a domain expert (YK). About 22% of the total stacks were discarded due to poor quality. Number of stacks discarded per case is listed in the data summary in Table 7. For the mice with a significantly higher number of good quality stacks, a number of stacks were discarded in a systematic-random manner in order to balance the dataset, i.e., every 3rd stack with a random start at stack 1, 2, or 3 was discarded from the 98 stacks from case PI3-20 to obtain 66 stacks. Also, the annotation on the selected data (subset) was done by one expert (YK) during this work to achieve uniform GT across all stacks.

Next, binary image masks (with cells as foreground in corresponding best focal plane) were generated to train the deep learning model ('mask-annotation') to segment NeuN neurons. After the count-annotation, no further expert knowledge is required to draw masks (boundaries) around identified neurons, allowing mask-annotation by trained student researchers to minimize the requirement for expert time. As for count-annotation, a boundary around a cell was drawn in its best focal plane. A check is performed on every stack to match the cell count in both annotations to ensure that no human error is introduced while going from count-annotation to mask-annotation. The required tools for these annotations were developed in-house during this work.

Figure 26:
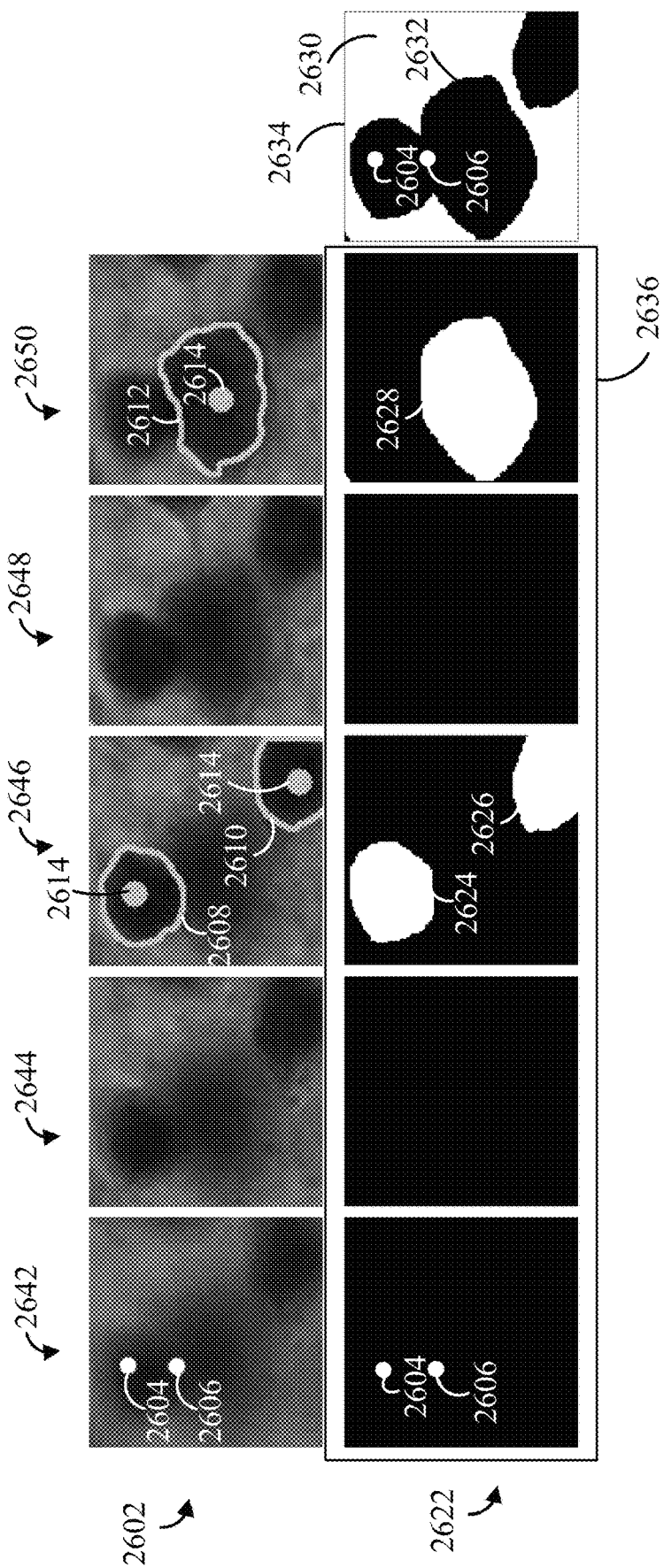
FIG. 26 shows z-stack images with annotations, and corresponding ground truth (GT) binary masks with an additional background binary mask.

In further examples, binary images including one or more binary masks can be generated. The binary images can correspond to z-stack input images. In some scenarios, the binary images can further include a background binary image 2634 as an additional output class. In some examples, a background binary image 2634 can be generated by combining all binary images using a logical operation (e.g., OR logic operation) and inverting the combined image. For example, the bottom row 2604 of FIG. 26 shows 5 foreground binary images 2636 and 1 background binary images 2634 as "labels" for output classes. The 5 foreground binary images 2636 can correspond to five z-stack input images 2602. In some examples, 5 foreground binary images 2634 can include one or more binary masks 2624, 2626, 2628 around their cells corresponding to their best focal z-stack images. The one or more binary masks can be manually generated by identifying and drawing each cell at a best focal plane of the planes/individual images of the z-stack images 2602. However, it should be appreciated that the binary masks 2636 can be automatically generated by recognizing the edges or contrasts of the cells using any suitable technique, once an expert has identified the cell in images 2602. In further examples, based on the five foreground binary images 2636, a background binary mask 2634 can be automatically generated by combining all 5 foreground binary images 2636 (e.g., using an OR logic operation) and inverting each pixel color of the combined binary image 2636. Thus, all binary masks 2636 can be shown in the background binary image in inverted color. In some examples, the ground truth label in any pixel at an XY-location, which does not correspond to a binary mask or a cell in any of five foreground binary images 2636 in z-axis can have the value of '1' and the white color in the background binary mask. On the other hand, any other pixel, which corresponds to any binary mask or cell in any of the five foreground binary images in z-axis can have the value of 0)' and the black color in the background binary mask. Thus, a pixel at an XY-location in the background binary image 2634 can have the value of '1' when there is no binary mask or cell on the pixel at the XY-location in each foreground binary images 2636. On the other hand, another pixel at an XY-location in the background binary image 2634 can have the value of 'O' when there is one or more binary masks or cells on the pixel at the XY-location in the foreground binary images 2636.

There is a strong inter-dependence for the most part among output class probabilities. Hence, the softmax function can be used in the last layer for classification. Softmax assumes the target probability distribution to sum up to one. The overlapping cell regions belong to multiple classes—a class for each of the overlapping cells. Each non-zero entry in the label vector is converted to 1/k for k≥1 classes for the XY-location. A background class or image can be added as one of the output classes to obtain a cleaner softmax distribution in the output. The XY-locations of the z-stack not belonging to any of the foreground classes or images belong to the background class or image. Hence, the number of output classes can be one more than the number of inputs in this segmentation task as shown in FIG. 26. The loss is computed as $\Sigma_{i=1}^{c}$ class_weight$_i \times$ binary_crosstropy (y_pred$_i$, y_true$_i$), where c is number of output classes and class weights are used to balance the output classes. Thus, in order for the output probabilities across each output to add up to '1', where a given pixel appears to be a member of more than one cell (e.g., pixel 2606), the output label is ascribed as 1/k where k=2 in the case of a pixel being at a location overlapped by two cells.

For example, FIGS. 27A and 27B show label vectors for XY-locations in a non-overlapping region of a cell and an overlapping regions of cells, respectively. In particular, FIG. 27A shows a label vector 2702 for a first XY-location 2604 of z-stack images 2602 in FIG. 26. In the example, the first XY-location 2604 only belongs to one active class or binary mask, which is foreground binary image 3 corresponding to z-stack image 3 (2646) because it is in a non-overlapping region of a cell. Thus, the label vector 2702 for the first XY-location 2604 can include the ground truth labels such that '0' is for foreground images or classes 1, 2, 4, and 5 with the background image and '1' is for foreground image or class 3. Thus, the sum of the label vector 2702 can be '1.' In further examples, FIG. 27B shows another label vector 2704 for a second XY-location 2606 of z-stack images 2604 in FIG. 26. In the example, the second XY-location 2606 belongs to two active classes or binary masks, which are foreground image 3 corresponding to z-stack image 3 (2646) and foreground image 5 corresponding to z-stack image 5 (2650). That is, the foreground images 3 and 5 at the second XY-location include cells. Thus, the label vector 2704 for the second XY-location 2606 can include the ground truth labels such that '0' is for foreground images 1, 2, and 4 with the background image and '1' is for foreground images 3 and 5. However, since there are two active classes or binary masks, the sum of the label vector is more than '1.' In the example, each ground truth value for each class or channel can be divided by the number of active classes (k). In the example, since the number of active classes or binary masks (k) is 2. Thus, the ground truth labels for foreground images 3 and 5 at the second XY-location 2606 can have a reduced probability (0.5 in the example). Thus, the converted label vector can include converted ground truth values where each ground truth value is divided by the number of active classes or binary masks. Thus, the sum of the converted label vector for the second XY-location can be '1'.

| Mouse ID | # Stacks Used | Ground Truth Count | # Stacks Discarded |
| --- | --- | --- | --- |
| PI3-18 | 65 | 312 | 3 |
| PI3-19 | 46 | 274 | 27 |
| PI3-20 | 66 | 394 | 32* |
| PI3-21 | 62 | 580 | 35 |
| PI3-22 | 60 | 357 | 2 |

Experimental Results

The number of accepted images per mouse after manual verification of ASA and ASA-TP masks is listed in Table 8. The number of images in Table 8 represents the number of stacks since each stack is converted into an EDF image. In some examples, the small number of accepted images after ASA mask verification is because ASA was originally designed for a single immunostained dataset. The number of accepted images are significantly larger, and hence provide a larger training set for subsequent training of a DL model, by automatic FP removal discussed above. Furthermore, the number of accepted images is sufficient to train the DL model to obtain an average error rate of 6.05% (Table 9) using the ASATP-DL approach.

TABLE 8

Number of images accepted per mouse after ASA vs ASA-TP verification.

| Mouse ID | # Images | # ASA Accepted | # ASA-TP Accepted |
| --- | --- | --- | --- |
| PI3-18 | 65 | 12 | 32 |
| PI3-19 | 46 | 5 | 26 |
| PI3-20 | 66 | 2 | 29 |
| PI3-21 | 62 | 2 | 17 |
| PI3-22 | 60 | 6 | 24 |

TABLE 9

Automatic counting results using EDF-based ASATP-DL and disector-based MIMO approach. Where, the fifth and last columns refer to % error; and, the last row refers to the mean % error for all mice analyzed.

| Test Mouse ID | #Stacks | Ground Truth Count (G) | ASATP -DL Count (A) | ASATP-DL Error Rate(%) $\left(\frac{\|G-L\|\times 100}{G}\right)$ | MIMO Count (L) | MIMO Error Rate(%) $\left(\frac{\|G-L\|\times 100}{G}\right)$ |
|---|---|---|---|---|---|---|
| | 65 | 312 | 295 | 5.45 | 319 | 2.24 |
| PI3-19 | 46 | 274 | 290 | 5.84 | 275 | 0.36 |
| PI3-20 | 66 | 394 | 413 | 4.82 | 426 | 8.12 |
| PI3-21 | 62 | 580 | 558 | 3.79 | 596 | 2.76 |
| PI3-22 | 60 | 357 | 394 | 10.36 | 319 | 10.64 |
| Average Error Rate (%) | | | | 6.05 | | 4.82 |

A five-fold experiment using leave-one-mouse-out for testing strategy was performed for both EDF-based ASATP-DL and the disector-based MIMO approach. In each fold, data from one mouse was left out as a test-set for the trained model performance evaluation on unseen data (i.e., not seen by the model during training) since the model is expected to perform well on the training data. From each of the other four mice, 80% and 20% of the data contributed to the train set and validation set, respectively. This regimen is repeated five times leaving a different mouse data out for testing each time. In effect, the approach is validated on each mouse to ensure the fairness of the performance evaluation.

As for the ASA-DL framework, elastic and rotation augmentations were performed on the train-set to obtain a large and diverse dataset for training a deep learning model. Training the deep learning model is an automatic process that primarily requires unsupervised computer time, i.e., no expert time is required once the training is initiated. The actual training time depends on multiple factors such as amount of training data, hardware capacity, training parameters etc. In the present work, approximately 4 hours and 12 hours allowed for one-fold training in the ASATP-DL and MIMO approaches in that order. Furthermore, the training time is a one-time investment per stain and cell type in that less than 15 minutes is needed to count cells in a complete reference space (~ 60 to 90 disector stacks) using a trained DL model. The predicted cell counts by both EDF-based ASATP-DL and disector-based MIMO approaches are reported in Table 9.

The present disclosure provides an automatic disector-based method that avoids under-counting in previous approaches due to overlapping/occluded cells in the z axis of EDF images. The under-counting error is expected to be relatively high in the stacks with higher cell density. Also, while improving on the under-counting issue in high cell density stacks, the new method should perform at least as well as the existing EDF-based method on stacks with low cell density. To test this hypothesis, stacks were divided into low and high cell density groups (based on manual stereology counts) then the performance of the disector-based MIMO approach was assessed on high and low cell density groups independently. The low cell density group consists of stacks with ≤10 cells per stack and high cell density group with >10 cells per stack. Notably, the stacks are divided into two groups only for analysis purposes after stereology counts at the case level where each case contains areas of both low- and high-density stacks. No extra experiments were performed on the two groups independently. The cell count result comparison for both groups is pro-vided in Tables 10 and 11. Under-counting and over-counting error is indicated by negative and positive error rates, respectively.

TABLE 10

Automatic counting results using EDF-based ASATP-DL and example disector- based MIMO method for low cell density stacks with <=10 cells per stack where under- counting and over-counting error are indicated by negative and positive error rate, respectively; and, the last row refers to the mean % absolute error for all mice analyzed.

| Test Mouse ID | #Stacks | Ground Truth Count (G) | ASATP -DL Count (A) | ASATP-DL Error Rate(%) $\left(\frac{\|G-L\|\times 100}{G}\right)$ | MIMO Count (L) | MIMO Error Rate(%) $\left(\frac{\|G-L\|\times 100}{G}\right)$ |
|---|---|---|---|---|---|---|
| PI3-18 | 57 | 202 | 208 | 2.97 | 205 | 1.49 |
| PI3-19 | 37 | 152 | 187 | 23.03 | 159 | 4.61 |
| PI3-20 | 51 | 179 | 227 | 26.82 | 193 | 7.82 |
| PI3-21 | 35 | 225 | 238 | 5.78 | 232 | 3.11 |
| PI3-22 | 50 | 202 | 260 | 28.71 | 180 | −10.89 |
| Average Error Rate (%) | | | | 17.46 | | 5.58 |

TABLE 11

Automatic counting results using EDF-based ASATP-DL and example
disector- based MIMO method for high cell density stacks with >10 cells per stack where
under-counting and over-counting error are indicated by negative and positive error rate,
respectively; and, the last row refers to the mean % absolute error for all mice analyzed.

| Test Mouse ID | #Stacks | Ground Truth Count (G) | ASATP -DL Count (A) | ASATP-DL Error Rate(%) $\left(\frac{|G-L|\times 100}{G}\right)$ | MIMO Count (L) | MIMO Error Rate(%) $\left(\frac{|G-L|\times 100}{G}\right)$ |
|---|---|---|---|---|---|---|
| PI3-18 | 8 | 110 | 87 | −20.91 | 114 | 3.64 |
| PI3-19 | 9 | 122 | 103 | −15.57 | 116 | −4.92 |
| PI3-20 | 15 | 215 | 186 | −13.49 | 233 | 8.37 |
| PI3-21 | 27 | 355 | 320 | −9.86 | 364 | 2.54 |
| PI3-22 | 10 | 155 | 134 | −13.55 | 139 | −10.32 |
| Average Error Rate (%) | | | | 14.68 | | 5.96 |

As indicated in Table 10, the example method has significantly lower absolute error on the low cell density stacks. Table 10 shows that the example MIMO method has significantly lower under-counting as compared to the EDF-based ASATP-DL approach on the high cell density stacks as expected. Furthermore, the EDF-based approach has high over-counting error on the low-density stacks since some glia cells are incorrectly counted as neurons by the EDF-based method. Interestingly, in the EDF-based method the over-counting (positive) error on low-density stacks cancels the under-counting error on high-density stacks when considering all stacks of a mouse together to compute the % error rate for the mouse (as reported in Table 9). As a result, the EDF-based method for overall % error appears comparable to that of the example method, though the example method performs with higher accuracy (lower error rate) on both density groups individually. The same observation can be derived from the results reported in Tables 12 through 14. The higher F1-score for both density groups individually as well as on the mouse level indicates better overall performance of the example method.

TABLE 12

Comparison of accuracy, precision, recall, and F1-score of EDF-based
ASATP-DL vs example MIMO method. The higher average F1-score of the example
method represents better overall performance.

| Test Mouse ID | ASATP-DL | | | | MIMO | | | |
|---|---|---|---|---|---|---|---|---|
| | Accuracy | Precision | Recall | F1-Score | Accuracy | Precision | Recall | F1-Score |
| PI3-18 | 0.61 | 0.78 | 0.74 | 0.76 | 0.69 | 0.81 | 0.83 | 0.82 |
| PI3-19 | 0.68 | 0.79 | 0.83 | 0.81 | 0.68 | 0.81 | 0.81 | 0.81 |
| PI3-20 | 0.56 | 0.70 | 0.73 | 0.72 | 0.66 | 0.76 | 0.82 | 0.79 |
| PI3-21 | 0.65 | 0.80 | 0.77 | 0.79 | 0.65 | 0.78 | 0.80 | 0.79 |
| PI3-22 | 0.58 | 0.70 | 0.77 | 0.74 | 0.63 | 0.82 | 0.73 | 0.77 |
| Average value | 0.62 | 0.75 | 0.77 | 0.76 | 0.66 | 0.79 | 0.80 | 0.80 |

*Accuracy $\left(\frac{TP}{TP+FP+FN}\right)$, Precision $\left(P=\frac{TP+FP}{TP+FP}\right)$,
Recall $\left(\frac{TP}{TP+FN}\right)$, F1-Score $\left(f1=\frac{2\times P\times R}{P+R}\right)$

TABLE 13

Comparison of accuracy, precision, recall, and F1-score of EDF-based
ASATP-DL vs example MIMO method for low cell density stacks with <=10
cells per stack. The higher average F1-score of the example method represents
better overall performance.

| Test Mouse ID | ASATP-DL | | | | MIMO | | | |
|---|---|---|---|---|---|---|---|---|
| | Accuracy | Precision | Recall | F1-Score | Accuracy | Precision | Recall | F1-Score |
| PI3-18 | 0.58 | 0.72 | 0.74 | 0.73 | 0.67 | 0.80 | 0.81 | 0.80 |
| PI3-19 | 0.70 | 0.74 | 0.91 | 0.82 | 0.67 | 0.79 | 0.82 | 0.80 |
| PI3-20 | 0.49 | 0.59 | 0.74 | 0.66 | 0.60 | 0.73 | 0.78 | 0.75 |
| PI3-21 | 0.65 | 0.77 | 0.81 | 0.79 | 0.63 | 0.76 | 0.79 | 0.77 |

TABLE 13-continued

Comparison of accuracy, precision, recall, and F1-score of EDF-based
ASATP-DL vs example MIMO method for low cell density stacks with <=10
cells per stack. The higher average F1-score of the example method represents
better overall performance.

| Test Mouse ID | ASATP-DL | | | | MIMO | | | |
|---|---|---|---|---|---|---|---|---|
| | Accuracy | Precision | Recall | F1-Score | Accuracy | Precision | Recall | F1-Score |
| PI3-22 | 0.57 | 0.64 | 0.83 | 0.72 | 0.61 | 0.80 | 0.71 | 0.75 |
| Average value | 0.60 | 0.69 | 0.81 | 0.74 | 0.64 | 0.77 | 0.78 | 0.78 |

*Accuracy $\left(\frac{TP}{TP+FP+FN}\right)$, Precision $\left(P = \frac{TP}{TP+FP}\right)$, Recall $\left(\frac{TP}{TP+FN}\right)$, F1-Score $\left(f1 = \frac{2 \times P \times R}{P+R}\right)$

TABLE 14

Comparison of accuracy, precision, recall, and F1-score of EDF-based
ASATP-DL vs example MIMO method for low cell density stacks with <10
cells per stack. The higher average F1-score of the example method represents
better overall performance.

| Test Mouse ID | ASATP-DL | | | | MIMO | | | |
|---|---|---|---|---|---|---|---|---|
| | Accuracy | Precision | Recall | F1-Score | Accuracy | Precision | Recall | F1-Score |
| PI3-18 | 0.70 | 0.93 | 0.74 | 0.82 | 0.74 | 0.83 | 0.86 | 0.85 |
| PI3-19 | 0.65 | 0.86 | 0.73 | 0.79 | 0.70 | 0.84 | 0.80 | 0.82 |
| PI3-20 | 0.64 | 0.84 | 0.73 | 0.78 | 0.70 | 0.79 | 0.86 | 0.83 |
| PI3-21 | 0.65 | 0.83 | 0.75 | 0.79 | 0.66 | 0.78 | 0.80 | 0.79 |
| PI3-22 | 0.61 | 0.81 | 0.70 | 0.75 | 0.65 | 0.83 | 0.75 | 0.79 |
| Average value | 0.65 | 0.86 | 0.73 | 0.79 | 0.69 | 0.82 | 0.82 | 0.82 |

*Accuracy $\left(\frac{TP}{TP+FP+FN}\right)$, Precision $\left(P = \frac{TP}{TP+FP}\right)$, Recall $\left(\frac{TP}{TP+FN}\right)$, F1-Score $\left(f1 = \frac{2 \times P \times R}{P+R}\right)$ A few comparison examples between the EDF-based ASATP-DL approach and example MIMO method are shown in FIGS. 25A-C. The top row 2502 shows one of the image planes of a stack. Middle 2504 and bottom 2506 rows demonstrate results by ASATP-DL and example MIMO methods in order. All cross marks 2508 indicate Ground Truth while the cross marks in circles 2510 show FNs (missed cells). The contours represent segmentation by ASATP-DL and MIMO methods with contours with cross marks showing TPs 2512 and contours without cross marks showing FPs 2514, respectively. In the result 2506 (bottom row), all cells segmented in respective best focus planes of a stack are demonstrated on an EDF image.

DISCUSSION AND CONCLUSION

There was an average of about 3-5% inter-rater variability in 'count-annotation' observed for counts of the same cells in same reference space of the same cases by multiple raters in the group. This sets a lower bound on the error rate for the automatic methods compared to manual stereology counts. As can be seen in Table 9, the average error rate for the ASATP-DL is already close to the lower bound, meaning there is not much room for average error rate improvement by a new method. However, the low average error in the ASATP-DL method is due to the nuance of error cancellation between the low and high cell density stacks (as discussed above). Thus, the ASATP-DL method achieves the desired count by counting incorrect objects to compensate for the under-counting of the highly overlapping cells. In contrast, as shown in Tables 9 through 11 the example method reaches the desired count by primarily counting the correct objects in both low- and high-density stacks.

In the deep learning field, one of the high-value resources is time required by the domain expert (well-trained data collector). The example disector-based MIMO method solves the under-counting issue in the current state-of-the-art EDF-based approach with no extra expert time requirement. That is, the same count-annotation time by an expert is required for both the EDF-based and example disector-based MIMO methods.

In the disclosure, the time requirement for analysis of one case by the EDF-based approach is compared to the example disector-based MIMO method. Both methods were run on the same computer with Intel i7-4790 CPU and 16 GB RAM. The DL model was generated on Nvidia 1080Ti GPU with 11 GB frame buffer. Using a trained DL model, the EDF-based approach required ~13 minutes to count NeuN-immunopositive profiles compared to ~12 minutes for the pro-posed disector-based MIMO method to count NeuN-immunopositive cells, from the same disector stacks for one case. The EDF-based method takes slightly higher time to compute an EDF image from each of the stack. Notably, a well-trained technician requires ~2 to 2.5 hours of closely supervised time to count NeuN-immunopositive cells to the same level of sampling stringency with the ordinary (i.e., purely manual) optical fractionator. In contrast, the example MIMO method requires ~15 minutes of supervised time to outline reference spaces at low power; and ~42 minutes of unsupervised time to automatically collect disector stacks (~30 minutes) and collect data for total cell counts (~ 12 minutes). Thus, throughput efficiency in terms of supervised time is ~5× higher for the example MIMO method (~0.25 hour versus ~2 to 2.5 hours). Whereas collecting accurate data by manual stereology requires constant attention, subjective decision-making, low magnification outlining of the reference space boundaries combined with high magnification counting (clicking) by a highly trained technician with substantial experience, the DL-based MIMO method uses minimal expertise to outline the boundaries of the reference space on tissue sections at low magnification.

As in all deep learning applications, a relatively large amount of training data is required for a more accurate and generic model for different image variations. However, in many biomedical applications including the present work data for training deep learning models is a limiting factor. The inventors anticipate that more training data will further improve the performance on the least accurate cases (e.g., PI3-20 & 22), which will further reduce the standard deviation of the error rate.

Explainability of AI ('black-box') is becoming increasingly important for medical applications. Like most deep learning algorithms, the example work relies on statistical model-free learning. A machine explanation for a decision made by such systems might not fit with human experts' explanation. A better fit can be obtained by incorporating human-in-the-loop with affective computing to receive feedback about if the machine explanation is understandable for the human expert. A case study on a microscopy image analysis.

The present work shows proof-of-concept for the disector-based MIMO framework by quantifying total numbers of NeuN neurons in the mouse neocortex, which had been quantified previously using manual stereology methods. The focus of this work is to show that the number of NeuN-stained cells counted by our automatic stereology (MIMO method) is comparable to counts of NeuN neurons by a trained human technician using manual stereology on the same disector stacks. The inventors used modern stereology to make estimates of total neuron number based on unbiased sampling, also known as systematic sampling with a random start, in conjunction with unbiased cell counting (the optical disector principle). As shown by many studies, a systematic-random sample of 8-12 sections as used in the present study provide sufficient statistical power for unbiased (i.e., accurate) estimates, without the need to count all cells. The example method can be used for automatic stereology counts of any discrete objects (cells) labelled with a high signal: noise stain. As discussed above, prior knowledge about the object shape only slightly benefits performance (<2% impact on the error rate) and it is not an absolute requirement of the example MIMO method.

In some examples, the example framework uses counting cells of interest at a unique point, e.g., the best plane of focus for every cell. In manual stereology, a human expert can count a cell when it first appears (early detector), at the maximal focal plane, or at the last focal plane of visibility (late detector). It is desirable to select one of the three unique points and use that point across the dataset to effectively teach the process to a deep learning model. Different cells counted at different points can confuse the model. The optimal focal plane was selected as the unique point in the example work because the size of the cells of interest with respect to the tissue thickness is such that most of the cells are visible throughout the stack (no unique start and end point). Ambiguity can arise when a cell is in a similar level of good (best) focus in two or more focal planes. Such cases are handled through post-processing to merge overlapping detections in consecutive planes to allow for only one detection per cell.

To conclude, the inventors provide two enhancements to the current state-of-the-art applications of deep learning to unbiased stereology counts of immunostained cells in tissue sections. The first is an update in the form of a semi-automatic approach for GT preparation in 3D stacks of microscopy images (disector stacks) for generating more training data without a requirement for additional expert time. Second, the inventors present a novel disector-based MIMO framework that represents an automatic version of the ordinary optical fractionator where all the planes of a 3D disector stack are analyzed as opposed to a single focus-stacked image (EDF image) per stack. The MIMO approach avoids the costly computations of 3D deep learning-based methods by using the 3D context of cells in disector stacks; and prevents stereological bias in the previous EDF-based method due to counting profiles rather than cells and undercounting overlap-ping/occluded cells. Taken together, these improvements support the view that AI-based automatic deep learning methods can accelerate the efficiency of unbiased stereology cell counts without a loss of accuracy or precision as compared to conventional manual stereology.

EXAMPLE METHODS

Figure 28:
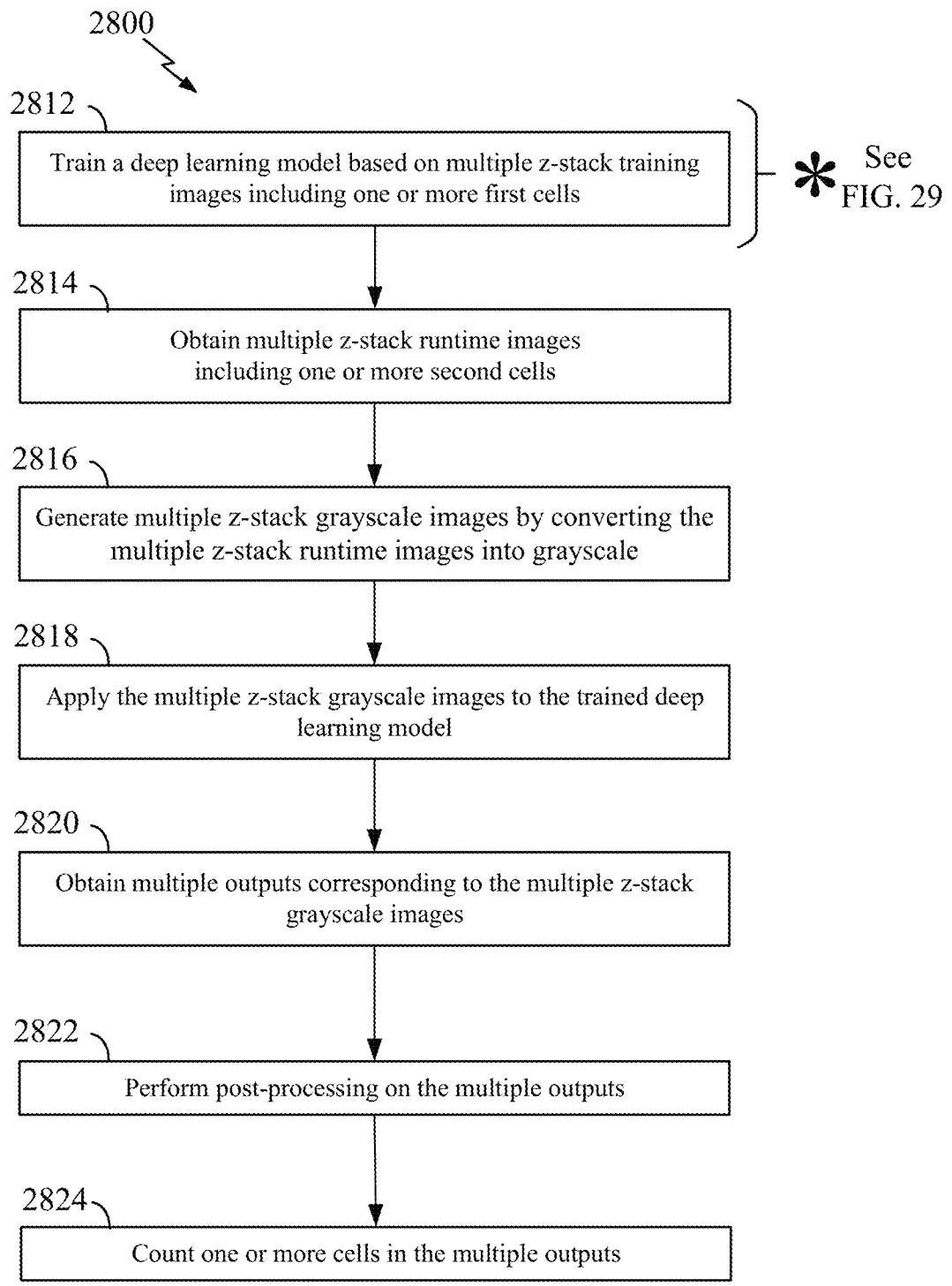
FIG. 28 is a flow chart illustrating an exemplary process for performing computerized stereology in accordance with some aspects of the present disclosure.

FIG. 28 is a flow chart illustrating steps of various exemplary processes for performing computerized stereology in accordance with some aspects of the present disclosure. As described below, a particular implementation may omit some or all illustrated features and may not require some illustrated features to implement all embodiments. In some examples, any suitable apparatus or means for carrying out the functions or algorithm described below may carry out the process 2800.

In step 2812, a system implementing such a process may obtain a trained deep learning model (e.g., U-Net, 2D FCN, LeNet, AlexNet, VGG, GoogLeNet, ResNet, and any other suitable neural networks) based on multiple z-stack training images including one or more first cells. For example, the deep learning model may include a U-Net model. In some examples, the U-Net model may be a 2D U-Net model to use 3D context in an image stack for identifying the best focus plane or image for each cell and to avoid the high computational cost and training data requirement. In some embodiments, the training of the deep learning model is further elaborated in connection with FIG. 29.

In step 2814, the process then obtains z-stack runtime images including one or more second cells. For example, each z-stack runtime image of the multiple z-stack runtime images focuses on a different physical location on a z-axis corresponding to a direction of a gravity. Each z-stack image may be an optical focal plane, which is disposed at a right angle to the z-axis. In further examples, the multiple z-stack runtime images may include 10 images per a z-stack with 1 µm apart each other. Individual cells are in best focus in specific z-stack runtime images in a z-stack depending on their physical location on the z-axis of a relatively thick section (>10 μm).

In step 2816, the process may generate multiple z-stack single-color scale images (e.g., grayscale images) by converting the multiple z-stack runtime images into single-color scale (e.g., grayscale). In some examples, the multiple z-stack runtime images can be visible light microscopy images with three channels (red, green, and blue). In a non-limiting example, the process can include immunostaining tissue sections for detecting nuclei (e.g., NeuN-immunopostivie nuclei), which appear brown. Additionally and optionally, the immunostaining can be combined with a counter stain to enhance definition of cellular structures stained with the brown color of the primary immunostains. In some examples, the CV counter-stain may improve the contrast definition of the NeuN-immunopositive nuclei stained with the brown color. However, the CV counter-stain may stain Nissl substances with a blue violet color. As the grayscale conversion can turn the stained NeuN-immunopositive nuclei and Nissl substances into gray, the grayscale conversion of the stained Nissle substances might not be desirable. Thus, it might be desirable to remove the stain of the Nissle substances. For example, stain separation can be performed on each image to remove the counter-stain to generate a single channel grayscale image corresponding to the primary (brown) stain). In some scenarios, the stain separation can reduce the background noise. However, the stain separation with a high sparsity coefficient can result in 'holes' (zero valued pixels) within cells in some of the planes in an image stack. The holes can be avoided by using a stain-separation method with sparsity parameter or coefficient $\lambda=0.0$ (no sparsity). In a non-limiting example, stain density maps of the primary stain (i.e., the NeuN-immunopositive nuclei stain (brown)) and the counter-stain (i.e., the Nissle substance stain (blue)) can be obtained through stain separation. Then, at all the pixels where primary stain density is above a threshold (e.g., 5% of the maximum possible value), the stain density values of the two stains are summed to a single grayscale value. This effectively remove the counter-stain while preserving the intensity for the NeuN-immunopositive nuclei in the multiple z-stack grayscale images. The maximum possible value depends on the objective function used in the stain separation process. For such pixels, corresponding values from the two stain density maps obtained by stain separation are added together. It should be appreciated that the conversion into to grayscale is a mere example. In some examples, the conversion can be performed into any other suitable color or multiple colors/color channels. In such examples, the deep learning model can be trained with the corresponding channel images. In other examples, step 2816 can be optional. Although converting images into grayscale can be computationally resource effective, the visual/full color images can be used in step 2818. In these examples, the deep learning model can be trained with tagged visual images.

In other embodiments, the process can use fluorescent microscopy (e.g., epifluorescence microscopy, confocal microscopy, etc.). Using the fluorescent microscopy, the process can convert the z-stack images in single channel images (e.g., grayscale) by selecting only a channel of interest. In some examples, the multiple z-stack runtime images can include fluorescent confocal microscopy images. Using the fluorescent confocal microscopy images, the process can not only count the number of cells that contain antigen but also quantify the concentration of antigen within the cells. For example, fluorescently tagged antibodies can be used to detect targeted antigens. Due to a proportional stoichiometric relationship (e.g., 1:1) between the antigen and the florescent intensity, the fluorescence intensity can indicate the level of the concentration of antigens within the cell. This information can separately provide a user with information regarding concentration. For example, fluorescence intensity information can be extracted from an image and used as a "tag" in the image to indicate concentration of antigens. Unlike the immunostaining described above, fluorescence imaging can use ultraviolet (UV) light on the cell to fluoresce. For example, the fluorescence imaging can use UV light on the cell to excite the cell to a higher energy level and fluoresce when the energy drops down to a lower energy level. In a non-limiting scenario, the fluorescence imaging uses confocal microscopy to reduce noise and obtain sharp z-stack images using a small spatial pinhole and fluorescent light through the hole. Using the confocal microscopy, the z-stack image can capture a particle itself without any gradient around the particle. However, it should be appreciated that the confocal microscopy is a mere example. In other examples, epi-fluorescence imaging can be exploited to obtain the z-stack images. In some instances, fluorescent machine can be used in the fluorescent microscopy and non-fluorescent microscopy. For example, when the fluorescent machine turns off the fluorescent light, the fluorescent machine can be used for non-fluorescent microscopy. On the other hand, when the fluorescent machine turns on the fluorescent light, the fluorescent machine can be used for the fluorescent microscopy.

In step 2818, the process may apply the multiple z-stack grayscale images to the trained deep learning model. In some examples, each z-stack grayscale image may correspond to an input channel of the trained deep-learning model. Thus, the number of input channels may be the same as the number of multiple z-stack grayscale images (i.e., z-axis planes) in a stack. For example, the number of input channels may be 10 channels. Further, the number of input channels may be the same as the number of output channels of the trained deep-learning model. In other examples, the trained deep-learning model can have an additional output class for background. For example, the number of output classes in this version is one more than the number of input channels for neuron segmentation task.

In further examples, the deep-learning model may be a convolutional neural network (CNN) model, and in some specific embodiments, the CNN may include a U-Net model. However, it should be appreciated that the deep-learning model is not limited to the U-Net model. For example, the deep-leaning model may be any other 2D FCN. The U-Net model may include a contracting path and an expansive path. The contracting path can produce the low-dimensional representation. The expansive path up-samples the representation to produce the final output segmentation map. In some examples, the contracting path may include the repeated application of a convolutional block consisting of two 3×3 convolutional layers. Each 3×3 convolutional layer in a block may be followed by a rectified linear unit (ReLU), and each block may be followed by a 2×2 max pooling operation with stride 2 for down-sampling. The number of feature channels may be doubled at each stage in a down-sampling process. The explosive path may include repeated application of a decoder block. A decoder block can include a 2×2 upsampling the feature map, concatenation with corresponding (symmetrically equivalent) cropped feature maps from the contracting path, and a convolutional block. The number of feature channels may be reduced to half at every stage in the explosive path. Then, in the final layer, a 1×1 convolution can be used to map each component feature vector to the desired number of classes. In some examples, a convolution kernel depth in a first layer in the U-Net model is equal to a total number of the plurality of z-stack grayscale images and is equal to a total number of feature map channels from a previous layer in a second layer and so on.

In step 2820, the process may obtain multiple outputs corresponding to the plurality of 7-stack grayscale images from the trained deep-learning model. In some examples, an output of the multiple outputs may represent foreground for a corresponding z-stack grayscale image of the multiple z-stack grayscale images. Multiple outputs may represent foregrounds for corresponding multiple z-stack grayscale images. In further examples, a first output of the plurality of outputs may be bidirectionally correlated to a second output of the plurality of output images. The output for each z-stack grayscale images may bidirectionally correlated to the output of the other z-stack grayscale images in the stack. In some examples, each of the multiple z-stack grayscale images in the deep-learning model (e.g., U-Net model) may receive context from other z-stack grayscale images, and each z-stack grayscale image may provide context to the other z-stack grayscale images. For example, a cell visible in planes N−1, N, and N+1 can be considered as foreground only in one (best focus plane) of the three z-planes. In other words, a visible cell in a particular z plane is considered as foreground or background depending on what it is considered as in subsequent planes in both directions. This is because "best focus" is a relative measure. Here, the "context" can indicate related and helpful information obtained from other z-planes. For example, the "context" can form planes N-n and N+n can provide information about a given z-plane N better by providing information about presence of a cell, location of a cell, focus increasing in which direction etc. Thus, rather than looking at single z-plane and deciding if it is the best focus for a cell or not, the process can look at images before and after the given image to decide the same. Each output of the multiple outputs comprises a segmentation map. In some examples, each cell may be segmented in the segmentation map in the corresponding grayscale image (e.g., best focus plane). Thus, a cell may be segmented in a one segmentation map corresponding to a best focal plane for the cell. In some examples, one plane before or after the best focus slice can have a prediction confidence value lower than the best focus slice but still remain above the prediction confidence threshold. There is a high probability that any two overlapping blobs in any two consecutive planes belong to a single cell. In some examples, the outputs are prediction confidence maps where value at each pixel location indicates confidence for the pixel predicted as foreground. The prediction confidence values are thresholded in the post-processing to binarize the outputs into foreground and background class. Other use of the post-processing is that, in some examples, one plane before or after the best focus slice can have a prediction confidence value lower than the best focus slice but still remain above the prediction confidence threshold. There is a high probability that any two overlapping blobs in any two consecutive planes belong to a single cell. Such blobs can be combined as one in the post-processing.

In step 2822, the process may perform post-processing on the multiple outputs of the deep-learning model. In some examples, the post-processing may be performed to prune over-segmentation and False Positives. A minimum area threshold of 500 pixels (which is close to the smallest GT blob in the dataset) may be used for the blobs completely inside the image and 200 pixels can be used for the blobs touching any of the edges of the image since it can correspond to a cell partially outside the field of view.

In some examples, one plane before or after the best focus slice can have a prediction confidence value lower than the best focus slice but still remain above the prediction confidence threshold. There is a high probability that any two overlapping blobs in any two consecutive planes belong to a single cell. Then, the two overlapping blobs may be combined into a single cell and assign the single cell to the z-plane with larger blob. For examples, blobs at N and N+1 planes can be considered the same cell while blobs at N and N+2 planes can be considered different cells.

In further examples, a hole of an output blob may be filled to account for a solid cell body. In some embodiments, the hole may include zero valued pixels. In even further examples, a blob having less than a predefined overlap with a minimum enclosing circle can be discarded to account for circularity of the cells for the most part.

In other examples, this post-processing step in step 2822 can be omitted if the z-stack runtime images are fluorescent confocal microscopy images as described in step 2816. For example, the z-stack runtime images using the confocal microscopy can have signals from only a thin focal plane in contrast to brightfield microscopy images where signals from out-of-focus structures are also present. Also, the distance between the planes with respect to the size of the objects of interest (immunostained cells vs fluorescent particles)) defines for how many z-planes an object is visible. In some examples, the distance between the planes with respect to the particle size is such that a particle is visible only in up to three z-planes. The distance with respect to the object size is large in fluorescent confocal microscopy images compared to the immunostained images where a cell is visible for up to ten z-planes due to smaller z-step and out-of-focus appearance. Thus, the z-stack runtime images based on the fluorescent imaging might not have over-segmentation or overcounting of cells. However, z-stack runtime images using the immunostaining can have a longer distance between the images than the images using the fluorescent imaging.

In step 2824, the process may count one or more cells in the multiple outputs, or alternatively, may provide other characteristic information regarding the one or more cells. For example, the process may provide a user with a percentage of area of a z-stack of images that is occupied by the cell of interest, can provide qualitative information (such as relative sizes or shapes of cells), or the like. The multiple outputs may be multiple post-processed segmentation maps. In some examples, the process may count one or more neurons in the multiple output images. A neuron where a white blob of an output image exists may be counted. The total number of neurons in the multiple output images in the z-stack is the same as the number of white blobs in the multiple images.

Figure 29:
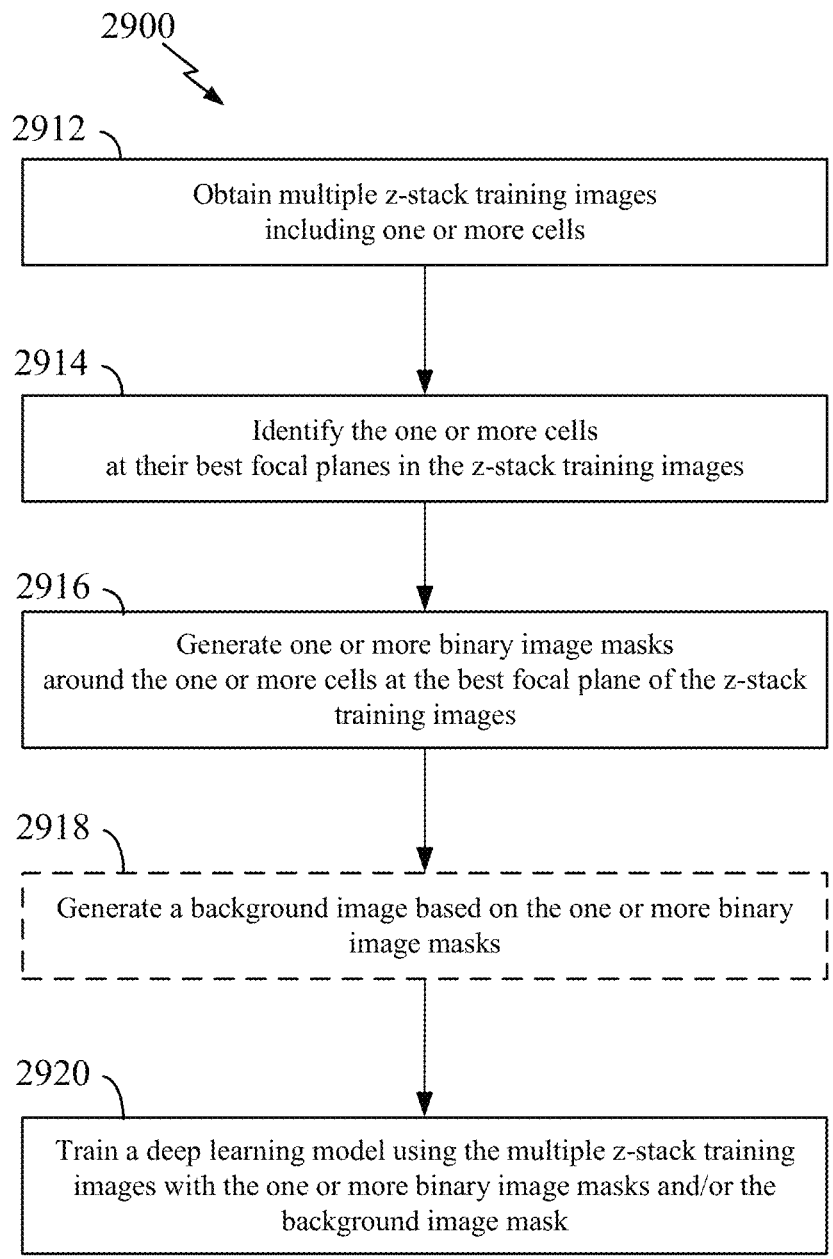
FIG. 29 is another flow chart illustrating an exemplary process for performing computerized stereology in accordance with some aspects of the present disclosure.

FIG. 29 is a method illustrating exemplary processes for training a deep learning model to perform computerized stereology in accordance with some aspects of the present disclosure. As described below, a particular implementation may omit some or all illustrated features and may not require some illustrated features to implement all embodiments. In some examples, any suitable apparatus or means for carrying out the functions or algorithm described below may carry out the process 2900.

In step 2912, a system implementing such a process may obtain multiple z-stack training images including one or more first cells. The multiple z-stack training images may be similar to the multiple z-stack runtime images described in connection with FIG. 28.

In step 2914, the one or more first cells in the multiple z-stack training images may be identified and counted at one or more corresponding best focal z-stack training images to generate ground truth. For example, the z-stack training images can include one or more cells. Each cell can be annotated in one best focal plane or individual z-stack training image. For example, although a cell can be shown in multiple z-stack training images, the cell can be identified with an annotation on only one z-stack image—namely, the particular image/plane at which the cell is in best focus. In some examples, an expert can manually identify one or more cells in the one or more corresponding best focal training images. In other examples, an image recognition machine can automatically outline the one or more cells identified by the expert on the one or more best focal z-stack training images using a suitable technique with minimum expert intervention. This process may be referred to as count-annotation. In some examples, a trained technician or an expert may manually count or click the one or more first cells in the multiple z-stack training images using a manual optical disector. In other examples, the first cells may be automatically identified and annotated using techniques described above (e.g., ASATP-DL or ASA), with subsequent verification by a human expert in some or all of the training images. In some examples, cells that fall outside the disector volume or touched either the bottom, lower, or left-side exclusion planes may be excluded. Thus, one or more annotations on the one or more first cells in the multiple z-stack training images may be generated to generate ground truth. Here, an annotation may be generated to only correspond to one cell although the cell may be shown in more than one z-stack training image. In some examples, the process can convert the z-stack training images into single-channel images as described in step 2816 of FIG. 28. Thus, the process can use the non-fluorescent microscopy for the immunostaining or the fluorescent microscopy (e.g., confocal microscopy).

In step 2916, one or more binary image masks around the one or more first cells at one or more corresponding best focal z-stack images may be generated. In some examples, multiple foreground binary images corresponding to the multiple z-stack training images can be generated. Among the multiple binary images, a binary mask for a cell at the best focal z-stack training image can be generated on a binary image corresponding to the best focal z-stack training image. Here, the best focal z-stack training image can display the cell clearer than other z-stack training images. In some examples, the one or more binary masks corresponding to one or more cells can be manually generated based on the annotations on the z-stack training images. However, it should be appreciated that the binary masks can be automatically generated using a suitable image recognition technique. For example, a mask of the one or more binary image masks may correspond to a cell of the one or more first cells. The mask of the one or more binary image masks may correspond to a z-stack training image of the plurality of the z-stack training images. The z-stack training image of the plurality of the z-stack training images may be the best focal plane on the cell in the plurality of the z-stack training images. In some examples, a binary image mask may be generated with cells as foreground in a corresponding best focal plane or a corresponding z-stack training image. This process may be referred to as mask-annotation. In some examples, each binary image of the multiple binary images can provide ground truth labels for each pixel in the respective binary image. For example, each pixel XY-location in a binary image can have '0' for a non-cell area or '1' for a cell area or a binary mask area. In further examples, one XY-location in the multiple binary images corresponding to the multiple z-stack training images can have a label vector including ground truth labels of the XY-location for corresponding binary images. Thus, all XY-locations of the multiple foreground binary images can have corresponding label vectors including ground truth labels corresponding to the multiple foreground binary images or the multiple z-stack training images.

In optional step 2918, the process may generate a background binary image based on the one or more binary image masks. For example, the process can automatically generate a background binary image by combining all foreground binary images (e.g., using an OR logic operation) and inverting the combined image. Thus, the background binary image can include all binary image masks in inverted color. For example, all combined binary masks can be shown in black color in the background binary image while any pixel, which does not belong to any binary mask, can be shown in white color in the background binary image. In some examples, each pixel XY-location in the background binary image can have '0' for a cell or binary mask area or '1' for a non-cell area. The background binary image can be used for the softmax function in the last layer for classification due to strong correlation between training z-stack images. Since the softmax function assumes the target probability distribution to sum up to one, the process can convert the label vector for a XY-location, which is an overlapping cell area, by diving the ground truth labels by the number of active classes or binary masks in the XY-location of the multiple binary images. For example, a XY-location in 10 binary images can include two binary image masks on the two binary images (e.g., binary images 3 and 5) corresponding to two best focal z-stack training images for two cells. Then, the XY-location on the two binary images can have a value of '1.' Then, the label vector for the XY-location can have [0, 0, 1, 0, 1, 0, 0, 0, 0, 0]. However, the sum of the label vector is more than 1, the label vector can be converted by dividing each ground truth label by the total number (2) of binary masks on the XY-location of the multiple binary images. Thus, the converted label vector for the XY-location can have [0, 0, 0.5, 0, 0.5, 0, 0, 0, 0, 0] such that the sum of the elements in the converted label vector is equal to 1. Each XY-location of multiple binary images can have a converted label vector.

In step 2920, the process may train the deep learning model using the multiple z-stack training images with the one or more binary masks and/or the background image. The deep learning model may include a U-Net model. In some examples, the U-Net model may be a 2D U-Net model with multiple inputs and multiple outputs to exploit the 3D context in an image stack for identifying the best focus plane for each cell and avoid the high computational cost. Here, the inputs may be the plurality of z-stack training images in a z-stack, and the number of outputs may be the same as the number of the input. In addition, the training of the deep learning model can include comparing multiple output images with ground truth binary image masks and update the U-Net model based on the result. In some examples, the deep learning model can receive the multiple z-stack training images and the multiple foreground binary images including one or more binary masks corresponding to their best focal z-stack images. In some examples, the deep learning model can receive a label vector for each XY location of multiple foreground binary images such that the label vectors include ground truth labels of binary masks for all XY pixel locations. Since each of the one or more binary masks corresponds the best focal z-stack training image, the deep learning model can learn disregarding out-of-focus z-stack images but a best focal z-stack image including a cell corresponding to the respective binary mask. In addition, the deep learning model can learn the shape of cells based on the binary masks.

In other examples, the deep learning model can receive the multiple z-stack training 30) images and the multiple foreground binary images including one or more binary masks corresponding to their best focal z-stack images with a background binary image. In some examples, the multiple foreground binary images and the background binary image can constitute all output classes of the deep learning model to use the softmax function in the last layer of the deep learning model. The deep learning model can produce the same number of outputs as the number of the multiple z-stack images or one more than the number of the multiple z-stack images including the multiple foreground binary images and one background image. In the runtime phase, the deep learning model does not use the foreground and background binary images because there are no ground truth labels on the runtime z-stack images.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

All patents, patent applications, provisional applications, and publications referred to or cited herein are incorporated by reference in their entirety, including all figures and tables, to the extent they are not inconsistent with the explicit teachings of this specification. Particularly, this specification incorporates by reference U.S. Pat. No. 9,297,995, to the extent it is consistent with the teachings disclosed herein.

What is claimed is:

1. A method for performing computerized stereology, comprising:
    obtaining a plurality of z-stack runtime images including one or more cells;
    generating a plurality of z-stack grayscale images by converting the plurality of z-stack runtime images into grayscale;
    applying the plurality of z-stack grayscale images to a trained deep-learning model, each z-stack grayscale image of the plurality of z-stack grayscale images corresponding to an input channel of the trained deep-learning model;
    obtaining a plurality of outputs corresponding to the plurality of z-stack grayscale images from the trained deep-learning model, the plurality of outputs comprising information indicative of a plane of best focus for each cell of the one or more cells of the plurality of z-stack runtime images, wherein a first output N of the plurality of outputs is bidirectionally correlated with previous (N−1) and subsequent (N+1) outputs of the plurality of outputs; and
    counting the one or more second cells in the plurality of outputs.

2. The method of claim 1, wherein each Z-stack image of the plurality of Z-stack runtime images focuses on a different physical location on a z-axis, wherein the z-axis is perpendicular to 2D planes of the z-stack images.

3. The method of claim 2, wherein the plurality of Z-stack runtime images is at a right angle to the z-axis.

4. The method of claim 1, wherein the generating the plurality of z-stack grayscale images comprises:
    removing a cresyl violet counterstain for a Nissl substance from the plurality of z-stack runtime images; and
    generating the plurality of z-stack grayscale images by converting colors of the one or more second cells in the plurality of z-stack runtime images into grayscale.

5. The method of claim 1, each output of the plurality of outputs comprises a segmentation map.

6. The method of claim 1, further comprising:
    identifying two overlapping cells in two consecutive outputs of the plurality of outputs;
    combining the two overlapping cells into a single cell; and
    assigning the single cell to an output of the two consecutive outputs, the output including a bigger cell of the two overlapping cells than another output of the two consecutive outputs.

7. The method of claim 1, further comprising:
    filling one or more hole of an output of the plurality of outputs to account for a solid cell body.

8. The method of claim 1, further comprising:
    discarding a cell overlapping another cell less than a predefined overlap with a minimum enclosing circle.

9. The method of claim 1, wherein the deep learning model comprises a U-Net model.

10. The method of claim 1, further comprising:
    identifying one or more primary stains and one or more counter stains in the one or more second cells in the plurality of z-stack runtime images;
    performing stain separation to remove the one or more counter-stain; and
    filling one or more holes in the plurality of z-stack runtime images, the one or more holes caused from the stain separation.

11. The method of claim 1, wherein each of the plurality of z-stack runtime images comprises a fluorescent image.

12. The method of claim 1, wherein the training the deep learning model comprises:
    generating one or more annotations on the one or more first cells in the plurality of z-stack training images to generate ground truth;
    generating one or more binary image masks around the one or more first cells in the plurality of z-stack training images;
    removing a subset of the one or more binary image masks, each mask of the subset omitting the one or more annotations; and
    training the deep learning model based on the one or more annotations and the one or more binary image masks without the subset on the plurality of z-stack training images.

13. The method of claim 12, wherein a mask of the one or more binary image masks corresponds to a cell of the one or more first cells, and wherein the mask of the one or more binary image mask corresponds to a z-stack training image of the plurality of the z-stack training images, the z-stack training image of the plurality of the z-stack training images being a best focal plane on the cell in the plurality of the z-stack training images.

14. A system for performing computerized stereology, comprising:
  a processor;
  a memory having stored thereon a set of instructions which, when executed by the processor, cause the processor to:
    obtain a plurality of z-stack runtime images including one or more first cells;
    generate a plurality of z-stack grayscale images by converting the plurality of z-stack runtime images into grayscale;
    apply the plurality of z-stack grayscale images to a trained deep-learning model, each z-stack grayscale image of the plurality of z-stack grayscale images corresponding to an input channel of the trained deep-learning model;
    obtain a plurality of outputs corresponding to the plurality of z-stack grayscale images from the trained deep-learning model, of the plurality of outputs comprising information indicative of a plane of best focus for each cell of the one or more cells of the plurality of z-stack runtime images, wherein a first output N of the plurality of outputs is bidirectionally correlated with previous (N−1) and subsequent (N+1) outputs of the plurality of outputs; and
    count the one or more first cells in the plurality of outputs.

15. The system of claim 14, wherein each Z-stack image of the plurality of Z-stack runtime images focuses on a different physical location on a z-axis.

16. The system of claim 15, wherein the plurality of Z-stack runtime images is at a right angle to the z-axis.

17. The system of claim 14, wherein to generate the plurality of z-stack grayscale images, the memory having stored thereon the set of instructions which cause the processor to:
  remove a cresyl violet counterstain for a Nissl substance from the plurality of z-stack runtime images; and
  generate the plurality of z-stack grayscale images by converting colors of the one or more second cells in the plurality of z-stack runtime images into grayscale.

18. The system of claim 14, each output of the plurality of outputs comprises a segmentation map.

19. The system of claim 14, wherein the memory having stored thereon the set of instructions which further cause the processor to:
  identifying two overlapping cells in two consecutive outputs of the plurality of outputs;
  combining the two overlapping cells into a single cell; and
  assigning the single cell to an output of the two consecutive outputs, the output including a bigger cell of the two overlapping cells than another output of the two consecutive outputs.

20. The system of claim 14, wherein the memory having stored thereon the set of instructions which further cause the processor to:
  fill one or more holes of an output of the plurality of outputs to account for a solid cell body.

21. The system of claim 14, wherein the memory having stored thereon the set of instructions which further cause the processor to:
  discard a cell with less than a predefined overlap with a minimum enclosing circle.

22. The system of claim 14, wherein the deep learning model comprises a U-Net model.

23. The system of claim 14, wherein the memory having stored thereon the set of instructions which further cause the processor to:
  identify one or more primary stains and one or more counter stains in the one or more second cells in the plurality of z-stack runtime images;
  perform stain separation to remove the one or more counter-stains; and
  fill one or more holes in the plurality of z-stack runtime images, the one or more holes caused from the stain separation.

24. The system of claim 14, wherein each of the plurality of z-stack runtime images comprises a fluorescent image.

25. A method for performing computerized stereology, comprising:
  obtaining a plurality of z-stack images including one or more cells of interest;
  processing the plurality of z-stack images via a trained deep-learning model, each z-stack image of the plurality of z-stack images corresponding to an input channel of the trained deep-learning model;
  obtaining a plurality of outputs corresponding to the plurality of z-stack images from the trained deep-learning model, the plurality of outputs comprising information indicative of a plane of best focus for each cell of the one or more cells of interest, wherein at least one output of the plurality of outputs represents the sole plane of best focus for a cell based on bidirectional comparison with neighboring outputs of the plurality of outputs; and
  determining a count of the one or more cells of the z-stack of images based on the one or more cells' appearances in their respective planes of best focus in the plurality of outputs.

* * * * *